(12) United States Patent
Abe

(10) Patent No.: US 8,786,876 B2
(45) Date of Patent: Jul. 22, 2014

(54) PERIPHERAL APPARATUS CONTROL SYSTEM, PERIPHERAL APPARATUS, INFORMATION PROCESSING APPARATUS, PERIPHERAL APPARATUS CONTROL METHOD, AND PROGRAM

(75) Inventor: Koichi Abe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 688 days.

(21) Appl. No.: 12/911,618

(22) Filed: Oct. 25, 2010

(65) Prior Publication Data

US 2011/0128571 A1 Jun. 2, 2011

(30) Foreign Application Priority Data

Nov. 27, 2009 (JP) ................................ 2009-270099

(51) Int. Cl.
*G06F 15/00* (2006.01)
(52) U.S. Cl.
USPC ....... 358/1.15; 358/1.13; 358/1.18; 358/1.14; 709/223; 709/226; 709/203; 718/104
(58) Field of Classification Search
None
See application file for complete search history.

(56) References Cited

U.S. PATENT DOCUMENTS

| | | | | |
|---|---|---|---|---|
| 6,213,652 | B1* | 4/2001 | Suzuki et al. | 358/1.15 |
| 7,002,704 | B1* | 2/2006 | Fan | 358/1.16 |
| 7,620,706 | B2* | 11/2009 | Jackson | 709/223 |
| 2007/0186216 | A1* | 8/2007 | Seifi | 718/102 |
| 2008/0297841 | A1* | 12/2008 | Aoki | 358/1.15 |
| 2010/0023949 | A1* | 1/2010 | Jackson | 718/104 |

FOREIGN PATENT DOCUMENTS

JP 02-146618 A 6/1990
JP 2006-181843 A 7/2006

* cited by examiner

*Primary Examiner* — Ashish K Thomas
(74) *Attorney, Agent, or Firm* — Carter, DeLuca, Farrell & Schmidt, LLP

(57) ABSTRACT

In a network printing system utilizing WSD Print Service, a highly operable peripheral apparatus control system that utilizes a mass storage device and a low-cost shared printer that does not include a function for requesting print data to an information processing apparatus is provided. The peripheral apparatus control system includes an information processing apparatus and a peripheral apparatus mutually connected via a network. The information processing apparatus inputs a job request and a reservation request to the peripheral apparatus. The peripheral apparatus includes a first measurement unit that measures the difference between reception timings of the job request and the reservation request. If the difference between the reception timings is equal to or less than a first predetermined time, a reservation ID is input and a reservation of the job request is accepted.

14 Claims, 25 Drawing Sheets

↔ INDICATES ADDRESS DATA BUS

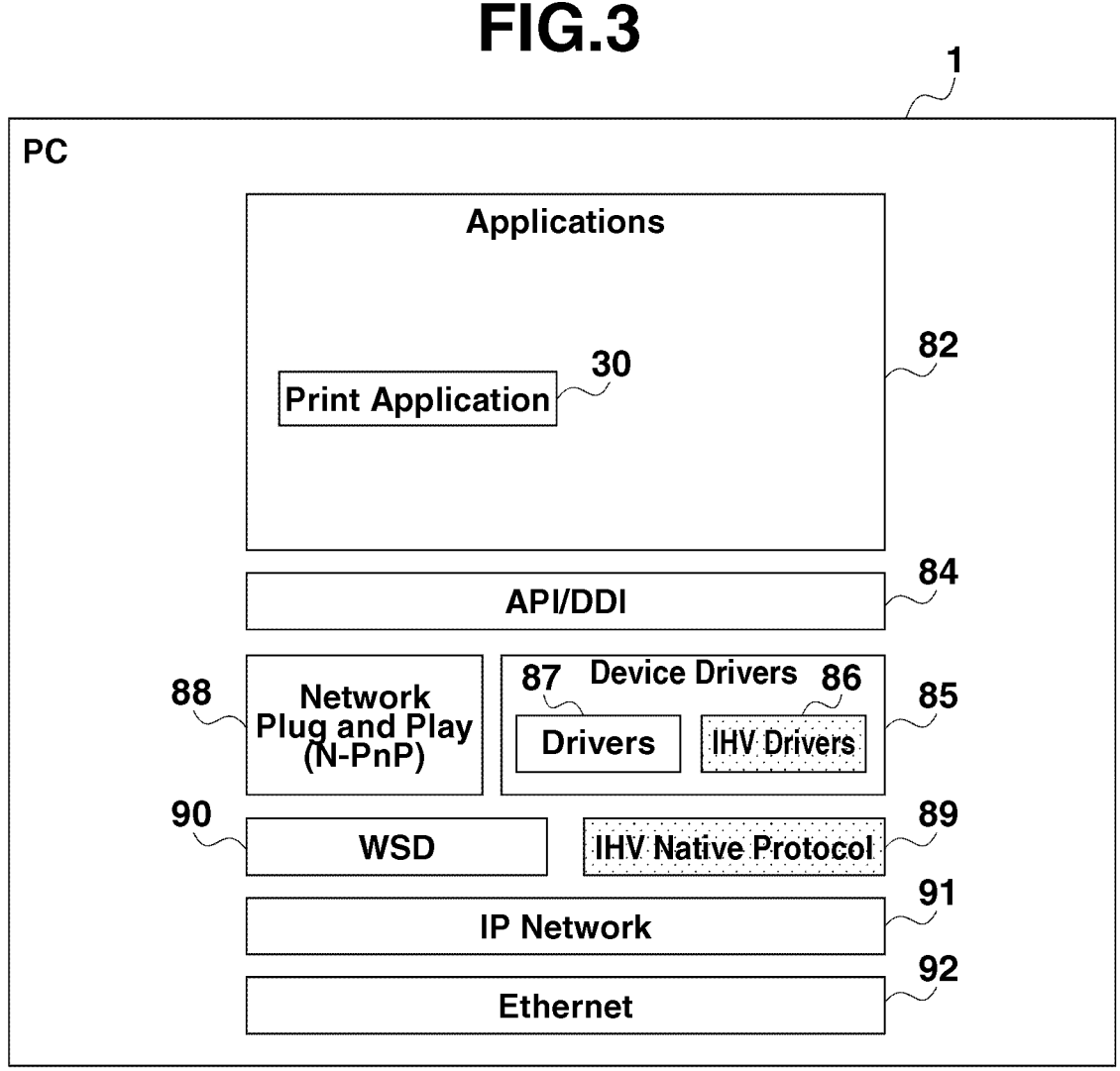

FIG.5

```
User      Spooler       LM           PM(WSDMon)    WSD Printer

START PRINTING // ~S501
          StartPrintJob(){ // ~S502
          do{
              spRet = LM_StartDocPort(); // ~S503
                        LM_StartDocPort(){ // ~S504
                            lmRet = PM_StartDocPort(); // ~S505
                                         PM_StartDocPort(){ // ~S506        ~S507
                                         // EXECUTE APPROPRIATE PROCESSING WHERE NECESSARY
                                         pmRet = ···;
                                         return pmRet; // ~S508
                                         }
                            return lmRet; // ~S509
                        }
          }
          while(!spRet); // ~S510
          do{
              spRet = LM_WritePort(); // ~S511
                        LM_WritePort(){ // ~S512
                            lmRet = PM_WritePort(); // ~S513
                                         PM_WritePort(){ // ~S514
                                             pmRet = CreatePrintJob(); // ~S515
                                                           CreatePrintJobResponse / Fault // ~S516
                                             return pmRet; // ~S517
                                         }
                            return lmRet; // ~S518
                        }
          }
          while(!spRet); // ~S519
          ··· PRINT DATA TRANSMISSION PROCESSING (FIG.7) ···
          spRet = LM_EndDocPort(); // ~S520
                        LM_EndDocPort(){ // ~S521
                            lmRet = PM_EndDocPort(); // ~S522
                                         PM_EndDocPort(){ // ~S523        ~S524
                                         // EXECUTE APPROPRIATE PROCESSING WHERE NECESSARY
                                         pmRet = ···;
                                         return pmRet; // ~S525
                                         }
                            return lmRet; // ~S526
                        }
          return spRet; // ~S527
          }
```

FIG.6

```
User          Spooler         LM              PM(WSDMon)     WSD Printer

START PRINTING // ~S601
              StartPrintJob(){ // ~S602
                do{
                  spRet = LM_StartDocPort(); // ~S603
                                  LM_StartDocPort(){ // ~S604
                                     lmMultipleJobs = FALSE; // ~S605
                                     lmRetry = 0; // ~S606
                                     lmReceivedId = "None"; // ~S607
                                     ···EXECUTE THE SAME PROCESSING AS THAT IN STEPS S505
                                     THROUGH S509 IN FIG. 5···
                }
                while(!spRet); // ~S608
                ··· GIVE PRINT JOB REQUEST AND EXECUTE RESERVATION (FIG. 16) ···
                spRet = LM_EndDocPort(); // ~S609
                                  LM_EndDocPort(){ // ~S610
                                     lmMultipleJobs = FALSE; // ~S611
                                     lmRetry = 0; // ~S612
                                     lmReceivedId = "None"; // ~S613
                                     ···EXECUTE THE SAME PROCESSING AS THAT IN STEPS S522
                                     THROUGH S525 IN FIG. 5···
                                     return lmRet; // ~S614
                                  }
                return spRet; // ~S615
              }
```

FIG.7

| User | Spooler | LM | PM(WSDMon) | WSD Printer |
|------|---------|-----|------------|-------------|

START PRINTING // PROCESSING IN STEPS S501 (FIG. 5) OR S601 (FIG. 6)
    StartPrintJob( ){ // PROCESSING IN STEPS S502 (FIG. 5) OR S602 (Fig. 6)
        ... OMITTED ...
        while(!spRet); // PROCESSING IN STEPS S519 (FIG. 5) OR S1626 (FIG. 16)
        do{
            spRet = LM_WritePort( ); // ~S701
                LM_WritePort( ){ // ~S702
                    lmRet = PM_WritePort( ); // ~S703
                        PM_WritePort( ){ // ~S704
                            pmRet = SendDocument( ); // ~S705
                                SendDocumentResponse ~S706
                          return pmRet; // ~S707
                      }
                return lmRet; // ~S708
            }
        }
        while(!spRet); // ~S709
        spRet = LM_EndDocPort( ); // PROCESSING IN STEPS S520 (FIG. 5) OR S609 (Fig. 6)
        ... OMITTED ...
    }

FIG.8A

```
<soap:Envelope xmlns:soap="http://www.w3.org/2003/05/soap-envelope"
   xmlns:wsa="http://schemas.xmlsoap.org/ws/2004/08/addressing"
   xmlns:wprt="http://schemas.yyyy.xxx/YYYY/MM/wdp/print">
 <soap:Header>
   <wsa:Action>http://schemas.yyyy.xxx/YYYY/MM/wdp/print/GetPrinterElements</wsa:Action>
   <wsa:MessageID>%MESSAGE_ID%</wsa:MessageID>
   <wsa:ReplyTo>%REPLY_TO%</wsa:ReplyTo>
   <wsa:From>%FROM%</wsa:From>
 </soap:Header>
 <soap:Body>
   <wprt:GetPrinterElementsRequest>
    <wprt:RequestedElements>
      <wprt:Name>wprt:PrinterDescription</wprt:Name>  ~801
    </wprt:RequestedElements>
   </wprt:GetPrinterElementsRequest>
 </soap:Body>
</soap:Envelope>
```

FIG.8B

```
<env:Envelope xmlns:env="http://www.w3.org/2003/05/soap-envelope"
   xmlns:wsa="http://schemas.xmlsoap.org/ws/2004/08/addressing"
   xmlns:wprt="http://schemas.yyyy.xxx/YYYY/MM/wdp/print"
   xmlns:ans="http://www.abc.xxx/ns/wdp/print/v100">  ~806
 <env:Header>
   <wsa:Action>http://schemas.yyyy.xxx/YYYY/MM/wdp/print/GetPrinterElementsResponse</wsa:Action>
   <wsa:MessageID>%MESSAGE_ID%</wsa:MessageID>
   <wsa:RelatesTo>%RELATES_TO%</wsa:RelatesTo>
   <wsa:To>%TO%</wsa:To>
 </env:Header>
 <env:Body>
   <wprt:GetPrinterElementsResponse>
    <wprt:PrinterElements>
      <wprt:ElementData Name='wprt:PrinterDescription' Valid='true'>  ~803
       <wprt:PrinterDescription>  ~805
        <wprt:DeviceId>  ~804
          MFG:ABC;CMD:ABCCommand;MDL:Kmmn;CLS:PRINTER;DES:ABC Kmmn;VER:1.00;INFO:000;
        </wprt:DeviceId>
        <ans:MultipleJobsControl>true</ans:MultipleJobsControl>  ~802
       </wprt:PrinterDescription>
      </wprt:ElementData>
    </wprt:PrinterElements>
   </wprt:GetPrinterElementsResponse>
 </env:Body>
</env:Envelope>
```

FIG.9A

```
<soap:Envelope xmlns:soap="http://www.w3.org/2003/05/soap-envelope"
  xmlns:wsa="http://schemas.xmlsoap.org/ws/2004/08/addressing"
  xmlns:wprt="http://schemas.yyyy.xxx/YYYY/MM/wdp/print"
  xmlns:ans="http://www.abc.xxx/ns/wdp/print/v100">
 <soap:Header>
  <wsa:Action>http://schemas.yyyy.xxx/YYYY/MM/wdp/print/GetPrinterElements</wsa:Action>
   <wsa:MessageID>%MESSAGE_ID%</wsa:MessageID>
    <wsa:ReplyTo>%REPLY_TO%</wsa:ReplyTo>
    <wsa:From>%FROM%</wsa:From>
  </soap:Header>
 <soap:Body>
  <wprt:GetPrinterElementsRequest>
   <wprt:RequestedElements>
    <wprt:Name>ans:ABCCommand</wprt:Name> ~903
    <ans:ABCCommand> ~904
      <ans:SplJobId>5</ans:SplJobId> ~905
      <ans:ReceivedId>None</ans:ReceivedId> ~906
      <ans:Retry>0</ans:Retry> ~901
      <ans:OSVersion>6.0</ans:OSVersion> ~907
      <ans:DateTime>2009-01-01T00:08:00</ans:DateTime> ~908
    </ans:ABCCommand>
   </wprt:RequestedElements>
  </wprt:GetPrinterElementsRequest>
 </soap:Body>
</soap:Envelope>
```

FIG.9B

```
<env:Envelope xmlns:env="http://www.w3.org/2003/05/soap-envelope"
  xmlns:wsa="http://schemas.xmlsoap.org/ws/2004/08/addressing"
  xmlns:wprt="http://schemas.yyyy.xxx/YYYY/MM/wdp/print"
  xmlns:ans="http://www.abc.xxx/ns/wdp/print/v100">
 <env:Header>
  <wsa:Action>http://schemas.yyyy.xxx/YYYY/MM/wdp/print/GetPrinterElementsResponse</wsa:Action>
  <wsa:MessageID>%MESSAGE_ID%</wsa:MessageID>
  <wsa:RelatesTo>%RELATES_TO%</wsa:RelatesTo>
  <wsa:To>%TO%</wsa:To>
 </env:Header>
 <env:Body>
  <wprt:GetPrinterElementsResponse>
   <wprt:PrinterElements>
    <wprt:ElementData Name='ans:ABCCommand' Valid='true'> ~909
     <ans:ABCCommand> ~910
      <ans:SplJobId>5</ans:SplJobId> ~911
      <ans:ReceivedId>00000202</ans:ReceivedId> ~912
      <ans:Retry>0</ans:Retry> ~902
      <ans:OSVersion>6.0</ans:OSVersion> ~913
      <ans:DateTime>2009-01-01T00:08:01</ans:DateTime> ~914
     </ans:ABCCommand>
    </wprt:ElementData>
   </wprt:PrinterElements>
  </wprt:GetPrinterElementsResponse>
 </env:Body>
</env:Envelope>
```

FIG.10A

```
<soap:Envelope xmlns:soap="http://www.w3.org/2003/05/soap-envelope"
   xmlns:wsa="http://schemas.xmlsoap.org/ws/2004/08/addressing"
   xmlns:wprt="http://schemas.microsoft.com/windows/2006/08/wdp/print"
   xmlns:ans="http://www.abc.xxx/ns/wdp/print/v100">
 <soap:Header>
 <wsa:Action>http://schemas.yyyy.xxx/YYYY/MM/wdp/print/GetPrinterElements</wsa:Action>
   <wsa:MessageID>%MESSAGE_ID%</wsa:MessageID>
   <wsa:ReplyTo>%REPLY_TO%</wsa:ReplyTo>
   <wsa:From>%FROM%</wsa:From>
 </soap:Header>
 <soap:Body>
   <wprt:GetPrinterElementsRequest>
     <wprt:Name>ans:ABCCommand</wprt:Name>～1001
     <ans:ABCCommand>～1002
       <ans:SplJobId>5</ans:SplJobId>～1003
       <ans:ReceivedId>00000202</ans:ReceivedId>～1004
       <ans:Retry>1</ans:Retry>～1005
       <ans:OSVersion>6.0</ans:OSVersion>～1006
       <ans:DateTime>2009-01-01T00:08:04</ans:DateTime>～1007
     </ans:ABCCommand>
   </wprt:GetPrinterElementsRequest>
 </soap:Body>
</soap:Envelope>
```

FIG.10B

```
<env:Envelope xmlns:env="http://www.w3.org/2003/05/soap-envelope"
   xmlns:wsa="http://schemas.xmlsoap.org/ws/2004/08/addressing"
   xmlns:wprt="http://schemas.microsoft.com/windows/2006/08/wdp/print"
   xmlns:ans="http://www.abc.xxx/ns/wdp/print/v100">
 <env:Header>
 <wsa:Action>http://schemas.yyyy.xxx/YYYY/MM/wdp/print/GetPrinterElementsResponse</wsa:Action>
   <wsa:MessageID>%MESSAGE_ID%</wsa:MessageID>
   <wsa:RelatesTo>%RELATES_TO%</wsa:RelatesTo>
   <wsa:To>%TO%</wsa:To>
 </env:Header>
 <env:Body>
   <wprt:GetPrinterElementsResponse>
     <wprt:PrinterElements>
       <wprt:ElementData Name='ans:ABCCommand' Valid='true'>～1008
         <ans:ABCCommand>～1009
           <ans:SplJobId>5</ans:SplJobId>～1010
           <ans:ReceivedId>00000202</ans:ReceivedId>～1011
           <ans:Retry>1</ans:Retry>～1012
            <ans:OSVersion>6.0</ans:OSVersion>～1013
            <ans:DateTime>2009-01-01T00:08:05</ans:DateTime>～1014
         </ans:ABCCommand>
       </wprt:ElementData>
     </wprt:PrinterElements>
   </wprt:GetPrinterElementsResponse>
 </env:Body>
</env:Envelope>
```

FIG.11A

```
<soap:Envelope xmlns:soap="http://www.w3.org/2003/05/soap-envelope"
  xmlns:wsa="http://schemas.xmlsoap.org/ws/2004/08/addressing"
  xmlns:wprt="http://schemas.yyyy.xxx/YYYY/MM/wdp/print">～1105
 <soap:Header>
  <wsa:To>%TO%</wsa:To>
  <wsa:Action>http://schemas.yyyy.xxx/YYYY/MM/wdp/print/CreatePrintJob</wsa:Action>
  <wsa:MessageID>%MESSAGE_ID%</wsa:MessageID>
  <wsa:ReplyTo>%REPLY_TO%</wsa:ReplyTo>
  <wsa:From>%FROM%</wsa:From>
 </soap:Header>
 <soap:Body>
  <wprt:CreatePrintJobRequest>
   <wprt:PrintTicket>
    <wprt:JobDescription>～1101
     <wprt:JobName>Photo2</wprt:JobName>～1102
     <wprt:JobOriginatingUserName>Natsu</wprt:JobOriginatingUserName>～1103
    </wprt:JobDescription>
   </wprt:PrintTicket>
  </wprt:CreatePrintJobRequest>
 </soap:Body>
</soap:Envelope>
```

FIG.11B

```
<soap:Envelope xmlns:soap="http://www.w3.org/2003/05/soap-envelope"
  xmlns:wsa="http://schemas.xmlsoap.org/ws/2004/08/addressing"
  xmlns:wsdp="http://schemas.xmlsoap.org/ws/2006/02/devprof"
  xmlns:wprt="http://schemas.yyyy.xxx/YYYY/MM/wdp/print">
 <soap:Header>
  <wsa:To>%TO%</wsa:To>
  <wsa:Action>http://schemas.yyyy.xxx/YYYY/MM/wdp/print/CreatePrintJobResponse</wsa:Action>
  <wsa:MessageID>%MESSAGE_ID%</wsa:MessageID>
  <wsa:RelatesTo>%RELATES_TO%</wsa:RelatesTo>
 </soap:Header>
 <soap:Body>
  <wprt:CreatePrintJobResponse>
   <wprt:JobId>1234</wprt:JobId>～1104
  </wprt:CreatePrintJobResponse>
 </soap:Body>
</soap:Envelope>
```

FIG.14A

| No. | Computer Name | wprt:JobName | wprt:JobOriginatingUserName | wprt:JobId | ans:SplJobId | ans:ReceivedId | Time |
|---|---|---|---|---|---|---|---|
| 1 | PC777 | Test Print | Koichi | 888 | 10 | 00000001 | 805 |
| 2 | Host8 | Doc1 | Abe | Null | 100 | 00000008 | 801 |
| 3 | PC1 | Test Print | Mami | Null | 123 | 00000010 | 802 |
| 4 | PC2 | Doc8 | Misa | Null | 88 | 00000201 | 804 |
| 5 | Host1 | Photo2 | Natsu | Null | 5 | 00000202 | 803 |
| 6 | Null | Null | Null | Null | Null | Null | Null |
| 7 | Null | Null | Null | Null | Null | Null | Null |
| 8 | Null | Null | Null | Null | Null | Null | Null |

FIG.14B

| No. | Protocol | Computer Name | wprt:JobName | wprt:JobOriginatingUserName | wprt:JobId | ans:SplJobId | ans:ReceivedId/ lans:TimeStamp | Time |
|---|---|---|---|---|---|---|---|---|
| 1 | WSD | PC777 | Test Print | Koichi | 888 | 10 | 00000001 | 805 |
| 2 | IHV Native | Host100 | — | — | — | — | 00000004 | 780 |
| 3 | WSD | Host8 | Doc1 | Abe | 890 | 100 | 00000008 | 801 |
| 4 | WSD | PC1 | Test Print | Mami | 1001 | 123 | 00000010 | 802 |
| 5 | IHV Native | Host150 | — | — | — | — | 00000050 | 820 |
| 6 | WSD | PC2 | Doc8 | Misa | Null | 88 | 00000201 | 804 |
| 7 | WSD | Host1 | Photo2 | Natsu | Null | 5 | 00000202 | 803 |
| 8 | IHV Native | PC5 | — | — | — | — | 00000301 | 808 |

FIG.14C

| No. | Protocol | Computer Name | wprt:JobName | wprt:JobOriginatingUserName | wprt:JobId | ans:SplJobId | ans:ReceivedId/ lans:TimeStamp | Time |
|---|---|---|---|---|---|---|---|---|
| 1 | WSD | PC777 | Test Print | Koichi | 888 | 10 | 00000001 | 805 |
| 2 | IHV Native | Host100 | — | — | — | — | 00000004 | 780 |
| 3 | WSD | Host8 | Doc1 | Abe | 890 | 100 | 00000008 | 801 |
| 4 | WSD | PC1 | Test Print | Mami | 1001 | 123 | 00000010 | 802 |
| 5 | IHV Native 2 | PC1 | — | — | — | — | 00000108 | 825 |
| 6 | WSD | PC2 | Doc8 | Misa | Null | 88 | 00000201 | 804 |
| 7 | Null | Null | Null | Null | Null | Null | Null | Null |
| 8 | Null | Null | Null | Null | Null | Null | Null | Null |

FIG.15A

| PORT OF PC1 CURRENTLY EXECUTING PRINTING | INFORMATION ABOUT DEVICE ID | PORT OF PC2 WAITING FOR PRINTING |
|---|---|---|
| USB | 101 | IHV Native |
| USB | 101 | WSD |
| IHV Native | 102 | IHV Native |
| IHV Native | 102 | WSD |
| WSD | 102 | IHV Native |
| WSD | 102 | WSD |

FIG.15B

| PORT OF PC1 CURRENTLY EXECUTING PRINTING | INFORMATION ABOUT DEVICE ID | PORT OF PC2 WAITING FOR PRINTING |
|---|---|---|
| USB | 102 | IHV Native |
| USB | 102 | WSD |
| IHV Native | 102 | IHV Native |
| IHV Native | 102 | WSD |
| WSD | 102 | IHV Native |
| WSD | 102 | WSD |

FIG.16

```
:User         :Spooler      :LM           :PM(WSDMon)    :WSD Printer

···PROCESSING IN STEPS S601 THROUGH S608 (FIG. 6)···
              do{ // ~S1601
                spRet = LM_WritePort(); // ~S1602
                   LM_WritePort(){ // ~S1603
                     if((lmRetry > 0) && (lmMultipleJobs == TRUE)){ // ~S1604
                        lmRet = GetPrinterElements(ans:ABCCommand); // ~S1605
                                                    :GetPrinterElementsResponse // ~S1606
                        lmReceivedId = <ans:ReceivedId>; // ~S1607
                        if(lmReceivedId == "None"){ // ~S1627
                           lmRetry = 0; // ~S1628
                        }
                        else{ // ~S1629
                           lmRetry = lmRetry + 1; // ~S1608
                        }
                     }
                     lmRet = PM_WritePort(); // ~S1609
                            PM_WritePort(){ // ~S1610
                              pmRet = CreatePrintJob(); // ~S1611
                                           :CreatePrintJobResponse / Fault // ~S1612
                              return pmRet; // ~S1613
                            }
                     if(!lmRet){ // ~S1614
                        if(lmRetry == 0){ // ~S1615
                           lmRet = GetPrinterElements(wprt:PrinterDescription); // ~S1616
                                                    :GetPrinterElementsResponse // ~S1617
                           if(<ans:MultipleJobsControl> == "true"){ // ~S1618
                              lmMultipleJobs = TRUE; // ~S1619
                           }
                        }
                        if(lmMultipleJobs == TRUE){ // ~S1620
                           lmRet = GetPrinterElements(ans:ABCCommand); // ~S1621
                                                    :GetPrinterElementsResponse // ~S1622
                           lmReceivedId = <ans:ReceivedId>; // ~S1623
                           if(lmReceivedId == "None"){ // ~S1630
                              lmRetry = 0; // ~S1631
                           }
                           else{ // ~S1632
                              lmRetry = lmRetry + 1; // ~S1624
                           }
                        }
                     }
                     return lmRet; // ~S1625
                   }
                }
                while(!spRet); // ~S1626
                  ··· PRINT DATA TRANSMISSION PROCESSING (FIG. 7) ···
··· PROCESSING IN STEPS S609 THROUGH S615 (FIG. 6) ···
```

FIG.18A

```
<soap:Envelope xmlns:soap="http://www.w3.org/2003/05/soap-envelope"
  xmlns:wsa="http://schemas.xmlsoap.org/ws/2004/08/addressing"
  xmlns:lans="http://www.abc.xxx/ns/wdp/print/v002">  ～1801
 <soap:Header>
  <wsa:Action>http://www.abc.xxx/ns/wdp/print/v002/StartJob</wsa:Action> ～1802
   <wsa:MessageID>%MESSAGE_ID%</wsa:MessageID>
    <wsa:ReplyTo>%REPLY_TO%</wsa:ReplyTo>
    <wsa:From>%FROM%</wsa:From>
 </soap:Header>
 <soap:Body>
   <lans:StartJobRequest> ～1803
    <lans:ComputerName>PC5</lans:ComputerName> ～1804
    <lans:TimeStamp>None</lans:TimeStamp> ～1805
    <lans:Retry>0</lans:Retry> ～1806
    <lans:DateTime>2009-01-01T22:01:30</lans:DateTime> ～1807
   </lans:StartJobRequest>
 </soap:Body>
</soap:Envelope>
```

FIG.18B

```
<env:Envelope xmlns:env="http://www.w3.org/2003/05/soap-envelope"
  xmlns:wsa="http://schemas.xmlsoap.org/ws/2004/08/addressing"
  xmlns:lans="http://www.abc.xxx/ns/wdp/print/v002">
 <env:Header>
  <wsa:Action>http://www.abc.xxx/ns/wdp/print/v002/StartJobResponse</wsa:Action>
  <wsa:MessageID>%MESSAGE_ID%</wsa:MessageID>
  <wsa:RelatesTo>%RELATES_TO%</wsa:RelatesTo>
  <wsa:To>%TO%</wsa:To>
 </env:Header>
 <env:Body>
   <lans:StartJobResponse> ～1808
    <lans:ComputerName>PC5</lans:ComputerName> ～1809
    <lans:TimeStamp>00000301</lans:TimeStamp> ～1810
    <lans:Retry>0</lans:Retry> ～1811
    <lans:DateTime>2009-01-01T22:01:31</lans:DateTime> ～1812
   </lans:StartJobResponse>
 </env:Body>
</env:Envelope>
```

FIG.22

| No. | Protocol | Computer Name | wprt:JobName | wprt:JobOriginatingUserName | wprt:JobId | ans:SplJobId | Time |
|---|---|---|---|---|---|---|---|
| 1 | WSD | PC777 | Test Print | Koichi | 888 | 10 | 805 |
| 2 | IHV Native | Host100 | — | — | — | — | 780 |
| 3 | WSD | Host8 | Doc1 | Abe | 890 | 100 | 801 |
| 4 | WSD | PC1 | Test Print | Mami | 1001 | 123 | 802 |
| 5 | IHV Native 2 | PC1 | — | — | — | — | 825 |
| 6 | WSD | PC2 | Doc8 | Misa | Null | 88 | 804 |
| 7 | Null | Null | Null | Null | Null | Null | Null |
| 8 | Null | Null | Null | Null | Null | Null | Null |

PERIPHERAL APPARATUS CONTROL SYSTEM, PERIPHERAL APPARATUS, INFORMATION PROCESSING APPARATUS, PERIPHERAL APPARATUS CONTROL METHOD, AND PROGRAM

BACKGROUND OF THE INVENTION

1. Field of the Invention

The present invention relates to a peripheral apparatus control system, a peripheral apparatus, an information processing apparatus, a peripheral apparatus control method, and a program.

2. Description of the Related Art

In recent years, a peripheral apparatus control system has been effectively utilized in various environments, such as a user's home or offices. In a peripheral apparatus control system like this, a peripheral apparatus is connected to an information processing apparatus via various interfaces, such as universal serial bus (USB), Ethernet®, or a wireless local area network (LAN).

As an example of a peripheral apparatus, a printer, a copying machine, a facsimile apparatus, a scanner, and digital camera, or a combination of the above-described functions can be used. If a printer is used as an example of a peripheral apparatus, the following two types of printers are generally used in a network printing system in which a plurality of information processing apparatuses shares a printer.

One type is a printer that includes a mass storage device for storing print jobs. If this type of printer is used, a user executes a print job from the printer. Another type is a printer that manages the order of transmission of print jobs from the information processing apparatus. If this type of printer is used, the information processing apparatus transmits a print job when necessary.

In the description above, a printer is used as the peripheral apparatus. However, a print server can also implement the above-described function. If a network print system including a print server is used, it becomes unnecessary to provide the printer with a mass storage device for storing a plurality of print jobs. Various types of the above-described network printing system have been conventionally provided.

More specifically, in a method discussed in Japanese Patent Application Laid-Open No. 02-146618, a printer accepts a print reservation from an information processing apparatus. In addition, the printer manages the order of receiving print reservations. Furthermore, the information processing apparatus inputs print requests according to the print reservation order.

In other words, the printer receives a print request from the information processing apparatus as the reservation before completing currently executed print processing. In addition, the printer assigns a reservation order number to each print request according to the order of receiving the print requests. Furthermore, the printer updates the reservation order every time one print processing is completed. Moreover, the printer requests print data to an information processing apparatus whose print request is to be processed next. In addition, the printer receives the print data and prints the received print data.

In the printing system discussed in Japanese Patent Application Laid-Open No. 02-146618, it is necessary to provide the printer with a function for giving a request for print data to the information processing apparatus. Accordingly, costs of manufacture may increase.

On the other hand, Japanese Patent Application Laid-Open No. 2006-181843 discusses the following method. In this conventional method, it is not necessary for the printing system to provide a printer with a function for giving requests for print data to the information processing apparatus. More specifically, in the latter conventional method, the information processing apparatus inputs a print request requesting processing of a print job.

In this conventional method, the printer registers an identifier of the received print request in a waiting list. Furthermore, the printer manages execution of print jobs according to the print request by using the waiting list. In addition, the printer determines an interval of giving a print request according to the print request priority order stored in the waiting list at the time of reception of the print requests. Furthermore, control of request input processing is performed so that the print requests are input at the interval determined in the above-described manner.

Meanwhile, in recent years, a network printing system, which includes a plurality of information processing apparatuses that shares a printer, has been standardized. More specifically, a network printing system that utilizes a Print Service by device profile for web service (WSD), which will be described in detail later below in an exemplary embodiment of the present invention, has been marketed. In the network printing system that utilizes the WSD Print Service, an operating system (OS) issues an operation CreatePrintJobRequest to a printer as a print request for processing of a print job.

If the method discussed in Japanese Patent Application Laid-Open No. 2006-181843 is applied to the network printing system that utilizes the WSD Print Service, the CreatePrintJobRequest operation, which is a print request for processing of a print job, is utilized. In this case, it becomes necessary to add an identifier, which is one of the characteristics of the method discussed in Japanese Patent Application Laid-Open No. 2006-181843, to CreatePrintJobRequest.

However, because the CreatePrintJobRequest operation is issued by the OS, a printer driver (or the OS, according to an instruction from the printer driver) cannot add the identifier to the operation. Accordingly, the network printing system discussed in Japanese Patent Application Laid-Open No. 2006-181843 cannot be applied to the network printing system that utilizes the WSD Print Service.

SUMMARY OF THE INVENTION

In order to solve the above-described problem, the present invention is directed to provide a highly operable peripheral apparatus control system, in a network printing system that utilizes WSD Print Service, which utilizes a low-cost shared printer that does not include a mass storage device nor a function for requesting print data to an information processing apparatus.

According to an aspect of the present invention, a peripheral apparatus control system includes an information processing apparatus and a peripheral apparatus. The information processing apparatus inputs a job request and a reservation request. The peripheral apparatus is in communication with the information processing apparatus via a network to receive the job request and the reservation request. The peripheral apparatus includes a first measurement unit to measure a timing reception difference between a timing of reception of the job request and a timing of reception of the reservation request. If the timing reception difference is equal to or less than a first predetermined time, the peripheral apparatus inputs a reservation identification and accept a reservation of the job request.

According to an exemplary embodiment of the present invention, the following effects can be implemented.

(i) A highly operable peripheral apparatus control system, in a network printing system that utilizes WSD Print Service, which utilizes a low-cost shared printer that does not include amass storage device or a function for requesting print data to an information processing apparatus can be implemented.

(ii) A printer, which is capable of receiving only one print job and cannot receive a plurality of print jobs at the same time, can print a plurality of print jobs received from one or a plurality of personal computer (PC)s correctly according to the order of input of the plurality of print jobs.

(iii) A highly functional peripheral apparatus control system can be implemented that is capable, even in an environment in which print jobs of a plurality of different protocols exist in a mixed state, of printing the print jobs input from the PCs correctly and appropriately according to the order of input of the print jobs.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 3 illustrates an exemplary software configuration of the PC.

FIG. 5 illustrates a print calling sequence.

FIG. 6 illustrates an example of a calling sequence executed to perform printing.

FIG. 7 illustrates an example of a calling sequence executed to perform printing.

FIGS. 8A and 8B illustrate an example of a content of GetPrinterElements.

FIGS. 9A and 9B illustrate an example of a content of GetPrinterElements.

FIGS. 10A and 10B illustrate an example of a content of GetPrinterElements.

FIGS. 11A and 11B illustrate an example of a content of CreatePrintJob.

FIGS. 14A through 14C illustrate an example of a print queue database that manages a print job request that a printer has received and registered as a reservation.

FIGS. 15A and 15B are charts illustrating an exemplary relationship between a port of a PC and information device ID INFO.

FIG. 16 illustrates an example of a calling sequence executed to perform printing.

FIGS. 18A and 18B illustrate an example of a content of StartJob.

FIG. 22 illustrates an example of a print queue database that manages a print job request that a printer has received and registered as a reservation.

DESCRIPTION OF THE EMBODIMENTS

Various exemplary embodiments, features, and aspects of the invention will be described in detail below with reference to the drawings.

Note that among information about the Windows Vista® operating system (OS) mentioned here, information not described in detail is released on the Internet, i.e., on a web page of the Microsoft Developer Network (MSDN) site of Microsoft Corporation under the following URL as of Jul. 22, 2009:

http://msdn.microsoft.com/en-us/library/default.aspx
Accordingly, such information will not be described in detail here. In addition, in the following description, a term "USB" refers to a universal serial bus. Detailed information about USB is released in a USB web site under the following URL as of Jul. 22, 2009:

http://www.usb.org/home Accordingly, "USB" will not be described in detail here.

Furthermore, a term "WSD" is an abbreviation of "web service on devices". Detailed information about WSD is released in the Windows Hardware Developer Central (WHDC) web site of Microsoft Corporation under the following URL as of Jul. 22, 2009:

http://www.microsoft.com/whdc/connect/rally/rallyws-d.mspx Accordingly, "WSD" will not be described in detail here. In addition, "WSD Print Service Definition Version 1.0" is a print service defined by Microsoft Corporation. Detailed information about WSD Print Service Definition Version 1.0 is released in the WHDC web site of Microsoft Corporation under the following URL as of Jul. 22, 2009:

http://www.microsoft.com/whdc/connect/rally/wsdspec-s.mspx Accordingly, "WSD Print Service Definition Version 1.0" will not be described in detail here.

Figure 1:
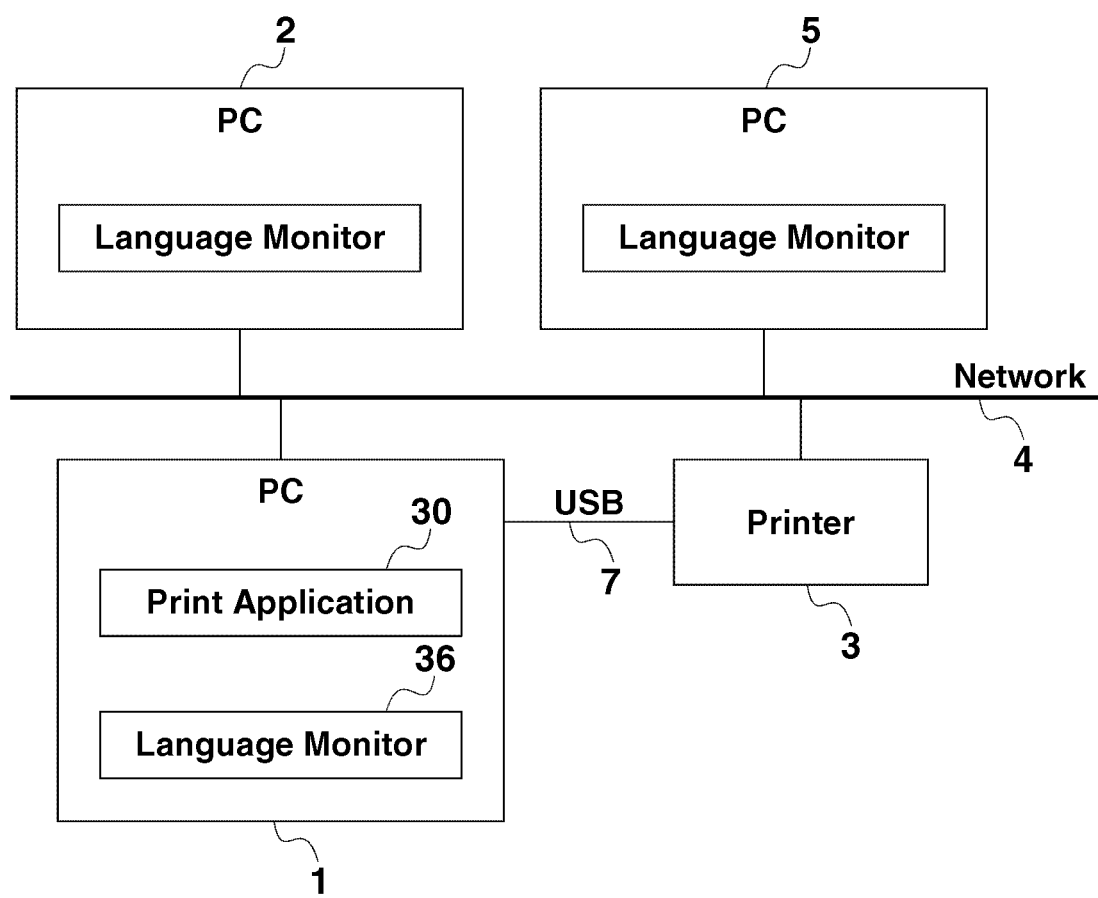
FIG. 1 is a block diagram illustrating exemplary components of a peripheral apparatus control system according to an exemplary embodiment of the present invention, which includes an information processing apparatus and a peripheral apparatus.

A first exemplary embodiment of the present invention will now be described below. FIG. 1 illustrates an exemplary system configuration of a peripheral apparatus control system including an information processing apparatus and a peripheral apparatus according to a first exemplary embodiment of the present invention.

Referring to FIG. 1, information processing apparatuses 1, 2, and 5 are general-purpose PCs. The PCs 1, 2, and 5 include hardware illustrated in FIG. 2A. In the present invention, it is supposed that an OS equivalent to Windows Vista® has been previously installed on the PCs 1 and 2. Furthermore, it is supposed that an OS equivalent to Windows XP® has been previously installed on the PC 5.

In the example illustrated in FIG. 1, each of the PCs 1, 2, and 5 is connected to a network 4. The network 4 is an Ethernet® network. A printer 3 and each of the PC 1 are in communication with one another via a USB interface 7. The printer 3, which includes a color inkjet printer, is an example of a peripheral apparatus according to the present exemplary embodiment. The printer 3 is a printer manufactured by ABC Corporation and having a model name "Kmmn". As the peripheral apparatus of the present invention, a printer, a copying machine, a facsimile apparatus, a scanner, and a digital camera, and an apparatus having a combination of functions of the above-described apparatuses can be used.

The printer 3 includes hardware that will be described in detail below with reference to FIG. 2B. The printer 3 is connected with the PC 1 via the USB interface 7 and the network 4. Thus, the printer 3 and the PC 1 are in interactive communication with each other.

An application 30 includes a file having a ".exe" format (i.e., a file having an extension ".exe") of Windows. The application 30 is an application capable of executing printing, as will be described in detail below with reference to FIG. 4. The PC 1 includes a language monitor 36. The language monitor 36 will be described in detail below with reference to FIG. 4.

Figure 2A:
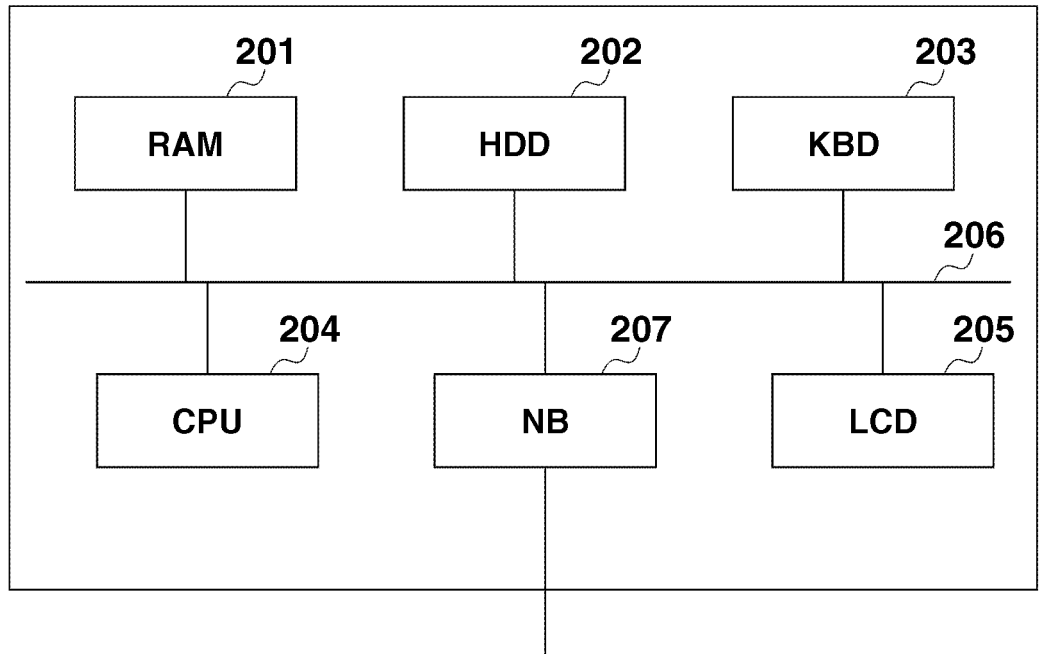
FIGS. 2A and 2B are block diagrams illustrating an exemplary hardware configuration of a PC and a printer.
Figure 2B:
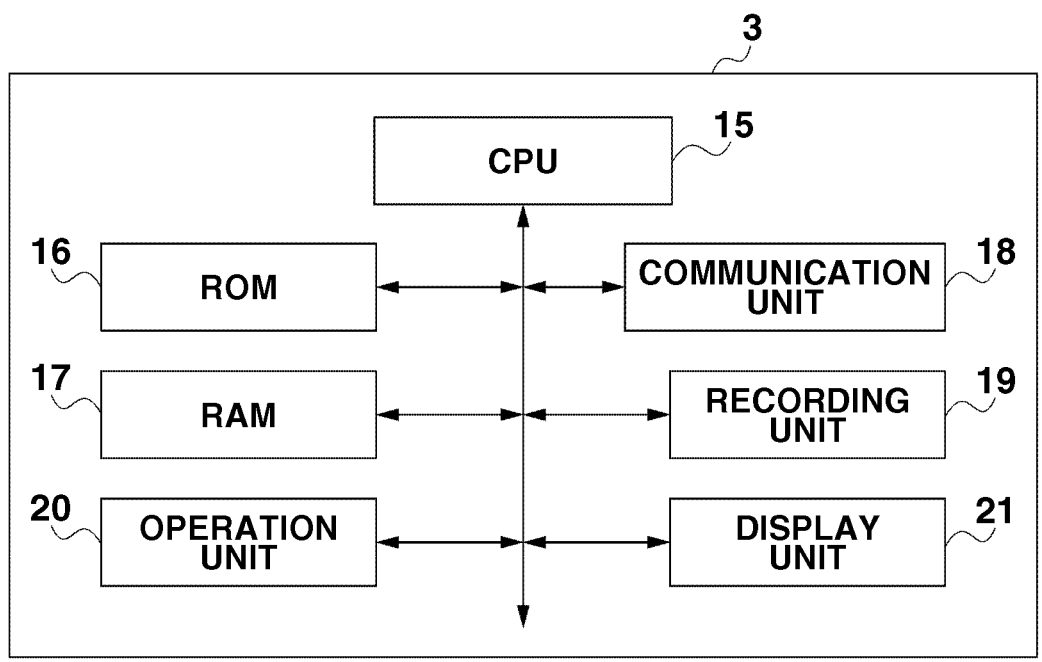

FIGS. 2A and 2B illustrate an exemplary hardware configuration of the PC and the printer according to the present exemplary embodiment. The PCs 1, 2, and 5 include hardware illustrated in FIG. 2A. In the present exemplary embodiment, the hardware configuration of the PC 1 will be described with reference to FIG. 2A, representing the hardware configuration of the PCs 1, 2, and 5.

Referring to FIG. 2A, the PC 1 includes a random access memory (RAM) unit (hereinafter simply referred to as a "RAM") 201, a hard disk drive (HDD) 202, a keyboard (KBD) 203, and a central processing unit (CPU) 204. In addition, the PC 1 includes a display (a liquid crystal display (LCD)) 205 and a network board (NB) 207. Furthermore, the PC 1 includes a bus 206. The RAM 201, the HDD 202, the KBD 203, the CPU 204, the LCD 205, and the NB 207 are in communication with one another via the bus 206.

The HDD 202 is an example of a storage unit. The KBD 203 is an example of an input unit. The CPU 204 is an example of a control unit. The LCD 205 is an example of a display unit. The NB 207 is an example of a communication control unit. A removable (portable) compact disc-read only memory (CD-ROM) or a built-in read-only memory (ROM) can be used as the storage unit.

Figure 4:
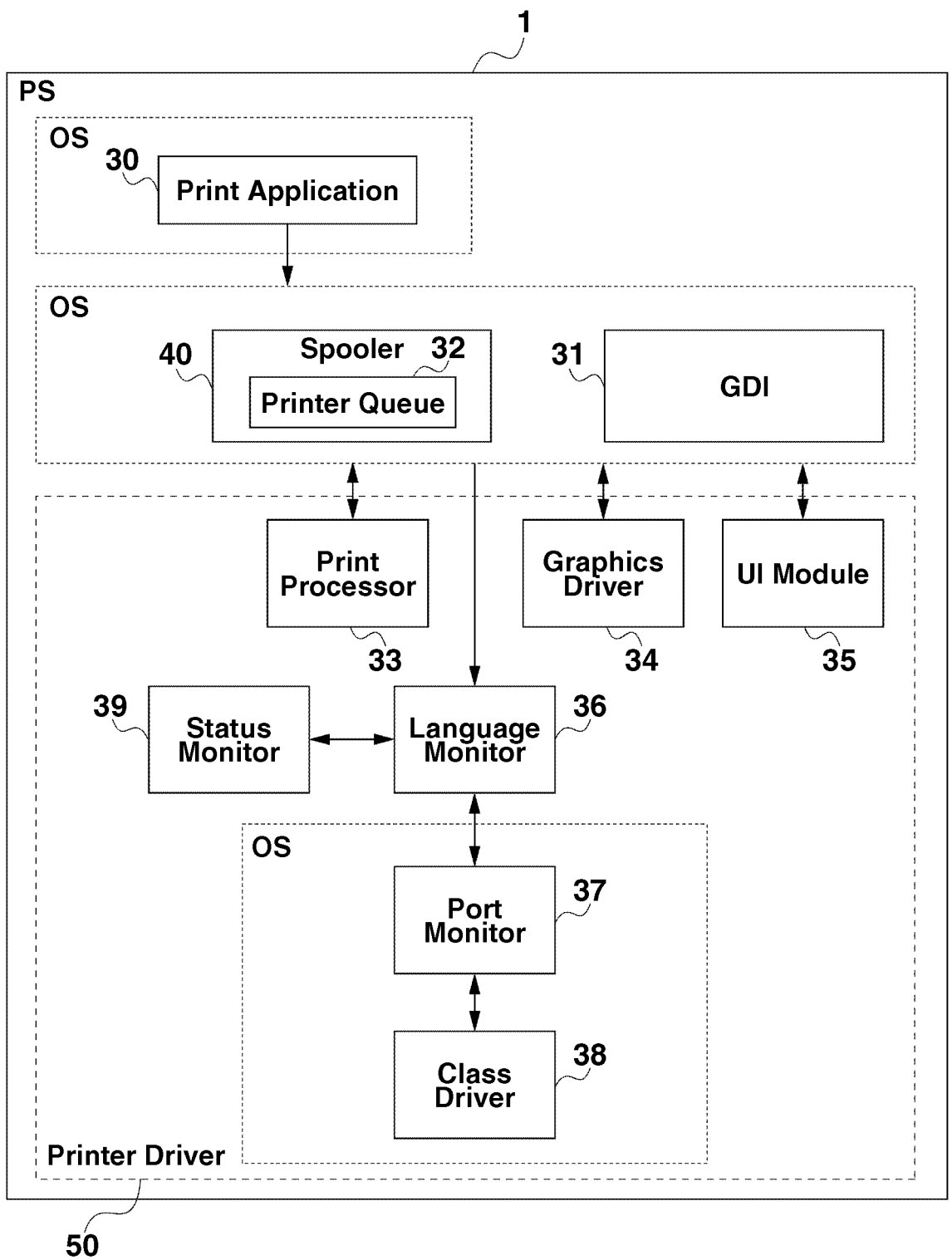
FIG. 4 illustrates an exemplary configuration of a printer driver of the PC.

Each module (software) illustrated in FIGS. 3 and 4 is stored on the HDD 202 and is loaded and executed by the CPU 204 on the RAM 201 where necessary. Thus, the CPU 204 implements a function of each module (software) illustrated in FIGS. 3 and 4. The printer 3 has the hardware configuration illustrated in FIG. 2B.

In the example illustrated in FIG. 2B, a CPU 15 includes a microprocessor. The CPU 15, which functions as a central processing unit of the printer 3, controls a RAM 17, a communication unit 18, a recording unit 19, an operation unit 20, and a display unit 21 according to a program stored on a ROM 16.

The ROM 16 stores a program used by the printer 3 for executing recording (printing) and a program used by the printer 3 to execute processing for notifying information about the status of print processing to the PC 1 under control of a printer driver 50, which will be described in detail below with reference to FIG. 4. The RAM 17 temporarily and primarily stores print data, which is transmitted from the PC 1 and based on which an image is printed by the recording unit 19.

The communication unit 18 includes the USB interface 7 and a connection port for connection via the network 4. The communication unit 18 controls communication by USB and Ethernet®. The recording unit 19 includes a recording unit and an electric circuit. The recording unit of the recording unit 19 includes an inkjet type recording head, each color ink, a carriage, and a recording paper conveyance mechanism. The electric circuit of the recording unit 19 includes an application specific integrated circuit (ASIC), which is used for generating a printing pulse at the recording head based on the print data.

By executing a printing operation by using an application capable of executing printing, a content to be displayed (image data) of a file opened by the application capable of printing (hereinafter simply referred to as a "print application") is temporarily stored on the HDD 202 of the PC 1 as a spool file of the Enhanced Metafile (EMF) format. The spool file is then converted by the printer driver 50 into print data including a command for controlling the printer 3. Furthermore, the print data is then transmitted to the printer 3 via the USB interface 7 or the network 4. The print data received by the printer 3 is converted by the recording unit 19 into a printing pulse and then is printed on a recording paper based on the printing pulse.

The operation unit 20 includes various buttons, such as a power button or a reset button. The user can execute a job by using the printer 3 by operating the operation unit 20. The display unit 21 includes a touch panel, which includes an LCD. The display unit 21 can display the status of the printer 3. Furthermore, the user can execute various settings via the display unit 21. In addition, the user can enter, display, and verify various settings on the display unit 21.

FIG. 3 illustrates an exemplary software configuration of the PC. Referring to FIG. 3, the PC 1 includes an Ethernet control stack 92, an Internet protocol (IP) network control stack 91, a WSD control stack 90, an IHV native protocol control stack 89, and an N-PnP control stack 88. The Ethernet control stack 92 controls Ethernet. The IP network control stack 91 controls an IP network. The WSD control stack 90 controls WSD. The IHV native protocol control stack 89 controls an IHV-unique protocol. The N-PnP control stack 88 controls Network Plug and Play (hereinafter simply referred to as "N-PnP").

Meanwhile, a standard function of Windows Vista® OS "Plug and Play Extensions (PnP-X)" exists as one of Plug and Play Extension functions for supporting network-connected devices. However, N-PnP is used in the present exemplary embodiment as a function equivalent to PnP-X. WSD application programming interfaces (APIs), which will be described in detail below and controls WSD, is included in the WSD control stack 90. APIs, which will be described in detail below and controls an IHV native protocol, is included in the IHV native protocol control stack 89.

Device drivers 85 includes standard drivers 87, which are included in the OS as standards, and IHV-manufactured drivers 86, which are provided by IHVs. An application/device driver interface (DDI) interface 84 includes an application programming interface (API) and a DDI. A print application 30 is an application capable of executing printing, which will be described in detail below with reference to FIG. 4. Applications 82 include the application 30.

In the example illustrated in FIG. 3, the PC 1 has the above-described configuration. However, the PC 5, whose OS installed thereon is a Windows XP® OS, includes the IHV native protocol control stack 89 but does not include the WSD control stack 90. Accordingly, if printing is instructed from the PC 5, the printing is executed by utilizing an IHV native protocol because the PC 5 cannot execute printing by utilizing the WSD Print Service.

FIG. 4 illustrates an example of a printer driver included in the PC. Referring to FIG. 4, the printer driver 50 is a driver for the printer 3, which is installed on the PC 1. The printer driver 50 includes a plurality of modules 33 through 36 and 39. The application (print application) 30, which is capable of executing printing, is equivalent to "Notepad" (Notepad.exe), which is a text editor included in the OS as standard.

A graphics device interface (GDI) 31 constitutes a part of the OS. A printer queue 32 is included in the spooler 40 as a part thereof. The printer queue 32 queues a print job. A queued print job is displayed in a printer queue folder (not illustrated).

A print processor 33 changes a print layout and executes special processing on an image to be printed. A graphics driver 34, which is a core component of the printer driver for image processing, executes image processing for printing according to a drawing command from the GDI 31 and generates a print control command.

A user interface (UI) module 35 provides and controls a UI of the printer driver. A language monitor 36 is a data communication interface (I/F) configured to control transmission and receipt of data. A status monitor 39 displays information about a status of the printer 3, such as the ink remaining amount, an issued warning, and error events.

A port monitor 37 transmits data received from the language monitor 36 to an appropriate port. In addition, the port monitor 37 receives data transmitted from the printer 3 via a class driver 38. In particular, a port monitor for controlling communication via USB is referred to as "USBMon". A port monitor for controlling the WSD Print Service is referred to as "WSDMon".

The class driver 38 is a low-level module provided closest to a port. In the present invention, the class driver 38 is equivalent to a WSD- or IHV-unique protocol printer class driver. The class driver 38 controls a port (in the present invention, a USB port or a network port). The printer driver 50 is manufactured by ABC Corporation, which is the manufacturer of the printer 3.

FIG. 5 illustrates a print calling sequence according to a conventional method. In the sequence illustrated in FIG. 5, it is supposed that the printer 3 cannot receive a plurality of print jobs at the same time but can receive one print job only.

Referring to FIG. 5, in processing S501, a user inputs an instruction for starting printing by using the application 30. Then, the OS calls a function StartPrintJob( ) of the spooler 40. In the function that has been already called in processing S502, the spooler 40, in processing S503, calls a function LM_StartDocPort( ) of the language monitor 36.

In the function having been called in processing S504, the language monitor 36, in processing S505, calls a function PM_StartDocPort( ) of the port monitor 37. In the function having been called in processing S506, the port monitor 37, in processing S507, executes appropriate corresponding processing where necessary. In processing S508, the port monitor 37 substitutes a return value pmRet with a result of the processing and the processing for the function ends. Then, the processing returns to the print job calling source. If the processing is normally executed, pmRet is substituted with a value "TRUE". On the other hand, if the processing is not normally executed, pmRet is substituted with a value "FALSE".

In processing S505, the language monitor 36 substitutes a return value lmRet with a return value of the function PM_StartDocPort( ). Then the processing for the function LM_StartDocPort( ) ends. In processing S509, the processing returns to the print job calling source.

In processing S503, the spooler 40 substitutes spRet with a return value of the function LM_StartDocPort( ). In processing S510, if the value of spRet is not "TRUE" (i.e., if the value of spRet has a value "FALSE"), then the processing returns to processing S503. In processing S503, the spooler 40 calls the function LM_StartDocPort( ) of the language monitor 36.

On the other hand, if spRet has the value "TRUE" in processing S510, then the processing advances to processing S511. In processing S511, the spooler 40 calls a function LM_WritePort( ) of the language monitor 36. In the function that has already been called in processing S512, the language monitor 36, in processing S513, calls a function PM_WritePort( ) of the port monitor 37.

In the function that has already been called in processing S514, the port monitor 37, in processing S515, calls a function CreatePrintJob( ) of the WSD APIs that controls WSD. In the function, the PC 1 inputs CreatePrintJobRequest of the WSD Print Service to the printer 3. The CreatePrintJobRequest includes detailed information about a print job.

In processing S516, after receiving the CreatePrintJobRequest, the printer 3 transmits CreatePrintJobResponse or a negative response Fault(ServerErrorNotAcceptingJobs) to the PC 1. More specifically, if the printer 3 can receive and has received a print job, the printer 3 returns CreatePrintJobResponse to the PC 1. On the other hand, if the printer 3 cannot receive the print job, the printer 3 returns Fault(ServerErrorNotAcceptingJobs) to the PC 1.

In processing S515, after receiving the CreatePrintJobResponse, the PC 1 substitutes the return value of the function CreatePrintJob( ) with a value "TRUE". Then, the processing returns to the print job calling source.

On the other hand, if the PC 1 has received the Fault (ServerErrorNotAcceptingJobs), the PC 1 substitutes the return value of the function CreatePrintJob( ) with a value "FALSE". In processing S515, the processing returns to the print job calling source.

In processing S515, the port monitor 37 substitutes the return value pmRet with the return value of the function CreatePrintJob( ). Then the processing for the function PM_WritePort( ) ends. In processing S517, the processing returns to the print job calling source.

In processing S513, the language monitor 36 substitutes a return value lmRet with the return value of the function PM_WritePort( ). Then, the processing for the function LM_WritePort( ) ends. In processing S518, the processing returns to the print job calling source.

In processing S511, the spooler 40 substitutes spRet with the return value of the function LM_WritePort( ). In processing S519, if spRet does not have a value "TRUE" (i.e., if the value of spRet has a value "FALSE"), then the processing returns to processing S511. In processing S511, the spooler 40 calls the function LM_WritePort( ) of the language monitor 36.

If spRet has the value "TRUE" in processing S519, the processing advances to processing for transmitting print data, which is executed by the spooler 40. In processing S520, the spooler 40 calls a function LM_EndDocPort( ) of the language monitor 36.

In the function that has already been called in processing S521, the language monitor 36, in processing S522, calls a function PM_EndDocPort( ) of the port monitor 37. In the function that has already been called in processing S523, the port monitor 37, in processing S524, executes appropriate corresponding processing where necessary. Furthermore, the port monitor 37 substitutes the return value pmRet with a result of the processing. Then the processing for the function ends. In processing S525, the processing returns to the print job calling source. If the processing is normally executed, pmRet is substituted with a value "TRUE". On the other hand, if the processing is not normally executed, pmRet is substituted with a value "FALSE".

In processing S522, the language monitor 36 substitutes the return value lmRet with the return value of the function PM_EndDocPort( ). Then, the processing for the function LM_EndDocPort( ) ends. In processing S526, the processing returns to the print job calling source.

In processing S520, the spooler 40 substitutes spRet with the return value of the function LM_EndDocPort( ). Then, the processing for the function StartPrintJob( ) ends. In processing S527, the processing returns to the print job calling source.

As described above, in the conventional method, the printer 3 is not capable of receiving all the print jobs input by a plurality of PCs in order of input of the print jobs. Accordingly, in this case, a print job input at a later timing may be printed before printing a print job input at an earlier timing.

FIGS. 6 and 16 illustrate an exemplary print calling sequence. The examples illustrated in FIGS. 6 and 16 illustrate a characteristic function of the present invention. In the present exemplary embodiment, it is supposed that the printer 3 is a low-cost printer that is capable of processing and printing one print job only but is capable of receiving a plurality of print jobs and processing and printing one of the plurality of print jobs.

Referring to FIG. 6, in processing S601, a user inputs an instruction for starting printing by using the application 30. Then, the OS calls a function StartPrintJob( ) of the spooler 40. In the function that has been already called in processing S602, the spooler 40, in processing S603, calls a function LM_StartDocPort( ) of the language monitor 36.

In the function having been called in processing S604, the language monitor 36, in processing S605, substitutes lmMultipleJobs with a value "FALSE" to initialize the lmMultipleJobs.

The lmMultipleJobs is a flag used within the language monitor 36. More specifically, a value "TRUE" is set to the lmMultipleJobs if the printer 3 has a function for receiving and serially processing a plurality of print jobs. On the other hand, a value "FALSE" is set to the lmMultipleJobs if the printer 3 does not include the function described above.

In processing S606, the language monitor 36 initializes lmRetry by substituting lmRetry with a value "0". The lmRetry is a variable used within the language monitor 36. The lmRetry indicates the number of times of retries of a print job request, which is input by the PC 1 to the printer 3.

In processing S607, the language monitor 36 initializes lmReceivedId by substituting lmReceivedId with a value "None". In processing S1607 and S1623 illustrated in FIG. 16, which will be described in detail later below, the lmReceivedId is substituted with a print reservation ID, which is input by the printer 3 when the printer 3 has received a reservation of a print job request. Subsequently, the language monitor 36 executes the same processing as the processing S505 through S509 (FIG. 5).

In processing S603, the spooler 40 substitutes spRet with the return value of the function LM_StartDocPort( ), which has been returned in the same processing as the processing S509. If spRet does not have a value "TRUE" (i.e., if spRet has a value "FALSE") in processing S608, then the processing returns to processing S603. In processing S603, the spooler 40 calls the function LM_StartDocPort( ) of the language monitor 36.

On the other hand, if spRet has a value "TRUE" in processing S608, then the processing advances to processing S1601 illustrated in FIG. 16. Processing for inputting a print job request and reserving a print job will be described in detail below with reference to FIG. 16.

In processing S609, the spooler 40 calls the function LM_EndDocPort( ) of the language monitor 36. In the function that has already been called in processing S610, the language monitor 36, in processing S611, initializes lmMultipleJobs by substituting lmMultipleJobs with a value "FALSE". In processing S612, the language monitor 36 initializes lmRetry by substituting the lmRetry with a value "0". In processing S613, the language monitor 36 initializes lmReceivedId by substituting lmReceivedId with a value "None".

Then, the language monitor 36 executes the same processing as the processing S522 through S525 illustrated in FIG. 5. Furthermore, the language monitor 36 ends the processing for the function LM_EndDocPort( ). In processing S614, the processing returns to the print job calling source.

In this processing, the language monitor 36 substitutes lmRet with the return value of the function PM_EndDocPort( ) by executing the same processing as the processing S522. In processing S614, the language monitor 36 returns the value of the lmRet as the return value of the function LM_EndDocPort( ).

In processing S609, the spooler 40 substitutes spRet with the return value of the function LM_EndDocPort( ). Then, the processing for the function StartPrintJob( ) ends. In processing S615, the processing returns to the print job calling source.

Referring to FIG. 16, in processing S1602, the spooler 40 calls the function LM_WritePort( ) of the language monitor 36. In the function that has been already called in processing S1603, the language monitor 36, in processing S1604, identifies a value of each of lmRetry and lmMultipleJobs.

If the value of lmRetry is greater than 0 and if lmMultipleJobs has a value "TRUE", then the processing advances to processing S1605. On the other hand, if the value of lmRetry is equal to 0 or if lmMultipleJobs does not have a value "TRUE" (i.e., if lmMultipleJobs has a value "FALSE" in processing S1605), then the processing advances to processing S1609.

In processing S1605, the language monitor 36 sets ans: ABCCommand as an argument. In addition, the language monitor 36 calls a function GetPrinterElements( ), which is a function of WSD APIs that controls WSD.

In the function, the PC 1 inputs GetPrinterElementsRequest of the WSD Print Service to the printer 3. After receiving the GetPrinterElementsRequest, in processing S1606, the printer 3 returns GetPrinterElementsResponse to the PC 1.

After the PC 1 has received the GetPrinterElementsResponse, in processing S1605, the PC 1 substitutes the return value of the function GetPrinterElements( ) with a value "TRUE". Then the processing returns to the print job calling source.

If the PC 1 has not received GetPrinterElementsResponse during a predetermined specific time period after a timing of inputting the GetPrinterElementsRequest to the printer 3, the PC 1 substitutes the return value of the function GetPrinter- Elements( ) with a value "FALSE". In processing S1605, the processing returns to the print job calling source.

In processing S1605, the language monitor 36 substitutes lmRet with the return value of the function GetPrinterElements( ). In the present exemplary embodiment, a case of an error event, in which "FALSE" is returned as the return value of the function GetPrinterElements, will not be described. The GetPrinterElementsRequest input by the PC 1 in processing S1605 and the GetPrinterElementsResponse which the printer 3 returns in response thereto will be described in detail below with reference to FIGS. 9 and 10.

In processing S1607, the language monitor 36 substitutes lmReceivedId with the value set to the element <ans:ReceivedId> 912 or 1011 included in GetPrinterElementsResponse, which has been received as the argument of the function GetPrinterElements( ) processed in S1605.

In processing S1627, the language monitor 36 verifies the value of lmReceivedId. If the value of lmReceivedId is "None" in processing S1627, then the processing advances to processing S1628. In processing S1628, the language monitor 36 initializes the number of retries of the print job request by substituting the lmRetry with a value "0". On the other hand, if the value of lmReceivedId is not "None" in processing S1629, the processing advances to processing S1608. In processing S1608, the language monitor 36 updates the number of retries of the print job request by substituting lmRetry with a value (lmRetry+1).

In processing S1609, the language monitor 36 calls a function PM_WritePort( ) of the port monitor 37. In the function that has already been called in processing S1610, the port monitor 37, in processing S1611, calls a function CreatePrintJob( ) of WSD APIs that controls WSD.

In the function, the PC 1 inputs CreatePrintJobRequest of the WSD Print Service to the printer 3. The CreatePrintJobRequest includes detailed information about the print job. In processing S1612, after receiving the CreatePrintJobRequest, the printer 3 returns CreatePrintJobResponse or Fault(ServerErrorNotAcceptingJobs), which is a negative response, to the PC 1.

More specifically, if the printer 3 can receive a print job and execute the print job and if the printer 3 has received the print job, the printer 3 returns CreatePrintJobResponse to the PC 1. On the other hand, if the printer 3 can receive a print job but cannot execute the print job and if the printer 3 has received the print job, then the printer 3 returns Fault (ServerErrorNotAcceptingJobs) to the PC 1. In addition, if the printer 3 cannot receive a print job, the printer 3 also returns Fault (ServerErrorNotAcceptingJobs) to the PC 1.

If the CreatePrintJobResponse has been received, the PC 1 substitutes the return value of the function CreatePrintJob( ) with a value "TRUE". In processing S1613, the processing returns to the print job calling source. On the other hand, if the PC 1 has received the Fault(ServerErrorNotAcceptingJobs), then the PC 1 substitutes the return value of the function CreatePrintJob( ) with a value "FALSE". In processing S1611, the processing returns to the print job calling source.

In addition, in processing S1611, the port monitor 37 substitutes the return value pmRet with the return value of the function CreatePrintJob( ). Then the processing for the function PM_WritePort( ) ends. In processing S1613, the processing returns to the print job calling source.

In processing S1609, the language monitor 36 substitutes the return value lmRet with the return value of the function PM_WritePort( ). In processing S1614, the language monitor 36 verifies the value of lmRet. If lmRet has a value "TRUE" in processing S1614, then the processing advances to processing S1625. On the other hand, if lmRet does not have a value "TRUE" (i.e., if lmRet has a value "FALSE") in processing S1614, then the processing advances to processing S1615. In processing S1615, the language monitor 36 verifies the value of lmRetry.

If lmRetry has a value "0" in processing S1615, then the processing advances to processing S1616. In processing S1616, the language monitor 36 sets wprt:PrinterDescription as the argument. In addition, in processing S1616, the language monitor 36 calls a function GetPrinterElements( ) which is a function of WSD APIs that controls WSD. In the function, the PC 1 inputs GetPrinterElementsRequest of the WSD Print Service to the printer 3.

The GetPrinterElementsRequest includes a function <wprt:Name>wprt:PrinterDescription</wprt:Name> 801. The function <wprt:Name>wprt:PrinterDescription</wprt:Name> 801 is a function necessary for the printer 3 to acquire a function <ans:MultipleJobsControl> 802. The function <ans:MultipleJobsControl> 802 includes information about whether the printer 3 is capable of receiving a plurality of print jobs. The function <wprt:Name>wprt:PrinterDescription</wprt:Name> 801 and the function <ans:MultipleJobsControl> 802 will be described in detail below with reference to FIGS. 8A and 8B, respectively.

If the GetPrinterElementsRequest has been received, in processing S1617, the printer 3 returns GetPrinterElementsResponse to the PC 1. If the PC 1 has received GetPrinterElementsResponse, the PC 1 substitutes the return value of the function GetPrinterElements( ) with a value "TRUE". In processing S1616, the processing returns to the print job calling source.

If the PC 1 has not received GetPrinterElementsResponse during a predetermined specific time period after a timing of inputting the GetPrinterElementsRequest to the printer 3, the PC 1 substitutes the return value of the function GetPrinterElements( ) with a value "FALSE". In processing S1616, the processing returns to the print job calling source.

In processing S1616, the language monitor 36 substitutes lmRet with the return value of the function GetPrinterElements( ). In the present exemplary embodiment, a case of an error event, in which "FALSE" is returned as the return value of the function GetPrinterElements, will not be described.

In processing S1618, the language monitor 36 determines whether the value set to the function <ans:MultipleJobsControl> 802 included in the GetPrinterElementsResponse, which has been received as the argument of the function GetPrinterElements( ), is "true". If a value "true" has been set to the function <ans:MultipleJobsControl> 802 in processing S1618, then the processing advances to processing S1619. In processing S1619, the language monitor 36 substitutes lmMultipleJobs with a value "TRUE".

If lmRetry has a value other than "0" in processing S1615, then the processing advances to S1620. In the present exemplary embodiment, a "value other than "0"" actually refers to an integer greater than 0 because the value input in substitution of lmRetry in processing S1608 and S1624 is an integer equal to or greater than 0.

If lmMultipleJobs has a value "TRUE" in processing S1620, then the processing advances to processing S1621. In processing S1621, the language monitor 36 sets ans:ABCCommand as the argument. In addition, the language monitor 36 calls a function GetPrinterElements( ), which is a function of WSD APIs that controls WSD. In the function, the PC 1 inputs GetPrinterElementsRequest of the WSD Print Service to the printer 3.

In processing S1622, if the GetPrinterElementsRequest has been received, the printer 3 returns GetPrinterElementsResponse to the PC 1. If the PC 1 has received GetPrinter- ElementsResponse, the PC 1 substitutes the return value of the function GetPrinterElements( ) with a value "TRUE". In processing S1621, the processing returns to the print job calling source.

If the PC 1 has not received GetPrinterElementsResponse during a predetermined specific time period after a timing of inputting the GetPrinterElementsRequest to the printer 3, the PC 1 substitutes the return value of the function GetPrinterElements( ) with a value "FALSE". In processing S1621, the processing returns to the print job calling source.

In processing S1621, the language monitor 36 substitutes lmRet with the return value of the function GetPrinterElements( ). In the present exemplary embodiment, a case of an error event, in which "FALSE" is returned as the return value of the function GetPrinterElements, will not be described. The GetPrinterElementsRequest input by the PC 1 in processing S1621 and the GetPrinterElementsResponse which the printer 3 returns in response thereto will be described in detail below with reference to FIGS. 9 and 10.

In processing S1623, the language monitor 36 substitutes lmReceivedId with the value set to the element <ans:ReceivedId> 912 or 1011 included in GetPrinterElementsResponse (i.e., a print reservation ID), which has been received as the argument of the function GetPrinterElements( ) processed in S1621.

In processing S1630, the language monitor 36 verifies the value of lmReceivedId. If the value of lmReceivedId is "None" in processing S1630, then the processing advances to processing S1631. In processing S1631, the language monitor 36 initializes the number of retries of the print job request by substituting the lmRetry with a value "0". On the other hand, if the value of lmReceivedId is not "None" in processing S1632, the processing advances to processing S1624. In processing S1624, the language monitor 36 updates the number of retries of the print job request by substituting lmRetry with a value (lmRetry+1).

If lmMultipleJobs does not have a value "TRUE" (i.e., if lmMultipleJobs has a value "FALSE") in processing S1620, then the processing advances to processing S1625. In processing S1625, the processing for the function LM_WritePort( ) ends. Then, the processing returns to the print job calling source. In this case, the value of lmRet is returned as the return value of the function LM_WritePort( ). In processing S1602, the spooler 40 substitutes spRet with the return value of the function LM_WritePort( ).

If spRet does not have a value "TRUE" (i.e., if the value of spRet has a value "FALSE") in processing S1626, then the processing returns to processing S1602. In processing S1602, the spooler 40 calls a function LM_WritePort( ) of the language monitor 36. On the other hand, if spRet has a value "TRUE" in processing S1626, then the spooler 40 advances to and executes the print data transmission processing illustrated in FIG. 7.

As described above, according to the present invention having the configuration described above, if a low-cost printer capable of processing and printing one print job only at the same time is used, the printer can serially receive print jobs input from a plurality of PCs and print the plurality of print jobs in order of receipt thereof. Accordingly, the present exemplary embodiment having the above-described configuration can prevent printing of a print job input at a later timing before printing a print job that has been input at an earlier timing.

Therefore, the present invention can implement a highly useful peripheral apparatus control system capable of correctly and appropriately printing print jobs in order of receipt of the print jobs.

FIG. 7 illustrates an example of a calling sequence executed to perform printing. If spRet has a value "TRUE" in processing S519 illustrated in FIG. 5 or processing S1626 illustrated in FIG. 16, the processing sequence illustrated in FIG. 7 starts. Referring to FIG. 7, in processing S701, the spooler 40 calls a function LM_WritePort( ) of the language monitor 36.

In the function that has been already called in processing S702, the language monitor 36, in processing S703, calls a function PM_WritePort( ) of the port monitor 37. In the function that has been already called in processing S704, the port monitor 37, in processing S705, calls a function SendDocument( ) of WSD APIs that controls WSD.

In the function, the PC 1 inputs SendDocumentRequest of the WSD Print Service to the printer 3. In addition, by using a message transmission optimization mechanism (MTOM), the PC 1 transmits print data including a print control command to the printer 3 as unprocessed bytes by using a Simple Object Access Protocol (SOAP) message. In processing S706, the printer 3 returns SendDocumentResponse, in response to the SendDocumentRequest, to the PC 1.

After the PC 1 has received the SendDocumentResponse and after all print data has been completely transmitted to the printer 3, the PC 1 substitutes the return value of the function SendDocument( ) with a value "TRUE". In processing S705, the processing returns to the print job calling source.

If the PC 1 has input SendDocumentRequest or if the PC 1 has received the SendDocumentResponse, and if any error occurs in this state, the PC 1 substitutes the return value of the function SendDocument( ) with a value "FALSE". In processing S705, the processing returns to the print job calling source.

In processing S705, the port monitor 37 substitutes the return value pmRet with the return value of the function SendDocument( ). Then, the processing for the function PM_WritePort( ) ends. In processing S707, the processing returns to the print job calling source.

In processing S703, the language monitor 36 substitutes the return value lmRet with the return value of the function PM_WritePort( ). Then, the processing for the function LM_WritePort( ) ends. In processing S708, the processing returns to the print job calling source.

In processing S701, the spooler 40 substitutes spRet with the return value of the function LM_WritePort( ). If spRet does not have a value "TRUE" (i.e., if the value of spRet is "FALSE") in processing S709, then the processing returns to processing S701. In processing S701, the spooler 40 calls the function LM_WritePort( ) of the language monitor 36. If spRet has a value "TRUE" in processing S709, then the processing advances to processing S520 illustrated in FIG. 5 or processing S609 illustrated in FIG. 6.

Figure 20:
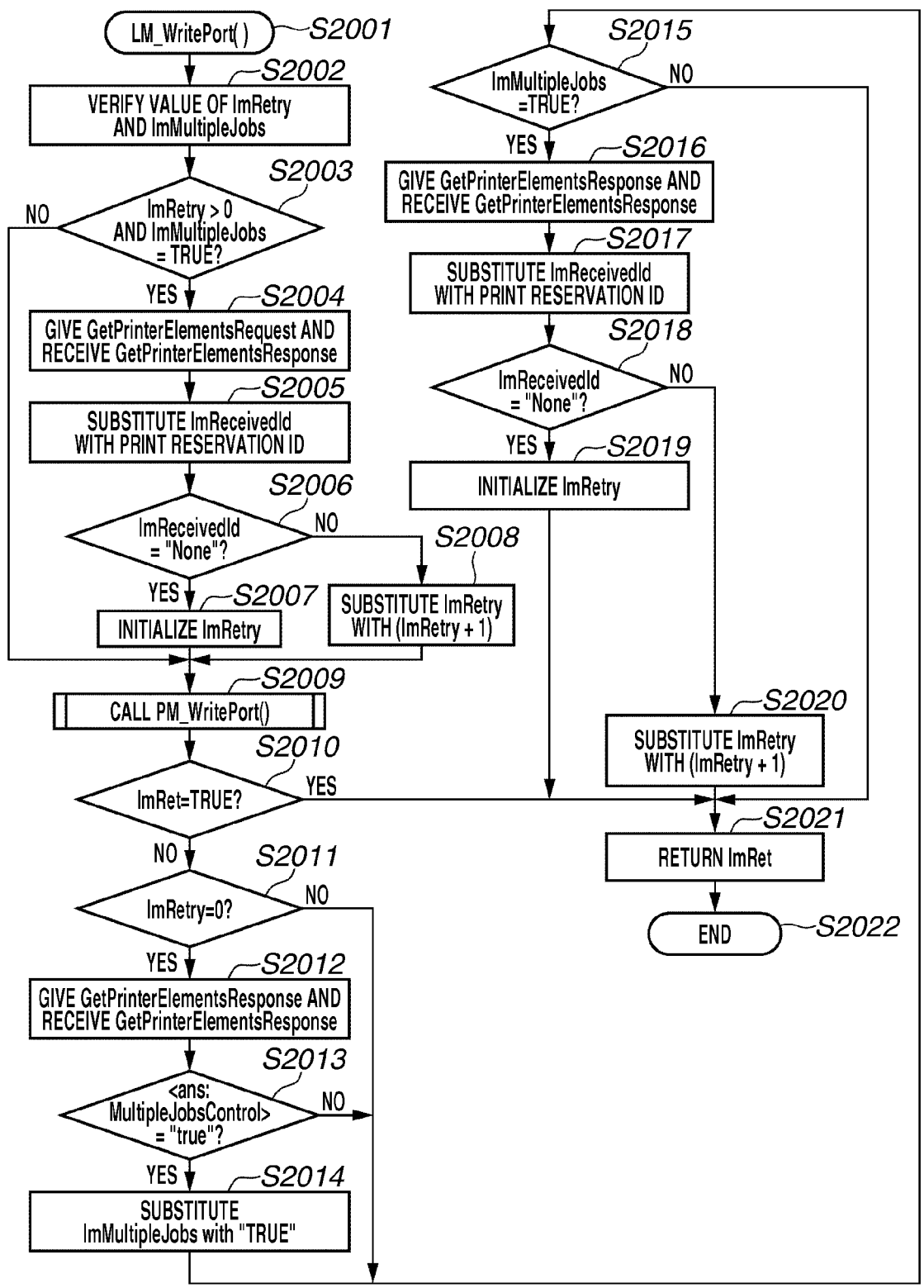
FIG. 20 is a flow chart illustrating an exemplary flow of processing executed by a language monitor to process a function LM_WritePort( ).

FIG. 20 is a flow chart illustrating an exemplary flow of processing executed by the language monitor 36 to process a function LM_WritePort( ). The exemplary program illustrated in FIG. 20 effectively illustrates a characteristic function of the present invention. The program of the processing illustrated in the flow chart of FIG. 20 is loaded and executed by the CPU 204 from the HDD 202 on the RAM 201.

When the spooler 40 calls the function LM_WritePort( ) of the language monitor 36 by executing the processing illustrated in FIG. 16, the processing illustrated in FIG. 20 starts. Referring to FIG. 20, in step S2001, the language monitor 36 starts the processing for the function LM_WritePort( ).

In step S2002, the language monitor 36 verifies the value of each of lmRetry and lmMultipleJobs. In step S2003, the language monitor 36 determines whether the value of lmRetry is greater than 0 and if the lmMultipleJobs has a value "TRUE".

If it is determined that the value of lmRetry is greater than 0 and if the lmMultipleJobs has a value "TRUE" (Yes in step S2003), then the processing advances to step S2004. On the other hand, if it is determined that the value of lmRetry is equal to 0 or if the lmMultipleJobs does not have a value "TRUE" (i.e., if the lmMultipleJobs has a value "FALSE") (No in step S2003), then the processing advances to step S2009.

In step S2004, the language monitor 36 sets ans:ABCCommand as the argument. In addition, the language monitor 36 calls the function GetPrinterElements( ) which is a function of WSD APIs that controls WSD.

In step S2004, in the function, the PC 1 inputs GetPrinterElementsRequest of the WSD Print Service to the printer 3. After receiving the GetPrinterElementsRequest, the printer 3 returns GetPrinterElementsResponse to the PC 1 (processing S1606 illustrated in FIG. 16 and step S1319 illustrated in FIG. 13).

If the PC 1 has received GetPrinterElementsResponse, the PC 1 substitutes the return value of the function GetPrinterElements( ) with a value "TRUE". In step S2004, the processing returns to the language monitor 36, which is the print job calling source.

If the PC 1 has not received GetPrinterElementsResponse during a predetermined specific time period after a timing of inputting the GetPrinterElementsRequest to the printer 3, the PC 1 substitutes the return value of the function GetPrinterElements( ) with a value "FALSE". In step S2004, the processing returns to the language monitor 36, which is the print job calling source.

Furthermore, in step S2004, the language monitor 36 substitutes lmRet with the return value of the function GetPrinterElements( ). In the present exemplary embodiment, a case of an error event, in which "FALSE" is returned as the return value of the function GetPrinterElements, will not be described. The GetPrinterElementsRequest input by the PC 1 in processing S2004 and the GetPrinterElementsResponse which the printer 3 returns in response thereto will be described in detail below with reference to FIGS. 9 and 10.

In step S2005, the language monitor 36 substitutes lmReceivedId with the value set to the element <ans:ReceivedId> 912 or 1011 included in GetPrinterElementsResponse, which has been received as the argument of the function GetPrinterElements( ) processed in S2004. In step S2006, the language monitor 36 determines whether the value of lmReceivedId is "None". If the value of lmReceivedId is "None" (Yes in step S2006), then the processing advances to step S2007. On the other hand, if it is determined that the value of lmReceivedId is not "None" (No in step S2006), then the processing advances to step S2008.

In step S2007, the language monitor 36 initializes the number of retries of the print job request by substituting lmRetry with a value "0". In step S2008, the language monitor 36 updates the number of retries of the print job request by substituting lmRetry with a value (lmRetry+1).

In step S2009, the language monitor 36 calls the function PM_WritePort( ) of the port monitor 37. The processing executed by the port monitor 37 in the function will be described in detail below with reference to FIG. 21A. In step S2009, the language monitor 36 substitutes the return value lmRet with the return value of the function PM_WritePort( ).

In step S2010, the language monitor 36 determines whether the value of lmRet is "TRUE". If it is determined that the value of lmRet is "TRUE" (Yes in step S2010), then the processing advances to step S2021. On the other hand, if it is determined that the value of lmRet is not "TRUE" (i.e., if the value of lmRet is "FALSE") (No in step S2010), then the processing advances to step S2011.

In step S2011, the language monitor 36 determines whether the value of lmRetry is "0". If it is determined that the value of lmRetry is "0" (Yes in step S2011), then the processing advances to step S2012. On the other hand, if the value of lmRetry is a value other than "0" (No in step S2011), then the processing advances to step S2015. More specifically, because the value substituted into lmRetry in steps S2008 and S2020 is an integer equal to or greater than 0, the processing actually advances to step S2015 if the value of lmRetry is an integer greater than 0.

In step S2112, the language monitor 36 sets wprt:PrinterDescription as the argument. In addition, the language monitor 36 calls the function GetPrinterElements( ), which is a function of WSD APIs that controls WSD.

In step S2012, in the function, the PC 1 inputs GetPrinterElementsRequest of the WSD Print Service to the printer 3. The GetPrinterElementsRequest includes a function <wprt:Name>wprt:PrinterDescription</wprt:Name> 801. The function <wprt:Name>wprt:PrinterDescription</wprt:Name> 801 is a function necessary for the printer 3 to acquire a function <ans:MultipleJobsControl> 802. The function <ans:MultipleJobsControl> 802 includes information about whether the printer 3 is capable of receiving a plurality of print jobs. The function <wprt:Name>wprt:PrinterDescription</wprt:Name> 801 and the function <ans:MultipleJobsControl> 802 will be described in detail below with reference to FIGS. 8A and 8B, respectively.

In step S2012, similarly to the processing in S1617 (FIG. 16) and S1319 (FIG. 13), if the GetPrinterElementsRequest has been received, the printer 3 returns GetPrinterElementsResponse to the PC 1. If the PC 1 has received GetPrinterElementsResponse, the PC 1 substitutes the return value of the function GetPrinterElements( ) with a value "TRUE". Furthermore, the processing returns to the language monitor 36, which is the print job calling source.

If the PC 1 has not received GetPrinterElementsResponse during a predetermined specific time period after a timing of inputting the GetPrinterElementsRequest to the printer 3, the PC 1 substitutes the return value of the function GetPrinterElements( ) with a value "FALSE". In step S2012, the processing returns to the language monitor 36, which is the print job calling source. In the present exemplary embodiment, a case of an error event, in which "FALSE" is returned as the return value of the function GetPrinterElements, will not be described.

In step S2013, the language monitor 36 determines whether the value set to the function <ans:MultipleJobsControl> 802 included in the GetPrinterElementsResponse, which has been received as the argument of the function GetPrinterElements( ), is "true". If it is determined that the value "true" has been set to the function <ans:MultipleJobsControl> 802 (Yes in step S2013), then the processing advances to step S2014. On the other hand, if it is determined that a value other than "true" has been set to the function <ans:MultipleJobsControl> 802 (No in step S2013), then the processing advances to step S2015.

In step S2014, the language monitor 36 substitutes lmMultipleJobs with a value "TRUE". In step S2015, the language monitor 34 determines whether the value of lmMultipleJobs is "TRUE". If it is determined that the value of lmMultipleJobs is "TRUE" (Yes in step S2015), then the processing advances to step S2016. On the other hand, if it is determined that the value of lmMultipleJobs is not "TRUE" (i.e., if the value of lmMultipleJobs is "FALSE") (No in step S2015), then the processing advances to step S2021.

In step S2016, the language monitor 36 sets ans:ABCCommand as the argument. In addition, the language monitor 36 calls the function GetPrinterElements( ), which is a function of WSD APIs that controls WSD.

Figure 13:
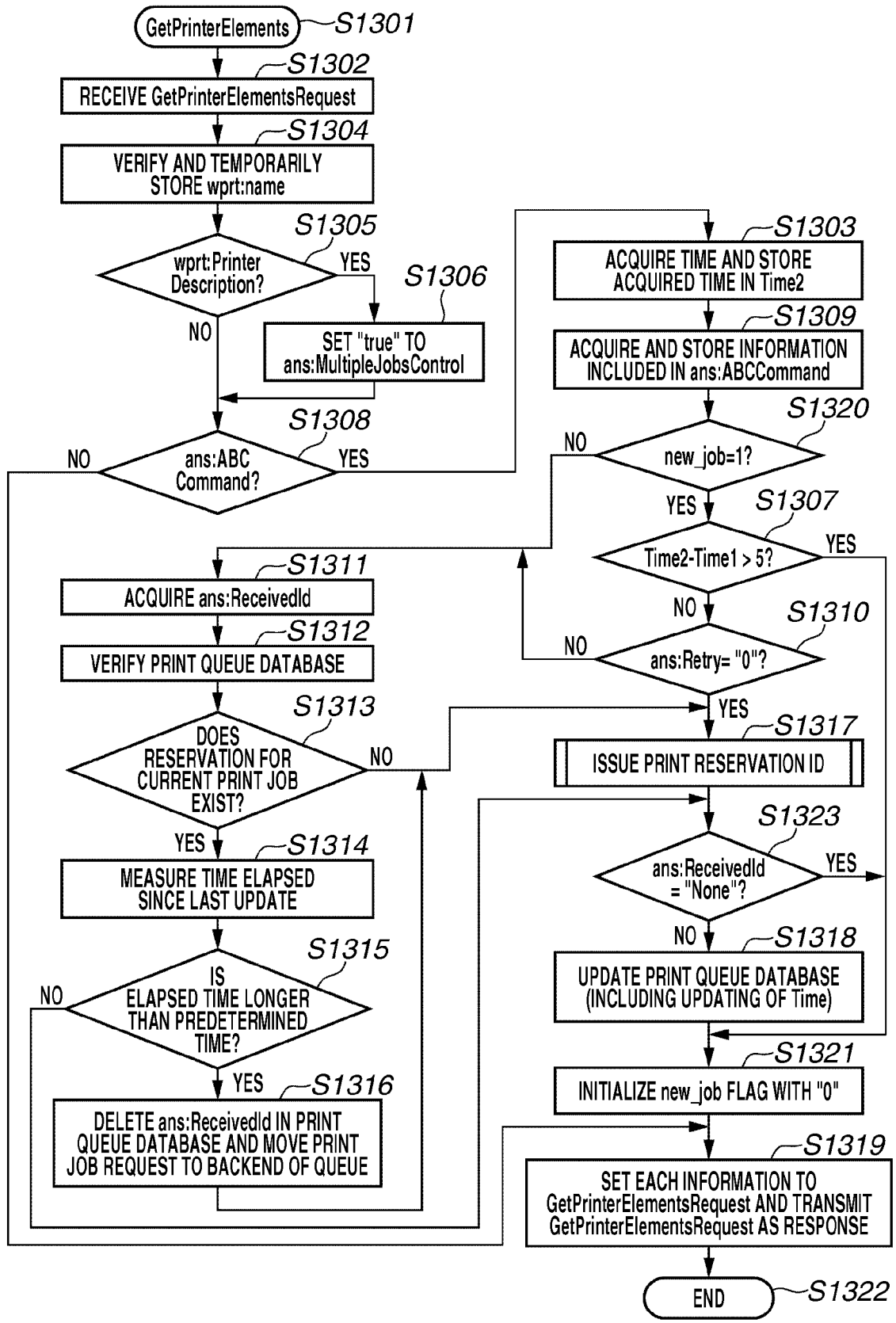
FIG. 13 is a flow chart illustrating an exemplary flow of processing executed by the printer according to a GetPrinterElements command.

More specifically, in step S2016, in the function, the PC 1 inputs GetPrinterElementsRequest of the WSD Print Service to the printer 3 similarly to processing S1622 (FIG. 16) and step S1319 (FIG. 13). If the PC 1 has received GetPrinterElementsResponse, the PC 1 substitutes the return value of the function GetPrinterElements( ) with a value "TRUE". Then, the processing returns to the language monitor 36, which is the print job calling source.

If the PC 1 has not received GetPrinterElementsResponse during a predetermined specific time period after inputting the GetPrinterElementsRequest to the printer 3, the PC 1 substitutes the return value of the function GetPrinterElements( ) with a value "FALSE". In step S2016, the processing returns to the language monitor 36, which is the print job calling source.

Furthermore, in step S2016, the language monitor 36 substitutes lmRet with the return value of the function GetPrinterElements( ). In the present exemplary embodiment, a case of an error event, in which "FALSE" is returned as the return value of the function GetPrinterElements, will not be described. The GetPrinterElementsRequest input by the PC1 in processing S2016 and the GetPrinterElementsResponse which the printer 3 returns in response thereto will be described in detail below with reference to FIGS. 9 and 10.

In step S2017, the language monitor 36 substitutes lmReceivedId with the value set to the element <ans:ReceivedId> 912 or 1011 included in GetPrinterElementsResponse, which has been received as the argument of the function GetPrinterElements( ) processed in S2016. In step S2018, the language monitor 36 determines whether the value of lmReceivedId is "None". If the value of lmReceivedId is "None" (Yes in step S2018), then the processing advances to step S2019. On the other hand, if it is determined that the value of lmReceivedId is not "None" (No in step S2018), then the processing advances to step S2020.

In step S2019, the language monitor 36 initializes the number of retries of the print job request by substituting lmRetry with a value "0". In step S2020, the language monitor 36 updates the number of retries of the print job request by substituting lmRetry with a value (lmRetry+1).

In step S2021, the language monitor 36 returns lmRet to the spooler 40 as the return value of the function LM_WritePort( ). Then, the processing for the function LM_WritePort( ) ends. In step S2022, the processing returns to the spooler 40, which is the print job calling source.

Figure 21A:
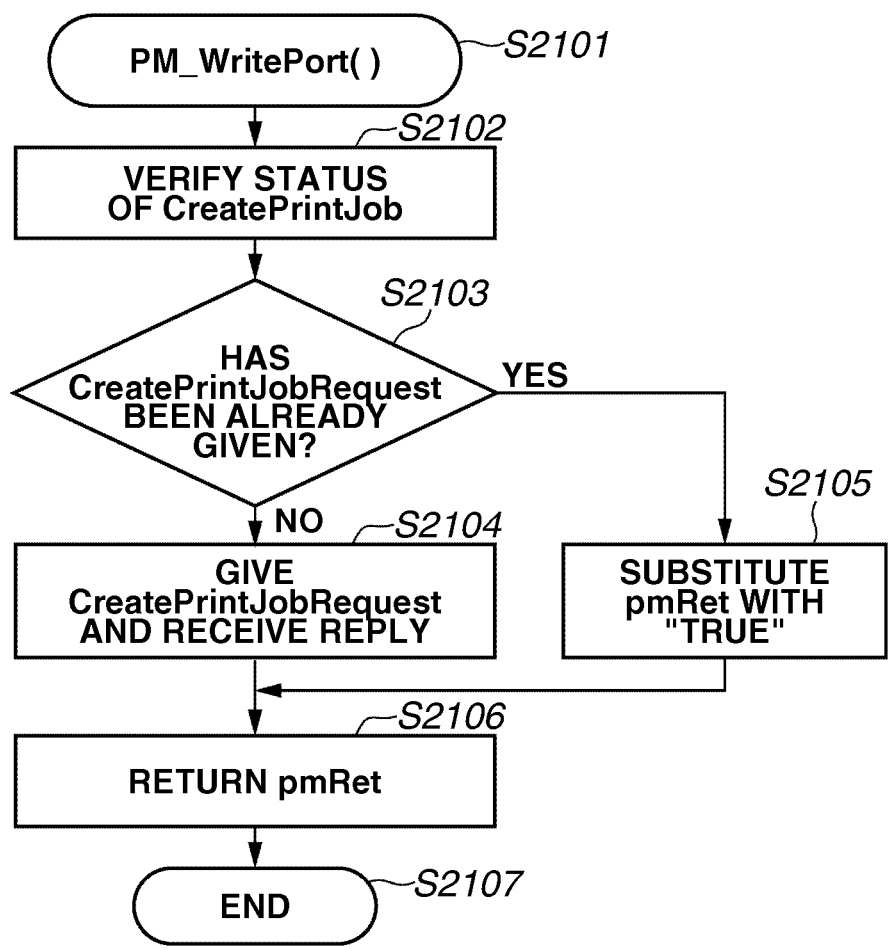
FIGS. 21A and 21B are flow charts illustrating an exemplary flow of processing executed by a port monitor to process a function PM_WritePort( ).
Figure 21B:
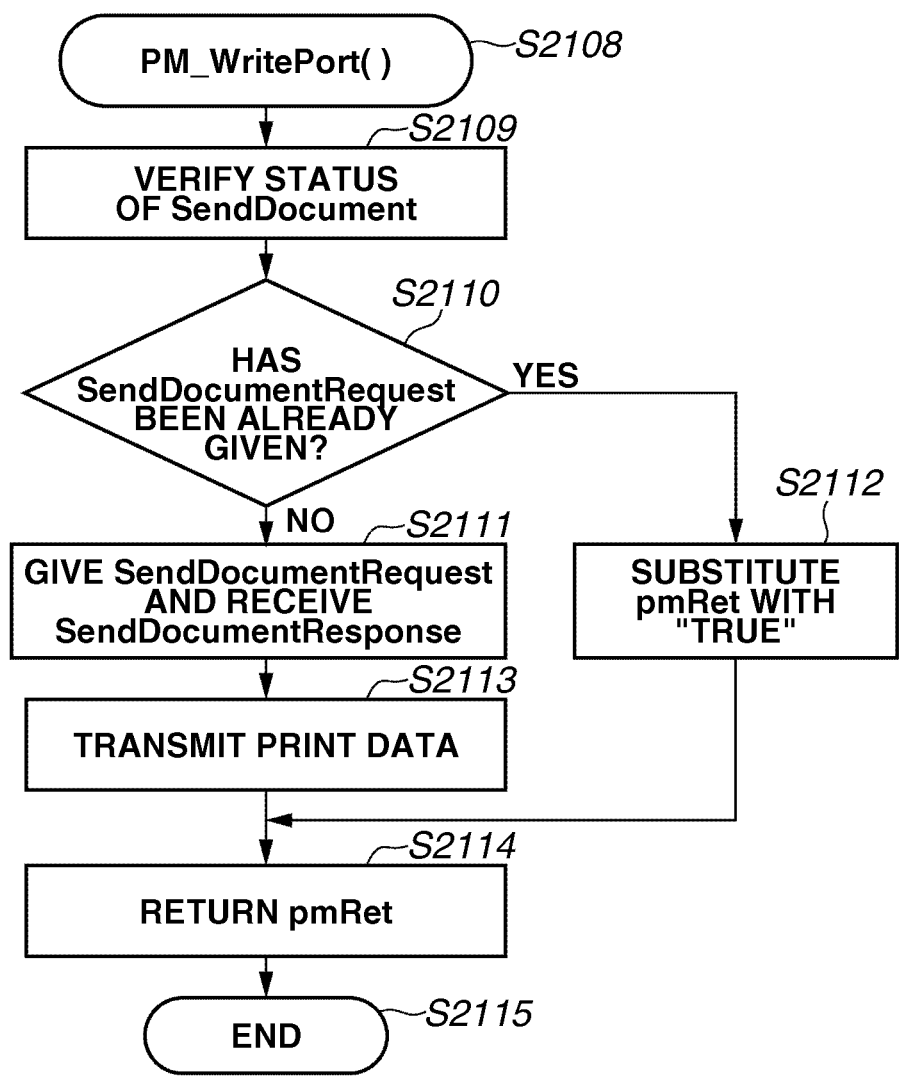

FIGS. 21A and 21B are flow charts illustrating an example of processing for the function PM_WritePort( ), which is executed by the port monitor 37. The program of the processing illustrated in the flow chart of FIGS. 21A and 21B is loaded and executed by the CPU 204 from the HDD 202 on the RAM 201.

After the language monitor 36 has called the function PM_WritePort( ) of the port monitor 37 in step S2009 (FIG. 20), then the processing illustrated in FIG. 21A starts. Referring to FIG. 21A, in step S2101, the port monitor 37 starts the processing for the function PM_WritePort( ).

In step S2102, the port monitor 37 verifies the status of CreatePrintJob. In step S2103, the port monitor 37 determines whether CreatePrintJobResponse has been received in response to an input CreatePrintJobRequest. If it is determined that CreatePrintJobResponse has been already received (Yes in step S2103), then the processing advances to step S2105. On the other hand, if it is determined that CreatePrintJobResponse has not been received yet (No in step S2103), then the processing advances to step S2104.

In step S2105, the port monitor 37 substitutes the return value pmRet with a value "TRUE". In step S2104, the port monitor 37 calls the function CreatePrintJob( ) of WSD APIs that controls WSD. In step S2104, in the function, the PC 1 inputs CreatePrintJobRequest of the WSD Print Service to the printer 3. The CreatePrintJobRequest includes detailed information about the print job.

Similar to the processing in S1612 (FIG. 16), after receiving the CreatePrintJobRequest, the printer 3 returns CreatePrintJobResponse or Fault(ServerErrorNotAcceptingJobs), which is a negative response, to the PC 1. To paraphrase this, similar to the processing in S1612 (FIG. 16), More specifically, if the printer 3 can receive a print job and execute the print job and if the printer 3 has received the print job, the printer 3 returns CreatePrintJobResponse to the PC 1. On the other hand, if the printer 3 can receive a print job but cannot execute the print job and if the printer 3 has received the print job, then the printer 3 returns Fault(ServerErrorNotAcceptingJobs) to the PC 1. In addition, if the printer 3 cannot receive a print job, the printer 3 also returns Fault(ServerErrorNotAcceptingJobs) to the PC 1.

If the CreatePrintJobResponse has been received, the PC 1 substitutes the return value of the function CreatePrintJob( ) with a value "TRUE". In step S2104, the processing returns to the port monitor 37, which is the print job calling source. On the other hand, if the PC 1 has received the Fault(ServerErrorNotAcceptingJobs), then the PC 1 substitutes the return value of the function CreatePrintJob( ) with a value "FALSE". In step S2104, the processing returns to the port monitor 37, which is the print job calling source. In addition, in step S2104, the port monitor 37 substitutes the return value pmRet with the return value of the function CreatePrintJob( ).

In step S2106, the port monitor 37 returns pmRet to the language monitor 36 as the return value of the function PM_WritePort( ). Then, the processing for the function PM_WritePort( ) ends. In step S2107, the processing returns to the language monitor 36, which is the print job calling source.

After the language monitor 36 has called the function PM_WritePort( ) of the port monitor 37 in processing S703 (FIG. 7), then the processing illustrated in FIG. 21B starts. Referring to FIG. 21B, in step S2108, the port monitor 37 starts the processing for the function PM_WritePort( ).

In step S2109, the port monitor 37 verifies the status of SendDocument. In step S2110, the port monitor 37 determines whether SendDocumentResponse has already been received in response to an input SendDocumentRequest. If it is determined that SendDocumentResponse has already been received in response to an input SendDocumentRequest (Yes in step S2110), then the processing advances to step S2112. On the other hand, if it is determined that SendDocumentResponse has not been received (No in step S2110), then the processing advances to step S2111.

In step S2112, the port monitor 37 substitutes the return value pmRet with a value "TRUE". In step S2111, the port monitor 37 calls the function SendDocument( ) of WSD APIs that controls WSD, similarly to the processing S705 in FIG. 7.

In step S2111, in the function, the PC 1 inputs SendDocumentRequest of the WSD Print Service to the printer 3. In addition, in step S2111, by using MTOM message encoding, the PC 1 transmits print data including a print control command to the printer 3 as an unprocessed byte by using the SOAP message. In addition, in step S2111, the printer 3 returns SendDocumentResponse to the PC 1 in response to SendDocumentRequest, similar to the processing in S706 illustrated in FIG. 7.

If any error has occurred when the PC 1 inputs SendDocumentRequest or receives SendDocumentResponse, the PC 1 substitutes the return value of the function SendDocument( ) with a value "FALSE". Furthermore, in step S2111, the processing returns to the print job calling source. Moreover, in step S2111, the port monitor 37 substitutes the return value pmRet with the return value of the function SendDocument( ).

In step S2113, after the PC 1 has received the SendDocumentResponse and if all print data has been completely transmitted to the printer 3, the PC 1 substitutes the return value of the function SendDocument( ) with a value "TRUE". In step S2113, the processing returns to the port monitor 37, which is the print job calling source. In addition, in step S2113, the port monitor 37 substitutes the return value pmRet with the return value of the function SendDocument( ).

In step S2114, the port monitor 37 returns pmRet to the language monitor 36 as the return value of the function PM_WritePort( ). In step S2115, the processing for the function PM_WritePort( ) ends and returns to the language monitor 36, which is the print job calling source.

FIGS. 8A and 8B, 9A and 9B, and 10A and 10B illustrate an example of a content of GetPrinterElements. FIGS. 11A and 11B illustrate an example of a content CreatePrintJob. A GetPrinterElements operation is usually utilized to acquire information about a printer. A CreatePrintJob operation is a print job start request.

The general content of the GetPrinterElements and CreatePrintJob is defined by the WSD Print Service Definition Version 1.0. Accordingly, the detailed description thereof will be omitted in the present exemplary embodiment.

FIGS. 11A and 11B illustrate an exemplary content of CreatePrintJob. More specifically, FIG. 11A illustrates an example of CreatePrintJobRequest, which is a job request. FIG. 11B illustrates an example of CreatePrintJobResponse.

FIG. 11A illustrates an example of CreatePrintJobRequest. In the example illustrated in FIG. 11A, the CreatePrintJobRequest is input by the PC 1 to the printer 3. Referring to FIG. 11A, a description 1105 defines a name space of the WSD Print Service as a name space name wprt. The name space name wprt is effective within public information defined by the WSD Print Service Definition Version 1.0.

In the drawing to be described below, the name space name wprt is handled in the similar manner. In other words, in the drawing to be described below, the name space name wprt is effective within the public information defined by the WSD Print Service Definition Version 1.0.

An element <wprt:JobDescription> 1101, which is the public information, includes information about a print job. A element <wprt:JobName> 1102 is the public information, to which a print job name is set. In the example illustrated in FIG. 11A, a print job name "Photo2" is set.

the element <wprt:JobOriginatingUserName> 1103 is the public information to which the name of a user who has input the print job is set. In the example illustrated in FIG. 11A, a user name "Natsu" is set.

FIG. 11B illustrates an example of CreatePrintJobResponse. In the example illustrated in FIG. 11B, CreatePrintJobResponse is a response returned from the printer 3 to the PC 1. Referring to FIG. 11B, an element <wprt:JobId> 1104 is the public information. When a print job has been requested by the PC 1 by inputting CreatePrintJobRequest and if the printer 3 has received the print job, a job ID input by the printer 3 to identify the print job is set to the element <wprt:JobId> 1104. In the example illustrated in FIG. 11B, a job ID "1234" is set.

FIGS. 8A and 8B illustrate an example of a content GetPrinterElements. More specifically, FIG. 8A illustrates an example of GetPrinterElementsRequest. FIG. 8B illustrates an example of GetPrinterElementsResponse.

FIG. 8A illustrates an example of GetPrinterElementsRequest. In the example illustrated in FIG. 8A, GetPrinterElementsRequest is input by the PC 1 to the printer 3. Referring to FIG. 8A, an element <wprt:Name> 801 is public information. In the example illustrated in FIG. 8A, a value "wprt:PrinterDescription" is set to the function <wprt:Name>wprt:PrinterDescription</wprt:Name> 801.

FIG. 8B illustrates an example of GetPrinterElementsResponse. In the example illustrated in FIG. 8B, GetPrinterElementsResponse is returned to the PC 1 from the printer 3. If the printer 3 has received GetPrinterElementsRequest including the element <wprt:Name> 801, to which wprt:PrinterDescription has been set, the printer 3 returns wprt:PrinterDescription to the PC 1 included in GetPrinterElementsResponse.

In the example illustrated in FIG. 8B, a description 806 defines a name space of a Print Service that utilizes a WSD of ABC Corporation as a name space name ans. The name space name ans is effective within the private information defined by the Print Service that utilizes the WSD of ABC Corporation. In the drawing to be described below, the name space name ans is handled in the similar manner. In other words, in the drawing to be described below, the name space name ans is effective within the private information defined by the Print Service that utilizes the WSD of ABC Corporation.

An element <wprt:ElementData> 803 is public information, to which wprt:PrinterDescription included in the public information is set as a Name attribute thereof. This indicates that the GetPrinterElementsResponse includes wprt:PrinterDescription designated by using the element <wprt:Name> 801.

An element <wprt:PrintDescription> 805, which is the public information, includes information about a function of the printer 3. An element <wprt:DeviceId> 804 is the public information. Data (a text string) defined in Institute of Electrical and Electronic Engineers (IEEE) 1284-2000 Device ID is set to the element <wprt:DeviceId> 804. The element <wprt:DeviceId> 804 indicates a device ID of the printer 3. More specifically, in the example illustrated in FIG. 8B, a device ID "MFG:ABC;CMD:ABCCommand;MDL:Kmmn; CLS:PRINTER;DES:ABC Kmmn;VER:1.00;INFO:000;" is set to the element <wprt:DeviceId> 804.

The function <ans:MultipleJobsControl> 802, which is the private information, describes whether the printer 3 includes a function for controlling a plurality of print jobs. If the printer 3 includes the function for controlling a plurality of print jobs, the printer 3 is capable of receiving a plurality of print jobs and process and print one print job of the plurality of print jobs.

If the printer 3 includes the function for controlling a plurality of print jobs, a value "true" is set to the function <ans:MultipleJobsControl> 802. On the other hand, if the printer 3 does not include the function for controlling a plurality of print jobs, a value "false" is set to the function <ans:MultipleJobsControl> 802.

FIGS. 9A and 9B illustrates an example of a content of GetPrinterElements. More specifically, FIG. 9A illustrates an example of GetPrinterElementsRequest. FIG. 9B illustrates an example of GetPrinterElementsResponse.

FIG. 9A illustrates an example of GetPrinterElementsRequest. The exemplary program illustrated in FIG. 9A most effectively illustrates characteristics of the present invention. The GetPrinterElementsRequest illustrated in FIG. 9A is input by the PC 1 to the printer 3.

Referring to FIG. 9A, to an element <wprt:Name> 903, which is the public information, ans:ABCCommand is set as the value thereof. The ans:ABCCommand is the private information. An element <ans:ABCCommand> 904, which is the private information, includes an element <ans:SplJobId> 905, an element <ans:ReceivedId> 906, an element <ans:Retry> 901, an element <ans:OS Version> 907, and an element <ans:DateTime> 908.

All of the elements 905, 906, 901, 907, and 908 are private information. The language monitor 36 sets an appropriate value to the elements 905, 906, 901, 907, and 908 of the GetPrinterElementsRequest.

The language monitor 36 transmits a value (job ID), which has been set to the third argument JobId transferred when the spooler 40 has called the function LM_StartDocPort( ) in the processing in S503 (FIG. 5) and S603 (FIG. 6), to the element <ans:SplJobId> 905. The job ID transferred from the spooler 40 to the language monitor 36 has been input by the OS of the PC 1. Accordingly, the value set to the element <ans:SplJobId> 905 is different from the job ID input by the printer 3 and set to the element <wprt:JobId> 1104. In the example illustrated in FIG. 9A, a value "5" is set to the element <ans:SplJobId> 905.

The function LM_StartDocPort( ) has the following specification:

```
BOOL WINAPI LM_StartDocPort (
    HANDLE hPort,
    LPWSTR pPrinterName,
    DWORD JobId,
    DWORD Level,
    LPBYTE pDocInfo
);
```

—Parameters— hPort:Caller-supplied port handle.

pPrinterName:Caller-supplied pointer to a string containing the printer name.

JobId:Caller-supplied, spooler-assigned job identifier.

Level:Caller-supplied value indicating the type of structure pointed to by pDocInfo.

Possible values are as follows:

| Level | pDocInfo |
|---|---|
| 1 | DOC_INFO_1 |
| 2 | DOC_INFO_2 | pDocInfo:Caller-supplied pointer to a DOC_INFO_1 or DOC_INFO_2 structure. These structures are described in the Microsoft Windows SDK documentation.

—Return Value—

If the operation succeeds, the function should return TRUE. Otherwise it should return FALSE.

The function PM_WritePort( ), which is an interface for the language monitor 36 and the port monitor 37, has the following specification:

```
BOOL WINAPI PM_WritePort (
    HANDLE hPort,
    LPBYTE pBuffer,
    DWORD cbBuf,
    LPDWORD pcbWritten
);
```

—Parameters— hPort:Caller-supplied port handle.

pBuffer:Caller-supplied pointer to a buffer containing data to be written to the port.

cbBuf:Caller-supplied size, in bytes, of pBuffer.

pcbWritten:Caller-supplied pointer to a location to receive the number of bytes successfully written to the port.

—Return Value—

If the operation succeeds, the function should return TRUE. Otherwise it should return FALSE.

In processing S515 (FIG. 5) and processing S1611 (FIG. 16) and in step S2102 illustrated in FIG. 21A, the port monitor 37 calls CreatePrintJob( ) of WSD APIs that controls WSD. However, the value set to each of the element <wprt:JobName> 1102 (FIG. 11A), the element <wprt:JobOriginatingUserName> 1103 (FIG. 11A), and the element <wprt:JobId> 1104 (FIG. 11B) is not transmitted as the argument of the function PM_WritePort( ). Accordingly, the language monitor 36 cannot refer to or change the value set to the element 1102, 1103, or 1104. Due to the same reason, the language monitor 36 cannot add the elements 905, 906, 901, 907, and 908, which are the private information, to CreatePrintJobRequest by using the CreatePrintJob operation input by the port monitor 37.

To the element <ans:ReceivedId> 906, a print reservation ID input when the printer 3 has received the reservation of the print job request is set. In the example illustrated in FIG. 9A, no print reservation ID has been input by the printer 3 yet. Accordingly, a value "None" is set to the element <ans:ReceivedId> 906.

The language monitor 36 sets a value "None" to the element <ans:ReceivedId> 906 as an initial value used when head data of print data including a print control command, which is a trigger for inputting a print job request from the PC 1 to the printer 3, is to be transmitted to the printer 3 for the first time. In cases other than the above-described case, the language monitor 36 stores the value set to the element <ans:ReceivedId> 912, which has been transmitted from the printer 3 to the PC 1 last, in lmReceived. Furthermore, the language monitor 36 sets the value to the element <ans:ReceivedId> 906.

The number of retries of the print job request that the PC 1 inputs to the printer 3 is set to the element <ans:Retry> 901. In the example illustrated in FIG. 9A, a value "0", which indicates that the print job request is to be transmitted from the PC 1 to the printer 3 for the first time, is set to the element <ans:Retry> 901.

Every time transmission of the head data of the print data including the print control command, which is the trigger for inputting the print job request from the PC 1 to the printer 3, is executed, the language monitor 36 increments the number of times of retries by 1 and sets the incremented value to the element <ans:Retry> 901.

The version of the OS of the PC 1 is set to the element <ans:OS Version> 907. The language monitor 36 calls a function GetVersionEx( ), which is the API of the OS. In addition, the language monitor 36 sets version information about the OS returned by using the argument to the element <ans:OS Version> 907. More specifically, in the example illustrated in FIG. 9A, a value "6.0", which indicates that Windows Vista® is used as the OS, is set to the element <ans:OS Version> 907.

The printer 3 verifies the value set to the element <ans:OS Version> 907 and is capable of changing the control differently for a case where the OS of the PC is Windows Vista® and a case where a Windows® OS other than Windows Vista® is used as the OS of the PC.

More specifically, if a timing or control of the WSD protocol is changed in a future Windows® OS from that of Windows Vista®, the printer 3 can change the timing or control of the WSD protocol according to the change. Accordingly, the present exemplary embodiment can execute a stable control optimized for each type of OS installed on the PC. Furthermore, with this configuration, the present exemplary embodiment can prevent malfunction.

The date and time of input of the GetPrinterElementsRequest is set to the element <ans:DateTime> 908. The language monitor 36 calls the API of the OS to acquire the date and time. In addition, the language monitor 36 sets the acquired date and time to the element <ans:DateTime> 908. In the example illustrated in FIG. 9A, the date and time "2009-01-01T00:08:00" is set to the element <ans:DateTime> 908.

Because the PCs, the printer, and various other devices connected to the network 4 may be in different states, the printer 3 may not always receive GetPrinterElementsRequests that have been serially input by a plurality of PCs (the PCs 1 and 2 and other PCs (not illustrated)) to the printer 3 in order of input thereof. Accordingly, the printer 3 determines the order of processing GetPrinterElementsRequests based on the element <ans:DateTime> 908. In addition, the printer 3 returns GetPrinterElementsResponse to the PC that is a source of input of the GetPrinterElementsRequest, which will be described in detail below with reference to FIG. 9B, according to the determined order.

FIG. 9B illustrates an example of GetPrinterElementsResponse. The exemplary program illustrated in FIG. 9B most effectively illustrates characteristics of the present invention. The GetPrinterElementsResponse illustrated in FIG. 9B is input by the PC 1 to the printer 3. If the printer 3 has received GetPrinterElementsRequest including the element <wprt:Name> 903 to which ans:ABCCommand has been set, the printer 3 returns ans:ABCCommand included in GetPrinterElementsResponse to the PC 1.

Referring to FIG. 9B, to an element <wprt:ElementData> 909, which is the public information, ans:ABCCommand, which is the private information, is set as the Name attribute thereof. This indicates that the GetPrinterElementsResponse includes the ans:ABCCommand designated in the element <wprt:Name> 903.

An element <ans:ABCCommand> 910, which is the private information, includes an element <ans:SplJobId> 911, an element <ans:ReceivedId> 912, an element <ans:Retry> 902, an element <ans:OS Version> 913, and an element <ans:DateTime> 914. All the elements 911, 912, 902, 913, and 914 are the private information.

The printer 3 sets the same value as the value of the element <ans:SplJobId> 905 to the element <ans:SplJobId> 911. More specifically, in the example illustrated in FIG. 9B, a value "5" is set to the element <ans:SplJobId> 911. In addition, the printer 3 sets an appropriate value to the element <ans:ReceivedId> 912 as described in detail below in FIG. 13. In the example illustrated in FIG. 9B, a value "00000202" is set to the element <ans:ReceivedId> 912.

The printer 3 verifies the value set to the element <ans:Retry> 901. If a value "0" has been set to the element <ans:Retry> 901, the printer 3 determines that the GetPrinterElementsRequest is a request for a newly input print job. On the other hand, if a value other than "0" has been set to the element <ans:Retry> 901, the printer 3 determines that the GetPrinterElementsRequest is a request for resuming processing of the print job whose reservation has been received.

The printer 3 sets the same value as the value of the element <ans:Retry> 901 to the element <ans:Retry> 902. In the example illustrated in FIG. 9B, a value "0" is set to the element <ans:Retry> 902, which is a trigger for inputting a print job request from the PC 1 to the printer 3 and corresponds to a case where head data of the print data including a print control command to the printer 3 for the first time.

The element <ans:OS Version> 913 describes version information about the OS of the PC (the PC 1). The printer 3 sets the same value as the value of the element <ans:OS Version> 907 to the element <ans:OS Version> 913. In the example illustrated in FIG. 9B, a value "6.0", which represents that Windows Vista® OS is used as the OS of the PC, has been set.

To the element <ans:DateTime> 914, the date and time of input of the GetPrinterElementsResponse is set. More specifically, the printer 3 acquires the date and the time from a real time clock built in to the printer 3. In addition, the printer 3 sets the acquired date and time to the element <ans:DateTime> 914. In the example illustrated in FIG. 9B, a value "2009-01-01T00:08:01" is set to the element <ans:DateTime> 914.

The PC 1 can acquire the time elapsed since the timing of input of GetPrinterElementsRequest to the timing of reception of GetPrinterElementsResponse based on the difference of the time described in the element <ans:DateTime> 908 and the element <ans:DateTime> 914. Furthermore, the PC 1 can calculate the communication speed of the communication via the network 4 and predict the traffic on the network 4 by utilizing the above-described time. In other words, the PC 1 can optimize communication by the WSD protocol and timing control based on the above-described time.

In addition, the PC 1 calls a timer included in the OS by using the API. Furthermore, the PC 1 can compare the time elapsed since a timing of input of the GetPrinterElementsRequest, which is calculated according to the timer, and the time calculated based on the difference of the time described in the element <ans:DateTime> 908 and the element <ans:DateTime> 914. The PC 1 can correct the date and time set to the real time clock of the printer 3 and the date and time set within the PC 1 itself based on a result of the comparison.

As described above with reference to FIG. 9A, the port monitor 37 calls CreatePrintJob( ) of WSD APIs that controls WSD. However, the value set to each of the element <wprt:JobName> 1102 (FIG. 11A), the element <wprt:JobOriginatingUserName> 1103 (FIG. 11A), and the element <wprt:JobId> 1104 (FIG. 11B) is not transmitted as the argument of the function PM_WritePort( ). Accordingly, the language monitor 36 cannot refer to or change the value set to the element 1102, 1103, or 1104. Due to the same reason, the language monitor 36 cannot refer to the elements 911, 912, 902, 913, or 914 in the CreatePrintJobResponse, which are the private information, by using the CreatePrintJob operation input by the port monitor 37.

FIGS. 10A and 10B illustrate an example of GetPrinterElements. More specifically, FIG. 10A illustrates an example of GetPrinterElementsRequest, which is a reservation request. FIG. 10B illustrates an example of GetPrinterElementsResponse.

FIG. 10A illustrates an example of GetPrinterElementsRequest. The GetPrinterElementsRequest illustrated in FIG. 10A most effectively illustrates characteristics of the present invention. The GetPrinterElementsRequest illustrated in FIG. 10A is input by the PC 1 to the printer 3. In the following description of the example illustrated in FIG. 10A, the description of the content similar to that of the example illustrated in FIG. 9A will be omitted.

Referring to FIG. 10A, to an element <wprt:Name> 1001, which is the public information, ans:ABCCommand is set as the value thereof. The ans:ABCCommand is the private information. An element <ans:ABCCommand> 1002, which is the private information, includes an element <ans:SplJobId> 1003, an element <ans:ReceivedId> 1004, an element <ans:Retry> 1005, an element <ans:OS Version> 1006, and an element <ans:DateTime> 1007. All of the elements 1003 through 1007 are the private information. The language monitor 36 sets an appropriate value to each of the above-described elements included in the GetPrinterElementsRequest.

The language monitor 36 transmits a value (job ID), which has been set to the third argument JobId transferred when the spooler 40 has called the function LM_StartDocPort( ) in the processing in S503 (FIG. 5) and S603 (FIG. 6), to the element <ans:SplJobId> 1003. In the example illustrated in FIG. 10A, a value "5" is set to the element <ans:SplJobId> 1003.

To the element <ans:ReceivedId> 1004, a print reservation ID, which is input if the printer 3 has received a reservation by a print job request, is set. In the example illustrated in FIG. 10A, the printer 3 has already received a reservation by the print job request. Accordingly, in the drawing, a value "00000202", which has been input at the time of reception of the reservation, is set to the element <ans:ReceivedId> 1004.

The number of retries of the print job request that the PC 1 inputs to the printer 3 is set to the element <ans:Retry> 1005. In the example illustrated in FIG. 10A, a value "1", which indicates that the PC 1 transmits a print job request to the printer 3 as a first retry, has been set.

Every time transmission of the print data including a first print control command, which is the trigger for inputting the print job request from the PC 1 to the printer 3, is executed, the language monitor 36 increments the number of times of retries by 1 and sets the incremented value to the element <ans:Retry> 1005.

The version of the OS of the PC 1 is set to the element <ans:OS Version> 1006. In the example illustrated in FIG. 10A, a value "6.0", which indicates that a Windows Vista® OS is used as the OS of the PC 1, has been set. The date and time of input of the GetPrinterElementsRequest is set to the element <ans:DateTime> 1007. In the example illustrated in FIG. 10A, a value "2009-01-01T00:08:04" is set to the element <ans:DateTime> 1007.

FIG. 10B illustrates an example of GetPrinterElementsResponse. The exemplary program illustrated in FIG. 10B most effectively illustrates characteristics of the present invention. The GetPrinterElementsResponse illustrated in FIG. 10B is input by the PC 1 to the printer 3. If the printer 3 has received GetPrinterElementsRequest including the element <wprt:Name> 1001 to which ans:ABCCommand has been set, the printer 3 returns ans:ABCCommand included in GetPrinterElementsResponse to the PC 1. In the following description of the example illustrated in FIG. 10B, the description of the content similar to that of the example illustrated in FIG. 9B will be omitted.

To an element <wprt:ElementData> 1008, which is the public information, ans:ABCCommand, which is the private information, is set as the Name attribute. This indicates that the GetPrinterElementsResponse includes ans:ABCCommand that has been designated in the element <wprt:Name> 1001.

An element <ans:ABCCommand> 1009, which is the private information, includes an element <ans:SplJobId> 1010, an element <ans:ReceivedId> 1011, an element <ans:Retry> 1012, an element <ans:OS Version> 1013, and an element <ans:DateTime> 1014. All of the elements 1010 through 1014 are the private information.

The printer 3 sets the same value as the value of the element <ans:SplJobId> 1003 to the element <ans:SplJobId> 1010. More specifically, in the example illustrated in FIG. 10B, a value "5" has been set to the element <ans:SplJobId> 1010.

As described below with reference to FIG. 13, the printer 3 sets an appropriate value to the element <ans:ReceivedId> 1011. In the example illustrated in FIG. 10B, a value "00000202" has been set. The printer 3 sets the same value as the value of the element <ans:Retry> 1005 to the element <ans:Retry> 1012. More specifically, in the example illustrated in FIG. 10B, a value "1" has been set to the element <ans:Retry> 1012.

The printer 3 sets the same value as the value of the element <ans:OS Version> 1006 to the element <ans:OS Version> 1013. In the example illustrated in FIG. 10B, a value "6.0" is set to the element <ans:OS Version> 1013.

The printer 3 acquires the date and the time from the real time clock built in to the printer 3. In addition, the printer 3 sets the acquired date and time to the element <ans:DateTime> 1014. In the example illustrated in FIG. 10B, a value "2009-01-01T00:08:05" is set to the element <ans:DateTime> 1014.

FIGS. 18A and 18B illustrate an example of a content of StartJob. More specifically, FIG. 18A illustrates an example of StartJobRequest, which is a job reservation. FIG. 18B illustrate StartJobResponse.

FIG. 18A illustrates an example of StartJobRequest. A StartJobRequest is a print job start request. The StartJobRequest illustrated in FIG. 18A is input by the PC 5 to the printer 3.

In the example illustrated in FIG. 18A, a description 1801 defines a name space of an ABC Print Service that utilizes an IHV native protocol of ABC Corporation as a name space name lans. By comparing the name space with the name space of the Print Service that utilizes the WSD of ABC Corporation, the following can be known. More specifically, because the element 806 (FIG. 8B) includes the version information "v100" while the element 1801 (FIG. 18A) includes the version information "v200", the name space of the ABC Print Service that utilizes the IHV native protocol of ABC Corporation has a version earlier than the version of the name space of the Print Service that utilizes the WSD of ABC Corporation.

The name space name lans is effective within the private information defined by the ABC Print Service of ABC Corporation. In the drawing to be described below, the name space name lans is handled in the similar manner. In other words, in the drawing to be described below, the name space name lans is effective within the private information defined by the ABC Print Service of ABC Corporation.

The element <wsa:Action> 1802 indicates that the operation to be executed is the StartJob operation. The element <lans:StartJobRequest> 1803 includes an element <lans:ComputerName> 1804, an element <lans:TimeStamp> 1805, an element <lans:Retry> 1806, and an element <lans:DateTime> 1807. All of the elements 1803 through 1807 are the private information. In addition, the language monitor sets an appropriate value to each of the elements 1803 through 1807.

A value "PC5" has been set to a value of the element <lans:ComputerName> 1804 as the name of the computer that has input the information. To the element <lans:TimeStamp> 1805, a time stamp input when the printer 3 has received a reservation by the print job start request is set. In the example illustrated in FIG. 18A, no time stamp has been input by the printer 3 yet. Accordingly, the value "None" is set to the element <lans:ComputerName> 1804.

The language monitor sets a value "None" to the element <lans:TimeStamp> 1805 as an initial value used when head data of print data including a print control command, which is a trigger for inputting a print job start request from the PC 5 to the printer 3, is to be transmitted to the printer 3 for the first time. In cases other than the above-described case, the language monitor stores the value set to an element <lans:TimeStamp> 1810, which has been transmitted from the printer 3 to the PC 5 last, in lmReceived. Furthermore, the language monitor sets the value to the element <lans:TimeStamp> 1805.

The number of retries of the print job start request that the PC 5 inputs to the printer 3 is set to the element <lans:Retry> 1806. In the example illustrated in FIG. 18A, a value "0", which indicates a case where the PC 5 transmits a print job start request to the printer 3 for the first time has been set.

Every time transmission of the head data of the print data including the print control command, which is the trigger for inputting the print job start request from the PC 5 to the printer 3, is executed, the language monitor increments the number of times of retries by 1 and sets the incremented value to the element <lans:Retry> 1806.

The date and time of input of the StartJobRequest is set to the element <lans:DateTime> 1807. The language monitor calls the API of the OS. In addition, the language monitor acquires the date and time. Furthermore, the language monitor sets the acquired date and time to the element <lans:DateTime> 1807. In the example illustrated in FIG. 18A, a value "2009-01-01T22:01:30" has been set.

Because the PCs, the printer, and various other devices connected to the network 4 may be in different states, the printer 3 may not always receive StartJobRequests that have been serially input by a plurality of PCs (the PC 5 and other PCs (not illustrated)) to the printer 3 in order of input thereof. Accordingly, the printer 3 determines the order of processing StartJobRequests based on the element <lans:DateTime> 1807. In addition, the printer 3 returns StartJobResponse to the PC that is a source of input of the StartJobRequest, which will be described in detail below with reference to FIG. 18B, according to the determined order.

FIG. 18B illustrates an example of StartJobResponse. The StartJobResponse illustrated in FIG. 18B is input by the PC 5 to the printer 3. If the printer 3 has received the StartJobRequest illustrated in FIG. 18A, the printer 3 returns StartJobResponse to the PC 5.

In the example illustrated in FIG. 18B, an element <lans:StartJobResponse> 1808 includes an element <lans:ComputerName> 1809, an element <lans:TimeStamp> 1810, an element <lans:Retry> 1811, and the element <lans:DateTime> 1812. All of the elements 1808 through 1812 are the private information.

The printer 3 sets the same value as the value of the element <lans:ComputerName> 1804 to the element <lans:ComputerName> 1809. In the example illustrated in FIG. 18B, a value "PC5" has been set to the element <lans:ComputerName> 1809. The printer 3 sets an appropriate value to the element <lans:TimeStamp> 1810 according to information set to the print queue database illustrated in FIGS. 14A through 14C. In the example illustrated in FIG. 18B, a value "00000301" has been set to the element <lans:TimeStamp> 1810.

The printer 3 verifies the value set to the element <lans:Retry> 1806. If a value "0" has been set to the element <lans:Retry> 1806, the printer 3 determines that the StartJobRequest is a request for a newly input print job. On the other hand, if a value other than "0" has been set to the element <lans:Retry> 1806, the printer 3 determines that the StartJobRequest is a request for resuming processing of the print job whose reservation has been received.

The printer 3 sets the same value as the value of the element <lans:Retry> 1806 to the element <lans:Retry> 1811. In the example illustrated in FIG. 18B, a value "0" is set to the element <lans:Retry> 1811, which is a trigger for inputting a print job start request from the PC 5 to the printer 3 and corresponds to a case where head data of the print data including a print control command is transmitted to the printer 3 for the first time.

To the element <lans:DateTime> 1812, the date and time of input of the StartJobResponse is set. More specifically, the printer 3 acquires the date and the time from the real time clock built in to the printer 3. In addition, the printer 3 sets the acquired date and time to the element <lans:DateTime> 1812. In the example illustrated in FIG. 18B, a value "2009-01-01T22:01:31" has been set to the element <lans:DateTime> 1812.

The PC 1 can acquire the time elapsed since the timing of input of StartJobRequest to the timing of reception of StartJobResponse based on the difference of the time described in the element <lans:DateTime> 1807 and the element <lans:DateTime> 1812. Furthermore, the PC 5 can calculate the communication speed of the communication via the network 4 and predict the traffic on the network 4 by utilizing the above-described time. In other words, the PC 5 can optimize communication by the IHV native protocol and timing control based on the above-described time.

In addition, the PC 5 calls a timer included in the OS by using the API. Furthermore, the PC 5 can compare the time elapsed since a timing of input of the StartJobRequest, which is calculated according to the timer, and the time calculated based on the difference of the time described in the element <lans:DateTime> 1807 and the element <lans:DateTime> 1812. The PC 1 can correct the date and time set to the real time clock of the printer 3 and the date and time set within the PC 5 itself based on a result of the comparison.

FIGS. 14A through 14C illustrate an example of a print queue database that manages a print job request that the printer 3 has received and registered as a reservation. The examples illustrated in FIGS. 14A through 14C most effectively illustrate characteristics of the present invention.

FIG. 14A illustrates an example of a print queue database for controlling network printing that utilizes WSD only, which is built in to a printer, which is capable of receiving one print job only but cannot receive a plurality of print jobs at the same time. FIG. 14B illustrates an example of a print queue database for controlling network printing that uses both WSD protocols and IHV native protocols in a mixed state, which is built in to a printer capable of receiving four print jobs at the same time. FIG. 14C is an expanded print queue database illustrated in FIGS. 14A through 14C. More specifically, FIG. 14C illustrates an example of a print queue database for centrally controlling network printing and local (USB) printing, which is capable of managing a print job and a print job request at the same time via the USB interface 7.

Referring to FIGS. 14A through 14C, a value "Null" indicates that a corresponding field is an empty field including no data. In addition, a mark "-" indicates that the data is undefined (i.e., that no data is available).

Referring to FIG. 14A, a "No." field stores the order of currently executed print job or the order of reserved print job request. In the "No." field, a value "1" indicates a currently printed print job. Values "2" through "8" indicate a reserved print job request. More specifically, in the numbers "2" through "8" in the "No." field, the numerical value "2" indicates the reservation of a print job request having the highest priority, which is to be printed next. The numerical value "8" indicates a reservation of a print job request having the lowest priority, which is to be printed last.

In the present exemplary embodiment, the print queue includes eight operations in total, which includes one print job that can be executed by the printer 3 and seven print job requests that can be reserved on the printer 3.

Referring to FIGS. 14B and 14C, a "No." field stores the order of currently executed print job or the order of reserved print job request. In the "No." field, a value "1" indicates a currently printed print job. Values "2" through "4" indicate a print job that has been received, whose job ID (stored in a "wprt:JobId" field") has been input, and which is waiting to be printed. Values "5" through "8" indicate a reservation of the print job request.

More specifically, for the numbers "2" through "4" in the "No." field, the numerical value "2" indicates the reservation of a print job request having the highest priority, which is to be printed next. The numerical value "3" indicates a print job having the priority immediately below the priority of the second print job. The numerical value "4" indicates a print job having the priority immediately below the priority of the third print job.

For the numbers "5" through "8" in the "No." field, the numerical value "5" indicates the reservation of a print job having a priority immediately below the priority of the fourth print job. The numerical value "8" indicates a reservation of a print job request having the lowest priority, which is to be printed last.

In the present exemplary embodiment, the print queue includes eight operations in total, including one print job that can be executed by the printer 3, a total of four print jobs that can be received by the printer 3 including the print job that can be executed by the printer 3, and a total of four print job requests that can be reserved on the printer 3.

Referring to FIGS. 14A through 14C, a "Computer Name" field stores the name of the PC that has input the print job request. A "wprt:JobName" field stores the name of the print job set to the element <wprt:JobName> (the element <wprt:JobName> 1102, for example). A "wprt:JobOriginatingUserName" field stores the user name set to the element <wprt:JobOriginatingUserName> (the element <wprt:JobOriginatingUserName> 1103, for example). The "wprt:JobId" field stores a job ID set to the element <wprt:JobId> (the element <wprt:JobId> 1104, for example) and having been input by the printer 3.

More specifically, a job ID "888" is set in the "wprt:JobId" field of a row corresponding to the No. 1 print job in the example illustrated in FIG. 14A. This indicates that the printer 3 currently executes printing of the corresponding print job and a job ID corresponding thereto has been already input.

A value "Null" is set in the "wprt:JobId" field of each of rows corresponding to the Nos. 2 through 8 jobs and reservations in the example illustrated in FIG. 14A. This indicates that the printer 3 has only accepted the reservation of the print job request and printing thereof has not been executed, so that no job ID has been input.

For example, a job ID "888" is set in the "wprt:JobId" field of the row corresponding to the No. 1 print job in the example illustrated in FIG. 14B. This state indicates that the printer 3 currently executes printing of the print job and a job ID corresponding thereto has already been issued.

Values "888", "-", "890", and "1001" are set in the "wprt:JobId" field of the rows corresponding to the No. 2 through 4 print jobs in the example illustrated in FIG. 14B. This indicates that the printer 3 has received the print jobs and job IDs corresponding thereto have been already issued.

Values "-", "Null", "Null", and "-" are set in the "wprt:JobId" field of the rows corresponding to the No. 5 through 8 job reservations in the example illustrated in FIG. 14B. This state indicates that the printer 3 has only accepted the reservations of the print jobs and printing thereof has not been executed, so that no job ID has been issued.

The value "-" is set to the "wprt:JobId" field for the Nos. 2, 5, and 8 print jobs and reservations. This state indicates that the data is undefined (unavailable) because no element <wprt:JobId> exists in the IHV native protocol.

In the examples illustrated in FIGS. 14A through 14C, an "ans:SplJobId" field stores a job ID input by the spooler 40 and set to the element <ans:SplJobId> (the element <ans:SplJobId> 905 or the element <ans:SplJobId> 1003, for example). Suppose that a user serially and repeatedly prints the same document from one PC for a large number of times. In this case, if the spooler 40 is capable of printing a plurality of print jobs in parallel processing by using a plurality of threads, the print job name set to the element <wprt:JobName> (the element <wprt:JobName> 1102, for example) included in CreatePrintJobRequest and the user name set to the element <wprt:JobOriginatingUserName> (the element <wprt:JobOriginatingUserName> 1103, for example) may become the same print job name and the same user name among the plurality of print job requests. Accordingly, in this case, the print job requests cannot be uniquely identified from one another.

In order to solve the above-described problem, the print jobs can be discriminated from one another if the job ID input by the spooler 40 is included in the information stored in the print queue database.

A "Time" field illustrated in FIGS. 14A through 14C stores a time count value indicating the time of reception of a print job request input by the PC or a request for verifying a reservation of a print job request. In the example illustrated in FIG. 14A, an "ans:ReceivedId" field stores a print reservation ID set to the element <ans:ReceivedId> (the element <ans:ReceivedId> 912 or the element <ans:ReceivedId> 1011). In the example illustrated in FIG. 14B, a "Protocol" field is a communication protocol used for the network communication between the PC and the printer 3. In the present exemplary embodiment, the WSD protocol or the IHV native protocol is set to the "Protocol" field.

Referring to FIG. 14C, a "Protocol" field stores a communication protocol used for the network communication between the PC (not illustrated) and the printer 3 or the local (USB) communication between the PC 1 and the printer 3. In the present exemplary embodiment, a WSD protocol, an IHV native protocol (IHV Native) for network communication, or another IHV native protocol (IHV Native 2) for local (USB) communication is set to the "Protocol" field.

In the example illustrated in each of FIGS. 14B and 14C, an "ans:ReceivedId/lans:TimeStamp>" field stores a print reservation ID set to the element <ans:ReceivedId> (the element <ans:ReceivedId> 912 or the element <ans:ReceivedId> 1011) or the time stamp set to the element <lans:TimeStamp> (the element <lans:TimeStamp> 1810), which is input by the printer 3 to the PC by using the IHV native protocol. The time stamp is equivalent to the print reservation ID of the IHV native protocol. The time stamp is assigned to each print job request as a unique value. To paraphrase this, the printer 3 can use the time stamp as the job ID equivalent to the job ID of the element <wprt:JobId> of WSD.

By defining the print reservation ID and the time stamp in the same format as described above, the present exemplary embodiment can centrally manage reservations of print job requests. Accordingly, the present exemplary embodiment can readily manage and control reservations of print job requests.

The language monitor (the language monitor 36), by utilizing the APIs for controlling the IHV native protocol, can transmit arbitrary information to the printer 3 by utilizing the IHV native protocol and receive arbitrary information from the printer 3.

Therefore, if the IHV native protocol is utilized, it is not necessary to employ a method, which is otherwise necessary when the WSD protocol is utilized, for reserving print job requests by inputting one print job request by executing two (a plurality of) operations including the CreatePrintJob operation (processing S1611 (FIG. 16) or step S2102 (FIG. 21A)) and the GetPrinterElements operation (processing S1621 (FIG. 16) or step S2016 (FIG. 20)).

Accordingly, if the IHV native protocol is utilized, one print job request can be input based on a print job start request only, which is equivalent to the CreatePrintJob operation (step S515 illustrated in FIG. 5) in the case of using the WSD protocol. More specifically, one print job request can be input based on the StartJob operation (FIGS. 18A and 18B) only.

More specifically, suppose that a Windows Vista® OS is installed on the PC 1 and if a Windows XP® OS is installed on another PC on the network 4. In this case, print jobs that utilize the WSD protocol and print jobs that utilize the IHV native protocol are input by each PC and exist in a mixed state.

As described above, even in the environment in which print jobs of a plurality of types of protocols mixes with each other and coexist, the present exemplary embodiment can implement a highly useful peripheral apparatus control system capable of printing print jobs input by each PC in the correct order of input thereof by utilizing the print queue database illustrated in FIGS. 14A through 14C.

In addition, in the printing using the USB interface 7, by utilizing the IHV native protocol for USB and by utilizing the print queue database illustrated in FIGS. 14A through 14C, the present exemplary embodiment can also implement a highly useful peripheral apparatus control system capable of printing print jobs input by each PC via the network 4 and print jobs input by the PC 1 via the USB interface 7 in the correct order of input thereof.

FIGS. 15A and 15B are charts illustrating an exemplary relationship between a port of the PC and information Device ID INFO. In the example illustrated in FIG. 15A, the printer 3 absolutely exclusively controls the USB interface 7 and the network 4.

Referring to FIG. 15A, a "port of PC 1 currently executing printing" field stores information about the port used when the PC 1 currently executes printing. A "port of PC 2 waiting for printing" stores information about the port used in printing whose print job is in a waiting state.

In the "port of PC 1 currently executing printing" field and the "port of PC 2 waiting for printing" field, a value "USB" corresponds to a USB port used for executing printing via the USB interface 7. A value "WSD protocol corresponds to a network port for executing printing via the network 4 by utilizing the WSD protocol. Furthermore, a value "IHV Native" corresponds to a network port for executing printing via the network 4 by utilizing the IHV native protocol.

A "Device ID INFO" field stores a value set to the information (INFO) included in the Device ID. The information stored in the "Device ID INFO" field includes information about the status of the printer 3 in relation to the PC (in the present exemplary embodiment, the PC 2).

If the printer 3 has been powered on but is in a standby (online) state, a value "000" is set to the information Device ID INFO (INFO:000).

In the following description, the value set to the information Device ID INFO has the following significance.

INFO: Significance
000 The printer 3 has been powered on and in the standby (online) state
101 Currently used by other interface
102 Currently used by other computer The PC 2 can increase the operability of the user by displaying the following message on the application, such as a status monitor that monitors and displays the status of the printer 3, based on the above-described information.

INFO: Message
000 Online
101 Currently used by other interface
102 Currently used by other computer Suppose that a print job input by the PC 1 is currently printed by the printer 3. In this case, if the "port of PC 1 currently executing printing" field has a value "USB", if the "port of PC 2 waiting for printing" field has a value "IHV Native", and if the PC 2 has acquired the Device ID from the printer 3 by utilizing the IHV native protocol, then the printer 3 returns the Device ID whose information INFO has a value "101".

On the other hand, suppose that a print job input by the PC 1 is currently printed by the printer 3. In this case, if the "port of PC 1 currently executing printing" field has a value "USB", if the "port of PC 2 waiting for printing" field has a value "WSD", and if the PC 2 has acquired the Device ID from the printer 3 by utilizing the GetPrinterElements(wprt:PrinterDescription), then the printer 3 returns the Device ID whose information INFO has a value "101".

Furthermore, suppose that a print job input by the PC 1 is currently printed by the printer 3. In this case, if the "port of PC 1 currently executing printing" field has a value "IHV Native", if the "port of PC 2 waiting for printing" field has a value "IHV Native", and if the PC 2 has acquired the Device ID from the printer 3 by utilizing the IHV native protocol, then the printer 3 returns the Device ID whose information INFO has a value "102".

Further still, suppose that a print job input by the PC 1 is currently printed by the printer 3. In this case, if the "port of PC 1 currently executing printing" field has a value "IHV Native", if the "port of PC 2 waiting for printing" field has a value "WSD", and if the PC 2 has acquired the Device ID from the printer 3 by utilizing the GetPrinterElements (wprt:PrinterDescription), then the printer 3 returns the Device ID whose information INFO has a value "102".

Moreover, suppose that a print job input by the PC 1 is currently printed by the printer 3. In this case, if the "port of PC 1 currently executing printing" field has a value "WSD", if the "port of PC 2 waiting for printing" field has a value "IHV Native", and if the PC 2 has acquired the Device ID from the printer 3 by utilizing the IHV native protocol, then the printer 3 returns the Device ID whose information INFO has a value "102".

Still more, suppose that a print job input by the PC 1 is currently printed by the printer 3. In this case, if the "port of PC 1 currently executing printing" field has a value "WSD", if the "port of PC 2 waiting for printing" field has a value "WSD", and if the PC 2 has acquired the Device ID from the printer 3 by utilizing the GetPrinterElements(wprt:Printer- Description), then the printer 3 returns the Device ID whose information INFO has a value "102".

In the example illustrated in FIG. 15A, during printing by the printer 3 from the PC 1 via the USB interface 7, a message "currently used by other interface" or the like can be displayed on a status monitor on the PC 2. Meanwhile, in this case, a message most appropriate to be displayed on the status monitor on the PC 2 is "currently used by other computer".

FIG. 15B illustrates an example of comprehensive control by the printer 3 on the USB interface 7 and the network 4. The detailed description of the configuration of the example illustrated in FIG. 15B similar to that of the example illustrated in FIG. 15A will be omitted in the following description.

Suppose that a print job input by the PC 1 is currently printed by the printer 3. In this case, if the "port of PC 1 currently executing printing" field has a value "USB", if the "port of PC 2 waiting for printing" field has a value "IHV Native", and if the PC 2 has acquired the Device ID from the printer 3 by utilizing the IHV native protocol, then the printer 3 returns the Device ID whose information INFO has a value "102".

On the other hand, suppose that a print job input by the PC 1 is currently printed by the printer 3. In this case, if the "port of PC 1 currently executing printing" field has a value "USB", if the "port of PC 2 waiting for printing" field has a value "WSD", and if the PC 2 has acquired the Device ID from the printer 3 by utilizing the GetPrinterElements(wprt:PrinterDescription), then the printer 3 returns the Device ID whose information INFO has a value "102".

In the present exemplary embodiment, the print control command for controlling the printer 3 via the USB interface 7 and the corresponding Device ID are the same as the print control command for controlling the printer 3 via the network 4 and the corresponding Device ID, respectively. The present exemplary embodiment implements the above-described control by merely changing the protocol including the command.

Figure 12:
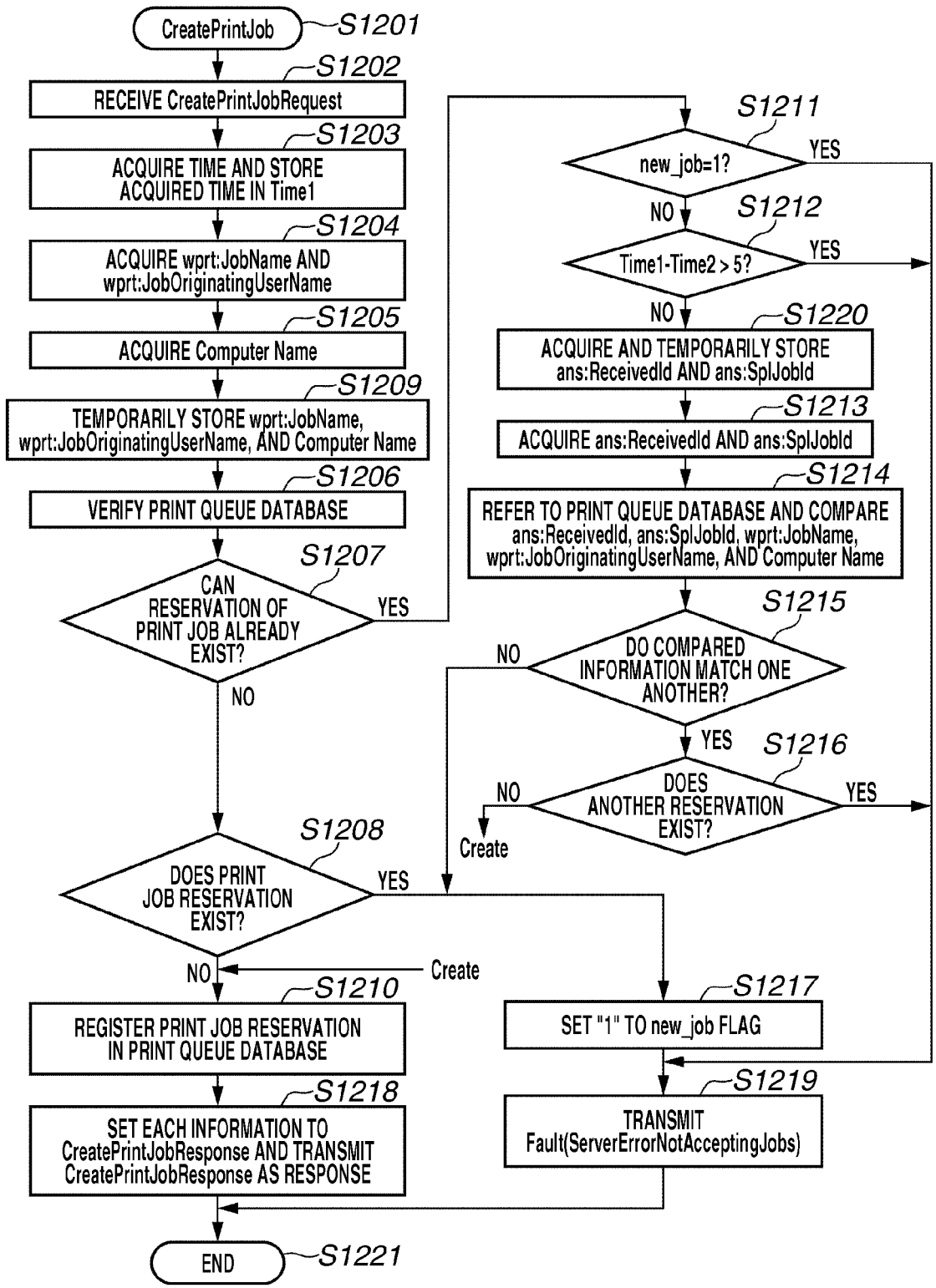
FIG. 12 is a flow chart illustrating an exemplary flow of processing executed by the printer according to a CreatePrintJob command.

FIG. 12 is a flow chart illustrating an exemplary flow of processing for CreatePrintJob executed by the printer 3. The example illustrated in FIG. 12 most effectively illustrates characteristics of the present invention. The program of the processing illustrated in the flow chart of FIG. 12 is loaded and executed by the CPU 15 from the ROM 16 on the RAM 17.

In the present exemplary embodiment, it is supposed that the printer 3 has previously initialized the new_job flag by using a value "0" during booting. Referring to FIG. 12, in step S1201, CreatePrintJobRequest (FIG. 11A) is input by the PC (the PC 1) to the printer 3 and the printer 3 receives the input CreatePrintJobRequest. After the printer 3 has received the input CreatePrintJobRequest in step S1202, the processing advances to step S1203. In step S1203, the printer 3 acquires the count value, based on which the present time and the elapsed time can be calculated, from the timer built in to the printer 3. Furthermore, in step S1203, the printer 3 stores the acquired count value to Time1. The count value is counted in the unit of "second" (sec).

In step S1204, the printer 3 acquires the print job name set to the element <wprt:JobName> 1102 and the user name set to the element <wprt:JobOriginatingUserName> 1103 from the CreatePrintJobRequest. In step S1205, the printer 3 acquires the computer name (Computer Name) of the PC 1.

In the present exemplary embodiment, an Internet protocol (IP) address is acquired from a transmission control protocol (TCP) reception socket in hypertext transport protocol (HTTP) POST command addressed to the WSD Print Service. Furthermore, the computer name is acquired according to the acquired IP address.

In the present exemplary embodiment, for easier understanding, the computer name is acquired from the IP address, the PC is identified based on the acquired computer name, and each processing is executed in this state. However, the PC can be identified by using the IP address to execute each processing.

In step S1209, the printer 3 temporarily stores the print job name, the user name, and the computer name. In step S1206, based on the print job name, the user name, and the computer name, the printer 3 verifies whether a reservation of a print job request for the print job whose start has been requested by the CreatePrintJobRequest received in step S1202 may already exist within the print queue database illustrated in FIGS. 14A through 14C.

In step S1207, the printer 3 determines whether a reservation of the print job request may already exist within the print queue database illustrated in FIGS. 14A through 14C. If it is determined that a reservation of the print job request may already exist within the print queue database illustrated in FIGS. 14A through 14C (Yes in step S1207), then the processing advances to step S1211. On the other hand, if it is determined that it is not likely that a reservation of the print job request already exists within the print queue database illustrated in FIGS. 14A through 14C (No in step S1207), then the processing advances to step S1208. In step S1208, the printer 3 determines whether a reservation of a print job request for the print job whose start has been requested by the CreatePrintJobRequest received in step S1202 exists within the print queue database illustrated in FIGS. 14A through 14C. If it is determined that a reservation of the print job request exists within the print queue database illustrated in FIGS. 14A through 14C (Yes in step S1208), then the processing advances to step S1217. On the other hand, if it is determined that it is not likely that a reservation of the print job request exists within the print queue database illustrated in FIGS. 14A through 14C (No in step S1208), then the processing advances to step S1210. In step S1210, the printer 3 registers the print job request of the print job whose start has been requested by the CreatePrintJobRequest received in step S1202 to the print queue database illustrated in FIGS. 14A through 14C.

In step S1218, the printer 3 returns CreatePrintJobResponse (FIG. 11B) to the PC (the PC 1) as a response indicating that the print job request CreatePrintJobRequest received in step S1202 is accepted and executed. In step S1221, the processing for CreatePrintJob ends.

In step S1211, the printer 3 determines whether the value of the new_job flag is "1". If it is determined that the value of the new_job flag is "1" (Yes in step S1211), then the processing advances to step S1219. On the other hand, if it is determined that a value "0" has been set (No in step S1211), then the processing advances to step S1212.

In step S1212, the printer 3 subtracts Time2 stored in step S1303 (FIG. 13) from Time1 stored in step S1203 to calculate the time elapsed (the difference in the request reception time) from the timing of reception by the printer 3 of the GetPrinterElementsRequest in step S1302 (FIG. 13) to the timing of reception by the printer 3 of the CreatePrintJobRequest in step S1202.

If the elapsed time exceeds five seconds (Yes in step S1212), then the processing advances to step S1219. On the other hand, if the elapsed time is less than five seconds (No in step S1212), then the processing advances to step S1220.

In step S1220, the printer 3 searches for a reservation of the print job request having the information same as the print job name, the user name, and the computer name stored in step S1209, within the print queue database illustrated in FIGS. 14A through 14C based on the print job name, the user name, and the computer name.

In addition, the printer 3 acquires the print reservation ID set to the "ans:ReceivedId" field and the job ID input by the spooler 40 and having been set in the "ansSplJobId" field from the print queue database and temporarily stores the acquired print reservation ID and the job ID.

In step S1213, the printer 3 acquires the print reservation ID set to the element <ans:ReceivedId> (the element <ans:ReceivedId> 1004) and the job ID input by the spooler 40 and having been set to the element <ans:SplJobId> (the element <ans:SplJobId> 1003) from the information included in the element <ans:ABCCommand> (the element <ans:ABCCommand> 904 or the element <ans:ABCCommand> 1002) stored in step S1309 illustrated in FIG. 13.

In step S1214, the printer 3 compares the print reservation ID acquired in step S1213 and the job ID input by the spooler 40 with the print reservation ID temporarily stored in step S1220 and the job ID input by the spooler 40, respectively. In addition, in step S1214, the printer 3 compares the print job name, the user name, and the computer name acquired from the print queue database based on the print reservation ID temporarily stored in step S1220 with the print job name, the user name, and the computer name temporarily stored in step S1209.

If it is determined, as a result of the comparison among all comparison target information, that all comparison target information match one another (Yes in step S1215), then the processing advances to step S1216. On the other hand, if it is determined that at least one piece of information that does not match the other such information exists (No in step S1215), then the processing advances to step S1217.

In step S1216, the printer 3 verifies the print queue database illustrated in FIGS. 14A through 14C. If it is determined that a reservation of another print job request having a priority higher than the priority of the print job whose start has been requested by the CreatePrintJobResponse received in step S1202 exists within the print queue database (Yes in step S1216), then the processing advances to step S1219. On the other hand, if it is determined that no such reservation of print job request exists within the print queue database (No in step S1215), then the processing advances to step S1210.

In step S1217, the printer 3 sets a value "1" to the new_job flag. In step S1219, the printer 3, in response to the print job request CreatePrintJobRequest received in step S1202, returns Fault (ServerErrorNotAcceptingJobs), which describes that the print job has not been accepted, to the PC (the PC 1). In step S1221, the processing for CreatePrintJob ends.

FIG. 13 is a flow chart illustrating an exemplary flow of processing executed by the printer 3 for GetPrinterElements. The example illustrated in FIG. 13 most effectively illustrates characteristics of the present invention. The program of the processing illustrated in the flow chart of FIG. 13 is loaded and executed by the CPU 15 from the ROM 16 on the RAM 17.

Referring to FIG. 13, in step S1301, GetPrinterElementsRequest (FIGS. 8A, 9A, and 10A) is input by the PC (the PC 1) to the printer 3 and the printer 3 receives the input GetPrinterElementsRequest. In step S1302, the printer 3 receives the GetPrinterElementsRequest. In step S1304, the printer 3 verifies the value set to the element <wprt:Name> (801, 903, or 1001) from the received GetPrinterElementsRequest.

In step S1304, in order to respond to a case where a plurality of elements <wprt:Name> exists in the GetPrinterElementsRequest, the printer 3 temporarily stores the received values set to all the elements <wprt:Name>. If wprt:PrinterDescription has been extracted as the value set to the element <wprt:Name> (Yes in step S1305), then the processing advances to step S1306. On the other hand, if wprt:PrinterDescription has not been extracted (No in step S1305), then the processing advances to step S1308.

In step S1306, the printer 3 sets a value "true" to the function <ans:MultipleJobsControl> 802. Then, the processing advances to step S1308.

In step S1308, the printer 3 verifies all values set to the element <wprt:Name> and having been stored in step S1304. If ans:ABCCommand has been extracted (YES in step S1308), then the processing advances to steps S1303. On the other hand, if ans:ABCCommand has been extracted (No in step S1308), then the processing advances to step S1319.

In step S1303, the printer 3 acquires a count value based on which the present time or the elapsed time can be calculated from the timer built in to the printer 3 and stores the acquired count value to Time2. The count value is counted in the unit of "second" (sec).

In step S1309, the printer 3 acquires all information included in the element <ans:ABCCommand> 904 or the element <ans:ABCCommand> 1002 included in the GetPrinterElementsRequest and stores the acquired information.

In step S1320, the printer 3 determines whether the value of the new_job flag is "1". If it is determined that the value of the new_job flag is "1" (Yes in step S1320), then the processing advances to step S1307. On the other hand, if it is determined that the value of the new_job flag is not "1" (i.e., if a value "0" has been set) (No in step S1320), then the processing advances to step S1311.

In step S1307, the printer 3 subtracts Time1 stored in step S1203 (FIG. 12) from Time2 and calculates the elapsed time (the difference in the request reception time) from the timing of reception by the printer 3 of the CreatePrintJobRequest in step S1202 (FIG. 12) to the timing of reception by the printer 3 of the GetPrinterElementsRequest in step S1302.

If the elapsed time exceeds five seconds (Yes in step S1307), then the processing advances to step S1321. On the other hand, if the elapsed time is less than five seconds (No in step S1307), then the processing advances to step S1310.

In step S1310, the printer 3 determines whether the value set to the element <ans:Retry> 901 or the element <ans:Retry> 1005 is "0". If it is determined that a value "0" has been set to the element <ans:Retry> (Yes in step S1310), then the processing advances to step S1317. On the other hand, if it is determined that a value other than "0" (actually, an integer greater than 0) has been set to the element <ans:Retry> (No in step S1310), then the processing advances to step S1311.

Figure 17:
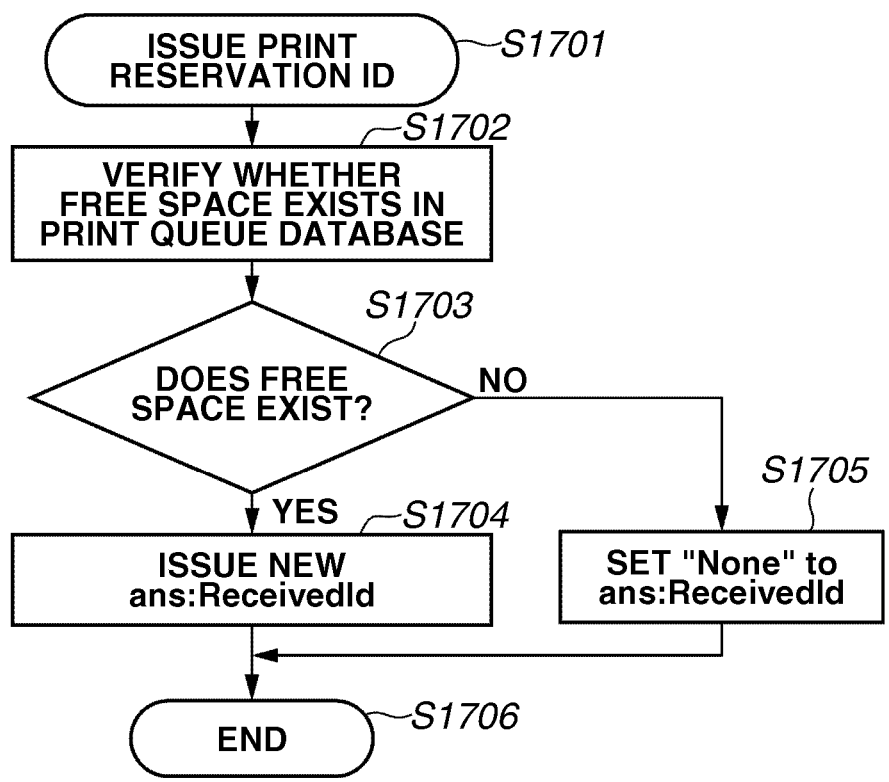
FIG. 17 is a flow chart illustrating an exemplary flow of processing executed by the printer to issue a print reservation ID.

In step S1317, the printer 3 executes processing for inputting a print reservation ID illustrated in FIG. 17. By executing the processing illustrated in FIG. 17, the printer 3 determines whether a value "None" has been set to the element <ans:ReceivedId> 912 or the element <ans:ReceivedId> 1011. If a value "None" has been set to the element <ans:ReceivedId> (Yes in step S1317), then the processing advances to step S1321. On the other hand, if it is determined that a value "None" is not set to the element <ans:ReceivedId> (No in step S1317), then the processing advances to step S1318.

In step S1318, if the processing has gone through step S1317, the printer 3 registers each information in the print queue database illustrated in FIGS. 14A through 14C as the reservation of the print job request based on a print reservation ID (ans:ReceivedId) newly input in step S1704 (FIG. 17). If the processing has gone through step S1315 (No in step S1315), the printer 3 registers each information in the print queue database (FIG. 14) as a reservation of an existing print job request based on an existing print reservation ID (ans:ReceivedId) and updates the print queue database. In step S1318, the printer 3 also updates the time count value set in the "Time" field by using the value stored in Time2 at this timing. In step S1321, the printer 3 initializes the new_job flag with a value "0".

In step S1319, the printer 3 sets each information to Get-PrinterElementsResponse by using the information set in step S1306, information set in step S1705 (FIG. 17), and the information set in the print queue database illustrated in FIGS. 14A through 14C. In addition, in step S1319, the printer 3 returns the GetPrinterElementsResponse to the PC (the PC 1) in response to the GetPrinterElementsRequest received in step S1302. In step S1322, the processing for GetPrinterElements ends.

In step S1311, the printer 3 acquires the print reservation ID (for example, the element <ans:ReceivedId> 1004) set to the element <ans:ReceivedId>. In step S1312, the printer 3 verifies whether the print reservation ID exists in the "ans:ReceivedId" field or the "ans:ReceivedId/ans:TimeStamp" field included in the print queue database illustrated in FIGS. 14A through 14C.

If it is determined in step S1313 that a print reservation ID corresponding to the reservation of the print job request exists within the print queue database illustrated in FIGS. 14A through 14C (Yes in step S1313), then the processing advances to step S1314. On the other hand, if it is determined that no print reservation ID corresponding to the reservation of the print job request exists within the print queue database illustrated in FIGS. 14A through 14C (No in step S1313), then the processing advances to step S1317.

In step S1314, the printer 3 acquires the time count value set in the "Time" field corresponding to the print job request reserved with the print reservation ID from the print queue database illustrated in FIGS. 14A through 14C. In addition, the printer 3 measures the elapsed time from the timing of the last update of the reservation of the print job by subtracting the acquired time count value from Time2 stored in step S1303.

If it is determined that the elapsed time exceeds a predetermined time (in the present exemplary embodiment, twenty seconds) (Yes in step S1315), then the processing advances to step S1316. On the other hand, if it is determined that the elapsed time does not exceed the predetermined time (No in step S1315), then the processing advances to step S1318.

In step S1316, the printer 3 once deletes print reservation ID (ans:ReceivedId) of the print job request from the print queue database illustrated in FIGS. 14A through 14C. In addition, the printer 3 moves the print job request to the tail end of the print queue database so that the print job request becomes the reservation of the print job request having the lowest priority. Then the processing advances to step S1317.

In step S1212 (FIG. 12) and step S1307 (FIG. 13), the fixed timeout value of five seconds is set as the value based on which whether the predetermined time has elapsed. However, the present exemplary embodiment is not limited to this. More specifically, according to the environment of use of the printer 3 or the environment of the network used by the user, any other fixed timeout value of three, eight, or ten seconds can be set. Alternatively, the user can operate the touch panel of the display unit 21 or the operation unit 20 of the printer 3 to set an arbitrary value appropriate for the environment of use of the printer 3.

In addition, the following configuration can be employed. More specifically, the printer 3 monitors the PC on the network 4. The printer 3 recognizes the status of the network traffic according to the number of the PCs on the network 4. Furthermore, the printer 3 can set an optimum timeout value according to the status of the network traffic.

In addition, different values can be used for the timeout value used in step S1212 (FIG. 12) and the timeout value used in step S1307 (FIG. 13) instead of using the same value therefor. In this case, the timeout value used in step S1212 (FIG. 12) is set at five seconds while the timeout value used in step S1307 (FIG. 13) is set at three seconds.

FIG. 17 is a flow chart illustrating an exemplary flow of processing executed by the printer 3 to input a print reservation ID. The example illustrated in FIG. 17 most effectively illustrates characteristics of the present invention. The program of the processing illustrated in the flow chart of FIG. 17 is loaded and executed by the CPU 15 from the ROM 16 on the RAM 17.

When the printer 3 executes the processing for inputting a print reservation ID in step S1317 (FIG. 13), the processing illustrated in FIG. 17 starts from step S1701. In step S1702, the printer 3 verifies the status of the free field of the print queue database illustrated in FIGS. 14A through 14C. If it is determined that a free field exists in the print queue database illustrated in FIGS. 14A through 14C (Yes in step S1703), then the processing advances to step S1704. On the other hand, if it is determined that no free field exists (No in step S1703), then the processing advances to step S1705.

In step S1704, the printer 3 newly inputs a print reservation ID (ans:ReceivedId). In addition, the printer 3 sets the print reservation ID to the element <ans:ReceivedId> 912 or the element <ans:ReceivedId> 1011. In step S1706, the processing for inputting a print reservation ID ends. Then the processing advances to step S1323 (FIG. 13). The print reservation ID input in step S1704 is managed by the printer 3 and is a value uniquely determined within the printer 3.

In step S1705, the printer 3 sets a value "None" to the element <ans:ReceivedId> 912 or the element <ans:ReceivedId> 1011. In step S1706, the processing for inputting a print reservation ID ends. Then the processing advances to step S1323 (FIG. 13).

As described above, if any free field that can accept a new print job request does not exist in the print queue database illustrated in FIGS. 14A through 14C, the printer 3 cannot accept a reservation of a print job request from the PC (the PC 1). In this case, the PC (the PC 1) inputs a print job request again according to the calling sequence illustrated in FIG. 6. Accordingly, if a free field with which a new print job request can be accepted exists in the print queue database illustrated in FIGS. 14A through 14C, the printer 3 accepts the reservation of the print job request.

Figure 19:
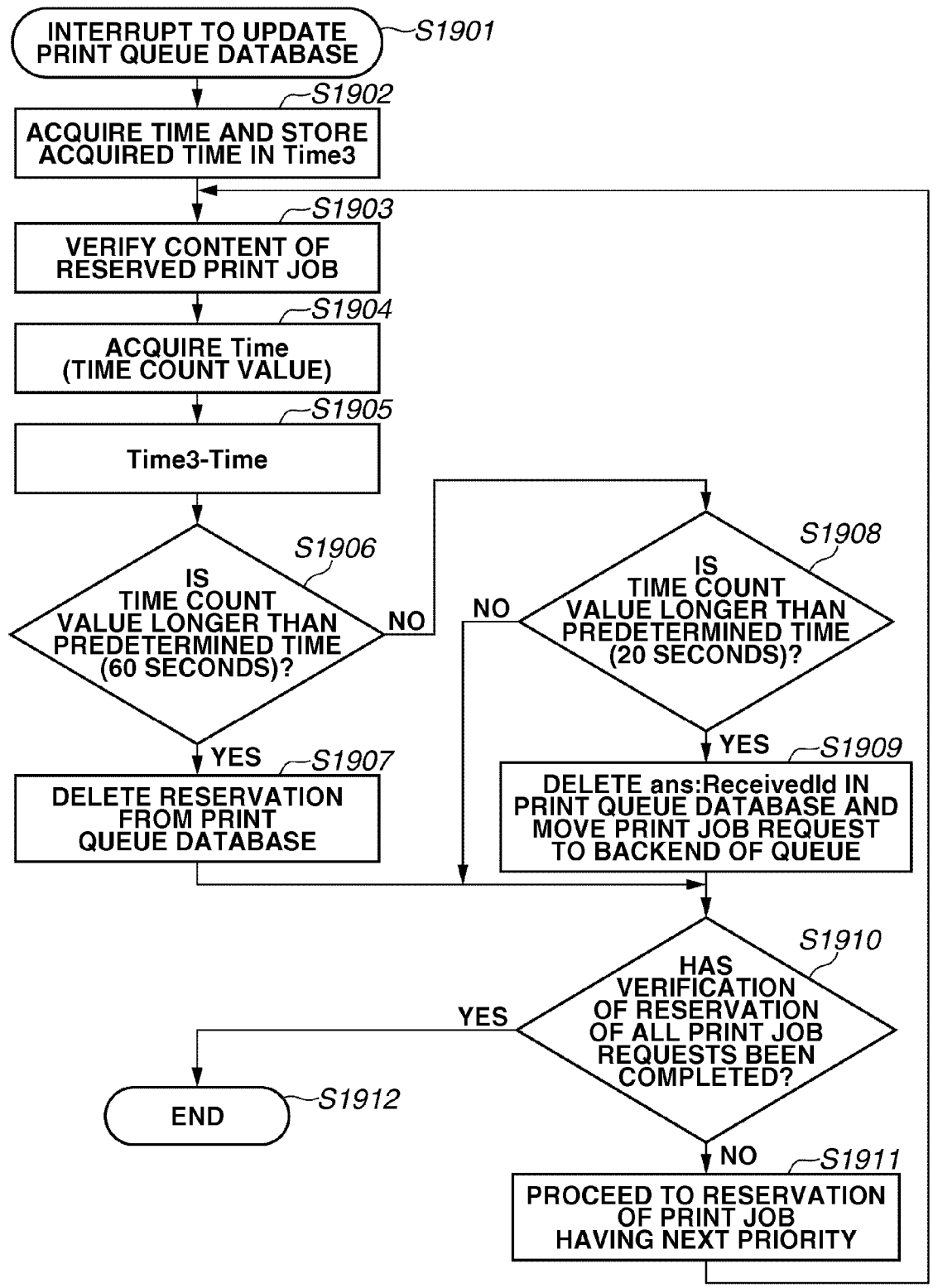
FIG. 19 is a flow chart illustrating an exemplary flow of interruption processing executed by the printer to update a print queue database.

FIG. 19 is a flow chart illustrating an exemplary flow of interruption processing executed by the printer 3 to update the print queue database. The program of the processing illustrated in the flow chart of FIG. 19 is loaded and executed by the CPU 15 from the ROM 16 on the RAM 17.

When the interruption occurs at every 180 seconds according to the count value counted by the timer built in to the printer 3, the processing illustrated in FIG. 19 starts. More specifically, in step S1901, the processing illustrated in FIG. 19 starts when the interruption occurs according to the count value counted by the timer built in to the printer 3.

In step S1902, the printer 3 acquires a count value based on which the present time and the elapsed time can be calculated, from the timer built in to the printer 3 and stores the acquired count value in Time3. The count value is counted in the unit of "second" (sec).

In step S1903, the printer 3 acquires and verifies the content of the reservation having the highest priority from among reservations of print job requests included in the print queue database illustrated in FIGS. 14A through 14C. In step S1904, the printer 3 acquires the time count value set to the "Time" field from the reservation of the print job request acquired in step S1903.

In step S1905, the printer 3 subtracts the time count value acquired in step S1904, from Time3. If the result of the subtraction in step S1905 exceeds a predetermined time (sixty seconds) (Yes in step S1906), then the processing advances to step S1907. On the other hand, if it is determined that the subtraction result does not exceed the predetermined time of sixty seconds (No in step S1906), then the processing advances to step S1908.

In step S1907, the printer 3 deletes the reservation of the print job request acquired in step S1903 from the print queue database illustrated in FIGS. 14A through 14C. Then, the processing advances to step S1910. At the same time, the printer 3 also deletes the print reservation ID (ans:ReceivedId) of the print job request therefrom.

In step S1908, the printer 3 determines whether the result of the subtraction in step S1905 exceeds a predetermined time of twenty seconds. If it is determined that the result of the subtraction in step S1905 exceeds the predetermined time of twenty seconds (Yes in step S1908), then the processing advances to step S1909. On the other hand, if it is determined that the result of the subtraction in step S1905 does not exceed the predetermined time of twenty seconds (No in step S1908), then the processing advances to step S1910. In the present exemplary embodiment, the same twenty seconds as set in step S1315 (FIG. 13) is set as the predetermined time (twenty seconds).

In step S1909, the printer 3 once deletes the print reservation ID (ans:ReceivedId) of the print job request acquired in step S1903 from the print queue database illustrated in FIGS. 14A through 14C. In addition, the printer 3 moves the print job request to the tail end of the print queue database so that the print job request is reserved as the reservation of the print job request having the lowest priority. Then, the processing advances to step S1910.

In step S1910, the printer 3 determines whether the reservations of all the print job requests have been completely verified. If it is determined that the reservations of all the print job requests have been completely verified (Yes in step S1910), then the processing advances to step S1912 and the processing of interruption for updating the print queue database ends there. On the other hand, if it is determined that the reservations of all the print job requests have not been completely verified (No in step S1910), then the processing advances to step S1911.

In step S1911, the printer 3 proceeds to the processing of the reservation of the print job request having the second highest priority at the time of the acquisition of the reservation of the print job request in step S1903 within the print queue database illustrated in FIGS. 14A through 14C. Then, the processing returns to step S1903. In the present exemplary embodiment, the interval of the interruption by timer is set at 180 seconds. However, the present exemplary embodiment is not limited to this. More specifically, a different other arbitrary interval can be set. Alternatively, the user can operate the touch panel of the display unit 21 or the operation unit 20 of the printer 3 to set an arbitrary value appropriate for the environment of use of the printer 3.

In step S1315 (FIG. 13) and step S1908 (FIG. 19), the fixed timeout value of twenty seconds is set as the value based on which whether the predetermined time has elapsed. However, the present exemplary embodiment is not limited to this. More specifically, according to the environment of use of the printer 3 or the environment of the network used by the user, any other fixed timeout value of ten, thirty, or sixty seconds can be set. Alternatively, the user can operate the touch panel of the display unit 21 or the operation unit 20 of the printer 3 to set an arbitrary value appropriate for the environment of use of the printer 3.

In addition, the following configuration can be employed. More specifically, the printer 3 monitors the PC on the network 4. The printer 3 recognizes the status of the network traffic according to the number of the PCs on the network 4. Furthermore, the printer 3 can set an optimum timeout value according to the status of the network traffic.

In step S1906 (FIG. 19), the fixed timeout value of sixty seconds is set as the value based on which it is determined whether the predetermined time has elapsed. However, the present exemplary embodiment is not limited to this. More specifically, according to the environment of use of the printer 3 or the environment of the network used by the user, any other fixed timeout value of thirty, ninety, or 120 seconds can be set. Alternatively, the user can operate the touch panel of the display unit 21 or the operation unit 20 of the printer 3 to set an arbitrary value appropriate for the environment of use of the printer 3.

In addition, the following configuration can be employed. More specifically, the printer 3 monitors the PC on the network 4. the printer 3 recognizes the status of the network traffic according to the number of the PCs on the network 4. Furthermore, the printer 3 can set an optimum timeout value according to the status of the network traffic.

In the examples illustrated in FIGS. 12, 13, and 19, the count value acquired from the timer built in to the printer 3 is utilized for the method for calculating the elapsed time. However, the present exemplary embodiment is not limited to this. More specifically, the time acquired from a real time clock built in to the printer 3 can be utilized to implement the function of the present invention.

In the present exemplary embodiment, the printer 3 is used as the peripheral apparatus. However, the present invention can be implemented by a multifunction peripheral (MFP) including a printer, a facsimile apparatus, a scanner, and a storage device.

If the MFP includes the WSD, the following WSD services can be assigned to the functions of the MFP, such as the printer function, the facsimile transmission function, and the scanner function.

| Function | WSD Service | Description |
|---|---|---|
| Printer | Print Service | for printer function |
| FAX | Print Service | for FAX transmission function |
| Scanner | Scan Service | |

The following ServiceIds are assigned to the Service of each function.

Printer:
<wsdp:ServiceId>http://schemas.abc.xxx/Printer</wsdp:ServiceId>

FAX:
<wsdp:ServiceId>http://schemas.abc.xxx/Fax</wsdp:ServiceId> scanner:
<wsdp:ServiceId>http://schemas.abc.xxx/Scanner</wsdp:ServiceId>

The Print Service is assigned to both the printer function and the facsimile transmission function. The ServiceID differs for the printer function and the FAX transmission function. Accordingly, the ServiceType of both the printer function and the FAX transmission function is PrinterServiceType.

As described above, the language monitor 36 is capable of inputting GetPrinterElementsRequest from the PC 1 to the printer 3 and receive the GetPrinterElementsResponse returned from the printer 3 to the PC 1 by using the function GetPrinterElements( ) of the WSD APIs.

In this case, by designating the ServiceType in the function GetPrinterElements( ) and by calling the function as described below, the GetPrinterElements can be utilized.

```
<portType name="PrinterServiceType" wse:EventSource="true">
  <operation name="GetPrinterElements">
    <input message="wprt:GetPrinterElementsRequest Msg"
      wsa:Action="http://schemas.yyyy.xxx/YYYY/MM/wdp/print/
      GetPrinterElements "/>
    <output message= "wprt:GetPrinterElementsResponse Msg"
      wsa:Action="http://schemas.yyyy.xxx/YYYY/MM/wdp/print/
      GetPrinterElementsResponse "/>
  </operation>
</portType>
```

However, if the above-described MFP is used, the ServiceType of both the printer function and the FAX transmission function is the same type "PrinterServiceType". Accordingly, if the ServiceType is designated and the function is called in this state, the printer function and the FAX transmission function cannot be identified from each other and unique information for each such function cannot be acquired.

In order to solve the above-described problem, if the MFP described above is used, the following configuration can be employed. More specifically, the language monitor 36 designates the ServiceID and calls the function to designate the printer function or the FAX transmission function. In this manner, the printer 3 can acquire the information about the designated function by utilizing the GetPrinterElements.

By employing the above-described configuration, if the MFP having the printer function and the FAX transmission function is used, the present exemplary embodiment having the above-described configuration can implement the peripheral apparatus control system capable of preventing a malfunction and executing a correct and appropriate control.

CreatePrintJobRequest is a print job start request in the WSD Print Service. GetPrinterElementsRequest is a request for acquiring printer information in the WSD Print Service.

As described above, in the present exemplary embodiment, information included in each of the CreatePrintJobRequest received in step S1202 and GetPrinterElementsRequest (ans:ABCCommand) received within a predetermined time period (five seconds in FIG. 12) is associated with each other. Furthermore, the information is handled as a reservation of one print job request and is registered in the print queue database.

Furthermore, the reservation of the print job request is managed according to the print reservation ID uniquely determined within the printer 3.

In other words, if different two requests, such as a print job start request and a printer information acquisition request, have been received within a predetermined time period, the present exemplary embodiment mutually associates the information included in the requests, handles the same as the reservation of one print job request, and registers the same in the print queue database. In addition, the reservation of the print job request is managed according to the print reservation ID uniquely determined within the printer 3.

With the above-described configuration, if a printer that cannot receive a plurality of print jobs but can receive one print job only is used, the present exemplary embodiment can cause the printer to print a plurality of print jobs input by one or more PCs correctly and appropriately in order of input thereof.

Now, a second exemplary embodiment of the present invention will be described in detail below. In the first exemplary embodiment described above, if a user serially prints the same document from one PC, the spooler 40 is capable of processing the print jobs in parallel by using a plurality of threads.

In this case, if the spooler 40 is capable of printing a plurality of print jobs in parallel processing by using a plurality of threads, the print job name set to the element <wprt:JobName> (the element <wprt:JobName> 1102, for example) included in CreatePrintJobRequest and the user name set to the element <wprt:JobOriginatingUserName> (the element <wprt:JobOriginatingUserName> 1103, for example) may become the same print job name and the user name among the plurality of print job requests. Accordingly, in this case, the print job requests cannot be uniquely identified from one another.

In order to solve the above-described problem, in the first exemplary embodiment described above, the job ID input by the spooler 40 is included in the information to be stored in the print queue database to uniquely identify each print job.

In addition, as an easiest method executed by the printer 3 for centrally managing the reservations of print job requests, the print reservation ID set to the element <ans:ReceivedId> 912 or the element <ans:ReceivedId> 1011 or the time stamp, which is equivalent to the print reservation ID and set to the element <lans:TimeStamp> 1810, is utilized.

Suppose, as another exemplary case, that a user serially and repeatedly prints the same document from one PC and if the spooler 40 cannot process the print jobs in parallel by using a plurality of threads and that a print job having a highest priority is sequentially processed by one thread.

In this case, if the user serially and repeatedly prints the same document from one PC, the spooler 40 processes only the print job having the highest priority among jobs stacked in the printer queue 32.

Accordingly, if only the WSD protocol is utilized, the reservations of the print job requests can be centrally managed by using three types of information, i.e., the computer name stored in the "Computer Name" field, the print job name stored in the "wprt:JobName" field, and the user name stored in the "wprt:JobOriginatingUserName" field, which is described in the print queue database, without using the print reservation ID or the time stamp.

Suppose that the WSD protocol and the IHV native protocol exists in a mixed state. In this case, by adding information, such as the print job name and the user name, to the StartJob illustrated in FIGS. 18A and 18B, the reservations of the print job requests can be centrally managed without using the print reservation ID and the time stamp.

However, the present exemplary embodiment is useful but useful only in a case where the spooler 40 cannot process a plurality of print jobs in parallel by using a plurality of threads and the print job having the highest priority is sequentially processed by one thread.

As an example of the IHV native protocol, an IHV native protocol (IHV Native) for network or an IHV native protocol (IHV Native 2) for local (USB) communication can be used.

Now, a print queue database and processing according to the present exemplary embodiment will be described in detail below with reference to FIGS. 22 through 24. FIG. 22 illustrates an example of a print queue database that manages a print job request that the printer 3 has received and registered as a reservation. The example illustrated in FIG. 22 most effectively illustrates characteristics of the present invention.

The print queue database illustrated in FIG. 22 is substantially similar to that illustrated in FIG. 14C except that the print queue database illustrated in FIG. 22 does not include the "ans:ReceivedID/lans:TimeStamp" field, which is included in the print queue database illustrated in FIG. 14C. Accordingly, the detailed description of the configuration of the print queue database similar to that described above in the first exemplary embodiment with reference to FIG. 14C will not be repeated here.

The "ans:ReceivedID/lans:TimeStamp" field stores a print reservation ID that has been set to the element <ans:ReceivedId> 912 or 1011 and information including a time stamp, which have been given by the printer 3 to the PC by using the IHV native protocol and set to the element <lans:TimeStamp> 1810. As described above, the print queue database illustrated in FIG. 22 does not include the "ans:ReceivedID/lans:TimeStamp" field. Accordingly, it is not necessary to store the print reservation ID or the time stamp.

Figure 23:
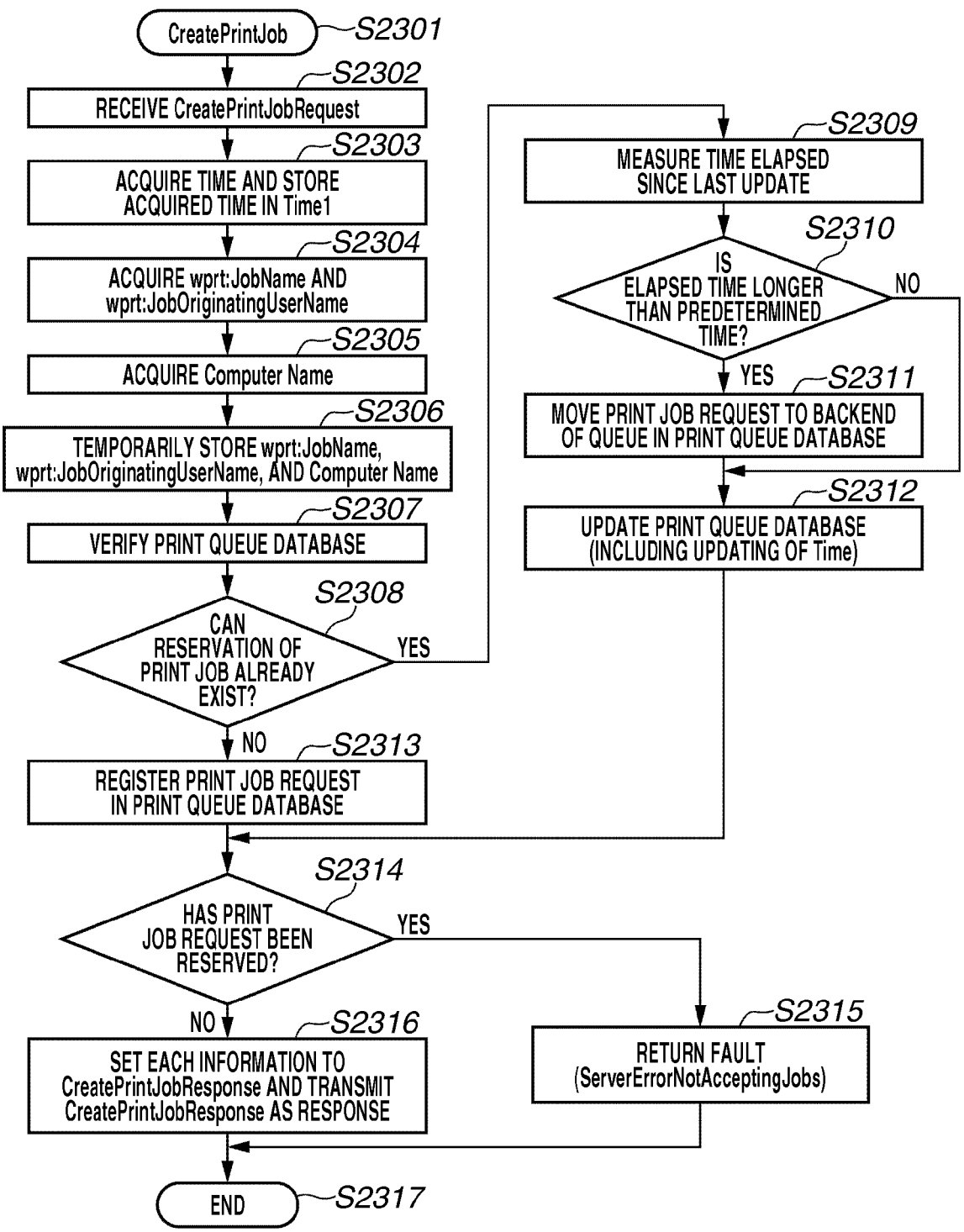
FIG. 23 is a flow chart illustrating an exemplary flow of processing executed by the printer according to a CreatePrintJob command.

FIG. 23 is a flow chart illustrating an exemplary flow of processing executed by the printer 3 according to a CreatePrintJob command. The example illustrated in FIG. 22 most effectively illustrates characteristics of the present invention. The program of the processing illustrated in the flow chart of FIG. 23 is loaded and executed by the CPU 15 from the ROM 16 on the RAM 17. When the PC (the PC 1) gives a CreatePrintJobRequest command illustrated in FIG. 11A to the printer 3 and the printer 3 receives the CreatePrintJobRequest command, the processing illustrated in FIG. 23 starts from step S2301.

After the printer 3 has received the input CreatePrintJobRequest in step S2302, the processing advances to step S2303. In step S2303, the printer 3 acquires the count value, based on which the present time and the elapsed time can be calculated, from the timer built in to the printer 3. Furthermore, in step S2303, the printer 3 stores the acquired count value in Time1. The count value is counted in the unit of "second" (sec).

In step S2304, the printer 3 acquires the print job name set to the element <wprt:JobName> 1102 and the user name set to the element <wprt:JobOriginatingUserName> 1103 from the CreatePrintJobRequest. In step S2305, the printer 3 acquires the computer name (Computer Name) of the PC 1.

In the present exemplary embodiment, an IP address is acquired from a TCP reception socket in an HTTP POST command addressed to the WSD Print Service. Furthermore, the computer name is acquired according to the acquired IP address.

In the present exemplary embodiment, for easier understanding, the computer name is acquired from the IP address, the PC is identified based on the acquired computer name, and each processing is executed in this state. However, the PC can be identified by using the IP address to execute each processing.

In step S2306, the printer 3 temporarily stores the print job name, the user name, and the computer name. In step S2307, based on the computer name, the printer 3 verifies whether a reservation of a print job request for the print job whose start has been requested by the CreatePrintJobRequest received in step S2302 exists within the print queue database illustrated in FIG. 22.

In step S2308, the printer 3 determines whether a reservation of a print job request for the print job whose start has been requested by the CreatePrintJobRequest received in step S2302 exists within the print queue database illustrated in FIG. 22. If it is determined that a reservation of the print job request already exists within the print queue database illustrated in FIG. 22 (Yes in step S2308), then the processing advances to step S2309. On the other hand, if it is determined that no reservation of the print job request exists within the print queue database illustrated in FIG. 22 (No in step S2308), then the processing advances to step S2313.

In step S2309, the printer 3 acquires the time count value set in the "Time" field corresponding to the print job request reserved with the computer name from the print queue database illustrated in FIG. 22. In addition, the printer 3 measures the elapsed time from the timing of the last update of the reservation of the print job by subtracting the acquired time count value from Time1 stored in step S1303.

If it is determined that the elapsed time exceeds a predetermined time (in the present exemplary embodiment, twenty seconds) (Yes in step S2310), then the processing advances to step S2311. On the other hand, if it is determined that the elapsed time does not exceed the predetermined time (No in step S2310), then the processing advances to step S2312.

In step S2311, in the print queue database illustrated in FIG. 22, the printer 3 moves the print job request to the tail end of the print queue database so that the print job request becomes the reservation of the print job request having the lowest priority. Then the processing advances to step S2312. In this case, if no free field exists within the print queue database illustrated in FIG. 22, then the printer 3 discards the reservation of the print job request (i.e., the printer 3 does not store the reservation of the print job request in the print queue database).

In step S2312, the printer 3 updates the print queue database by registering each information in the print queue database illustrated in FIG. 22 as a reservation of the print job request based on the computer name. More specifically, the printer 3 updates the time count value set to the "Time" field with the value stored in Time1.

In step S2313, the printer 3 registers the print job request of the print job whose start has been requested by the CreatePrintJobRequest received in step S1202 in the print queue database illustrated in FIG. 22. In step S2314, the printer 3 determines whether a reservation of a print job request for the print job whose start has been requested by the CreatePrintJobRequest received in step S2302 exists within the print queue database illustrated in FIG. 22. If it is determined that a reservation of the print job request may already exist within the print queue database illustrated in FIG. 22 (Yes in step S2314), then the processing advances to step S2315. On the other hand, if it is determined that it is not likely that a reservation of the print job request exists within the print queue database illustrated in FIG. 22 (No in step S2314), then the processing advances to step S2316.

In step S2316, the printer 3 returns CreatePrintJobResponse (FIG. 11B) to the PC (the PC 1) as a response indicating that the print job request CreatePrintJobRequest received in step S2302 is accepted and executed. Then the processing advances to step S2317. In step S2317, the processing for CreatePrintJob ends.

In step S2315, the printer 3, in response to the print job request CreatePrintJobRequest received in step S2302, returns Fault(ServerErrorNotAcceptingJobs), which describes that the print job has not been accepted, to the PC (the PC 1). Then the processing advances to step S2317. In step S2317, the processing for CreatePrintJob ends.

Figure 24:
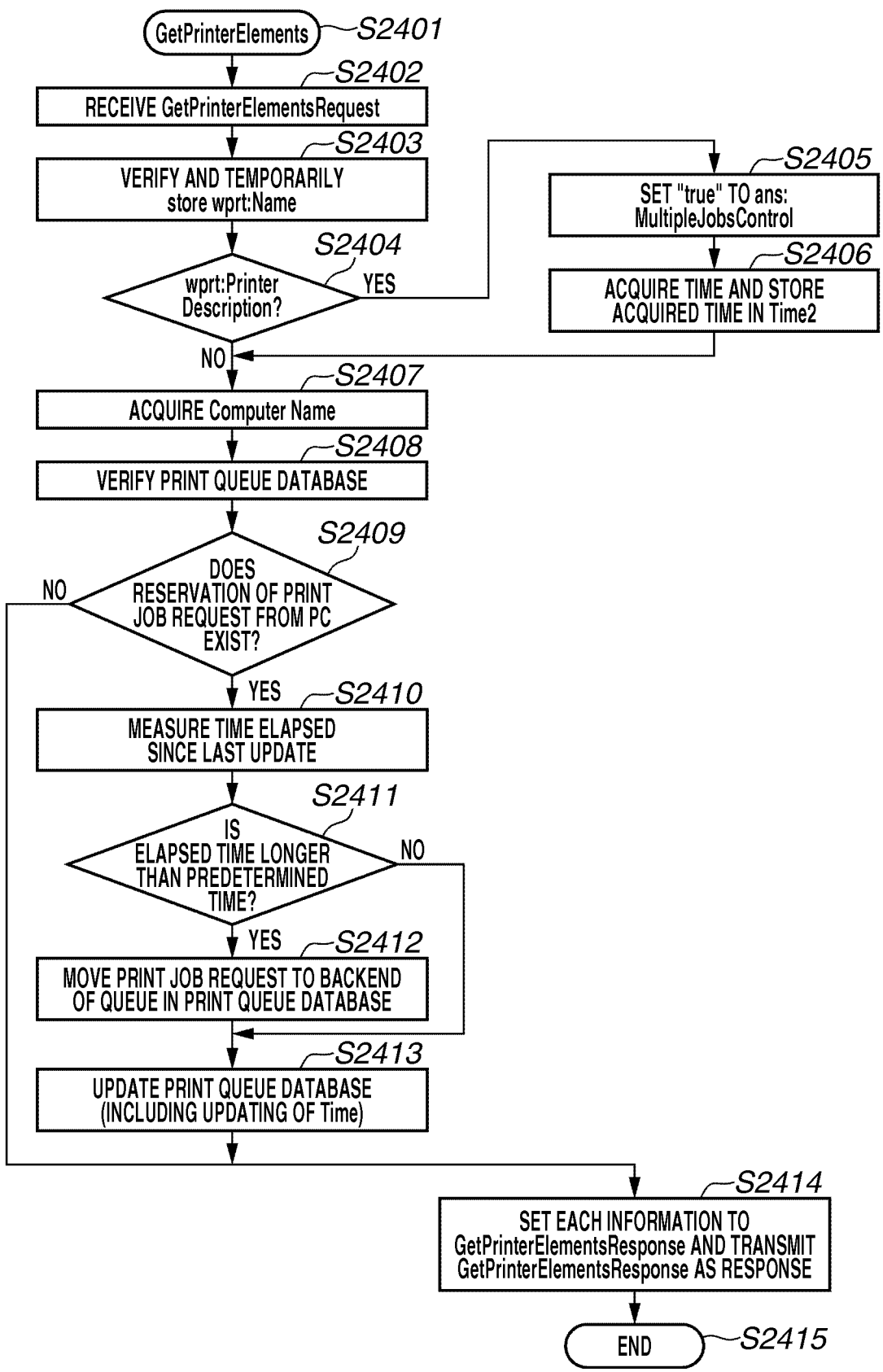
FIG. 24 is a flow chart illustrating an exemplary flow of processing executed by the printer according to a GetPrinterElements command.

FIG. 24 is a flow chart illustrating an exemplary flow of processing executed by the printer 3 according to a GetPrinterElements command. The example illustrated in FIG. 24 most effectively illustrates characteristics of the present invention. The program of the processing illustrated in the flow chart of FIG. 24 is loaded and executed by the CPU 15 from the ROM 16 on the RAM 17.

Referring to FIG. 24, in step S2401, GetPrinterElementsRequest (FIG. 8A) is input by the PC (the PC 1) to the printer 3 and the printer 3 receives the input GetPrinterElementsRequest. After receiving the GetPrinterElementsRequest in step S2402, the printer 3, in step S2403, verifies the value set to the element <wprt:Name> 801 (FIG. 8A) from the received GetPrinterElementsRequest and temporarily stores the received values set in all the elements <wprt:Name>.

In step S2404, in order to respond to a case where a plurality of elements <wprt:Name> is extracted from the GetPrinterElementsRequest in step S2403, the printer 3 determines whether wprt:PrinterDescription has been extracted as the value set to the element <wprt:Name>. If wprt:PrinterDescription has been extracted as the value set to the element <wprt:Name> (Yes in step S2404), then the processing advances to step S2405. On the other hand, if wprt:PrinterDescription has not been extracted (No in step S2404), then the processing advances to step S2407.

In step S2405, the printer 3 sets a value "true" to the function <ans:MultipleJobsControl> 802. Then, the processing advances to step S2406. In step S2406, the printer 3 acquires a count value based on which the present time or the elapsed time can be calculated from the timer built in to the printer 3 and stores the acquired count value to Time2. The count value is counted in the unit of "second" (sec).

In step S2407, the printer 3 acquires the computer name (Computer Name) of the PC 1. In step S2408, based on the computer name, the printer 3 verifies whether a reservation of a print job request for the print job whose start has been requested by the CreatePrintJobRequest received in step S2302 (FIG. 23) exists within the print queue database illustrated in FIG. 22.

In step S2409, the printer 3 determines whether a reservation of a print job request for the print job whose start has been requested by the CreatePrintJobRequest received in step S2302 (FIG. 23) exists within the print queue database illustrated in FIG. 22. If it is determined that a reservation of a print job request for the print job whose start has been requested by the CreatePrintJobRequest received in step S2302 (FIG. 23) exists within the print queue database illustrated in FIG. 22 (Yes in step S2409), then the processing advances to step S2410. On the other hand, if it is determined that a reservation of a print job request for the print job whose start has been requested by the CreatePrintJobRequest received in step S2302 (FIG. 23) exists within the print queue database illustrated in FIG. 22 (No in step S2409), then the processing advances to step S2414.

In step S2410, the printer 3 acquires the time count value set in the "Time" field corresponding to the print job request reserved with the computer name from the print queue database illustrated in FIG. 22. In addition, in step S2410, the printer 3 measures the elapsed time from the timing of the last update of the reservation of the print job by subtracting the acquired time count value from Time2 stored in step S2406.

In step S2411, the printer 3 determines whether the elapsed time exceeds a predetermined time (in the present exemplary embodiment, twenty seconds). If it is determined that the elapsed time exceeds the predetermined time (Yes in step S2411), then the processing advances to step S2412. On the other hand, if it is determined that the elapsed time does not exceed the predetermined time (No in step S2411), then the processing advances to step S2413.

In step S2412, in the print queue database illustrated in FIG. 22, the printer 3 moves the print job request to the tail end of the print queue database so that the print job request becomes the reservation of the print job request having the lowest priority. Then the processing advances to step S2413. In this case, if no free field exists within the print queue database illustrated in FIG. 22, then the printer 3 discards the print job request (i.e., the printer 3 does not store the reservation of the print job request in the print queue database).

In step S2413, the printer 3 updates the print queue database by registering each information in the print queue database illustrated in FIG. 22 as a reservation of the print job request based on the computer name. More specifically, the printer 3 updates the time count value set to the "Time" field with the value stored in Time2.

In step S2414, the printer 3 returns the GetPrinterElementsResponse to the PC (the PC 1) in response to the GetPrinterElementsRequest received in step S2402. In step S2415, the processing for GetPrinterElements ends.

Each function according to a third exemplary embodiment of the present invention, which can be implemented by executing the calling sequence illustrated in each of FIGS. 5, 6, 7, and 16 and the processing illustrated in the flow charts of each of FIGS. 12, 13, 17, 19, 20, 21, 22, 23, and 24 can be implemented by an information processing apparatus using a program externally installed on the information processing apparatus.

In this case, the present invention can also be applied when a group of information or codes including the program is supplied to the information processing apparatus or a peripheral apparatus from a storage medium, such as a CD-ROM, a flash memory, or a flexible disk or from an external storage medium via a network.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)). In this case, the program code itself, which is read from the storage medium, implements the functions of the embodiments described above, and accordingly, the storage medium storing the program code constitutes the present invention.

As the storage medium for supplying such program code, a flexible disk, a hard disk, an optical disk, a magneto-optical disk, a magneto optic disk (MO), a CD-ROM, a compact disc recordable (CD-R), a magnetic tape, a nonvolatile memory card, a ROM, and an electrically erasable programmable ROM (EEPROM), for example, can be used.

In addition, the functions according to the embodiments described above can be implemented not only by executing the program code read by the computer, but also implemented by the processing in which an OS or the like carries out a part of or the whole of the actual processing based on an instruction given by the program code.

In each exemplary embodiment of the present invention, a color inkjet printer is used as an example of the printer. However, the present invention is not limited to this. More specifically, an arbitrary printer, such as a monochromatic laser beam printer (LBP), can be used.

In each exemplary embodiment of the present invention, a PC is used as the information processing apparatus. However, the present invention is not limited to this. More specifically, an arbitrary information processing apparatus (terminal) that can be used in the similar manner as described above, such as a digital versatile disc (DVD) player, a gaming machine, a set-top box, or a network home appliance can be effectively used to implement the function of the present invention.

In each exemplary embodiment of the present invention, a printer is used as an example of the peripheral apparatus. However, the present invention is not limited to this. More specifically, as the peripheral apparatus, a copying machine, a facsimile transmission machine, a scanner, a determination condition, or an apparatus having a combination of functions of the above-described apparatuses can be used to implement the functions of the present invention.

Furthermore, in each exemplary embodiment of the present invention, an OS equivalent to a Windows Vista® OS is used. However, the present invention is not limited to this. More specifically, an arbitrary OS can be used. Moreover, in each exemplary embodiment of the present invention, the network 4 includes Ethernet®. However, the present invention is not limited to this. More specifically, a different arbitrary network configuration can also be used.

In addition, in each exemplary embodiment of the present invention, USB and Ethernet® are used as the interface among the PC 1, the PC 2, and the PC 5 and the printer 3. However, the present invention is not limited to this. More specifically, an arbitrary interface, such as a wireless LAN, Institute of Electrical and Electronic Engineers (IEEE) 1394, or Bluetooth can be used.

In each exemplary embodiment of the present invention, the WSD is used as an example of a web service protocol. However, a different arbitrary protocol, such as an IHV native protocol, can be used instead. In an exemplary embodiment of the present invention, an IP address is acquired from a TCP reception socket of HTTP POST addressed to the WSD Print Service. In addition, in each exemplary embodiment of the present invention, the computer name is acquired according to the IP address and the PC is uniquely identified according to the acquired computer name.

However, the PC can be identified by using a method different from the above-described method. More specifically, the PC can also be identified by utilizing a different unit capable of acquiring an IP address from the TCP reception socket of HTTP POST addressed to WSD Print Service and identifying the PC by using the IP address. By utilizing the IP address, it becomes unnecessary to handle or consider using two-byte codes within the WSD protocol. Accordingly, the program can have a simple configuration. Therefore, the present invention can reduce mistakes in coding to a minimum. Accordingly, the quality of the program can be improved by the present invention having the above-described configuration.

In an exemplary embodiment of the present invention, the printer receives the reservation of the print job request by utilizing the CreatePrintJob operation (S1611 (FIG. 16) and step S2102 in FIG. 21A), which is a print job start request, and the GetPrinterElements operation (S1621 (FIG. 16) and step S2016 (FIG. 20)) utilized to acquire printer information.

However, the present invention is not limited to this. More specifically, instead of the GetPrinterElements operation, a different operation defined by the Definition of the WSD Print Service, such as the GetJobElements operation can be performed, which is utilized in acquiring the information about a print job.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). For example, aspects of the present invention can also be realized by a computer-readable medium storing computer-executable instructions which, when executed by a computer, cause the computer to function as an apparatus disclosed herein and/or perform a method disclosed herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-270099 filed Nov. 27, 2009, which is hereby incorporated by reference herein in its entirety.

What is claimed is:

1. A peripheral apparatus control system comprising:
a peripheral apparatus comprising:
a first reception unit configured to receive a first request from an information processing apparatus; and
a first transmission unit configured to transmit, to the information processing apparatus as a reply to the first request, a negative reply indicating that a print job is unable to be accepted,
wherein the information processing apparatus comprises:
a second transmission unit configured to transmit a second request to the peripheral apparatus when the negative reply is received; and
a second reception unit configured to receive, from the peripheral apparatus, a reservation identification (ID) as a reply to the second request.

2. The peripheral apparatus control system according to claim 1, wherein the peripheral apparatus further comprises a control unit configured to, in a case where a reception timing difference between the first request and the second request is within a predetermined time, issue the reservation ID as a reply to the second request and accept a reservation of the first request.

3. The peripheral apparatus control system according to claim 1, wherein the first transmission unit transmits, as a response to the first request, the negative reply to the information processing apparatus in a case where a reservation of another print first request, which has a priority higher than a print job requested in the first request to start processing, exists.

4. The peripheral apparatus control system according to claim 1, wherein the first transmission unit transmits, to the information processing apparatus, a reply indicating that a print job is accepted and executed in a case where a reservation of another print first request, which has a priority higher than a print job requested in the first request to start processing, does not exist.

5. The peripheral apparatus control system according to claim 1, wherein the peripheral apparatus is further configured to store information for identifying the information processing apparatus that is a source of a job request, a name of a job included in the job request, a user name included in the job request, the reservation identification, and one of a time of last update of the reservation of the job request to which the reservation identification is assigned and a time count value in a database to manage the reservation of the job request.

6. The peripheral apparatus control system according to claim 1, wherein the first request is a CreatePrintJobRequest and the second request is a GetPrinterElementsRequest.

7. The peripheral apparatus control system according to claim 1, wherein the information processing apparatus further comprises a third transmission unit configured to transmit the first request until a reply, as a reply to the first request, indicating that the peripheral apparatus is able to perform printing is received, and to transmit print data to the peripheral apparatus when the reply indicating that the peripheral apparatus is able to perform printing is received.

8. A method comprising:
receiving, by a peripheral apparatus, a first request from an information processing apparatus;
transmitting, by the peripheral apparatus, to the information processing apparatus as a reply to the first request, a negative reply indicating that a print job is unable to be accepted;
transmitting, by the information processing apparatus, a second request to the peripheral apparatus when the negative reply is received; and
receiving, by the information processing apparatus, from the peripheral apparatus, a reservation identification (ID) as a reply to the second request.

9. The method according to claim 8, further comprising, in a case where a reception timing difference between the first request and the second request is within a predetermined time, issuing, by the peripheral apparatus the reservation ID as a reply to the second request, and accepting, by the peripheral apparatus, a reservation of the first request.

10. The method according to claim 1, further comprising transmitting, by the peripheral apparatus, as a response to the first request, the negative reply to the information processing apparatus, in a case where a reservation of another print first request, which has a priority higher than a print job requested in the first request to start processing, exists.

11. The method according to claim 1, further comprising transmitting, by the peripheral apparatus, to the information processing apparatus a reply indicating that a print job is accepted and executed, in a case where a reservation of another print first request, which has a priority higher than a print job requested in the first request to start processing, does not exist.

12. The method according to claim 1, further comprising storing, by the peripheral apparatus, information for identifying the information processing apparatus that is a source of a job request, a name of a job included in the job request, a user name included in the job request, the reservation identification, and one of a time of last update of the reservation of the job request to which the reservation identification is assigned and a time count value in a database to manage the reservation of the job request.

13. The method according to claim 1, wherein the first request is a CreatePrintJobRequest and the second request is a GetPrinterElementsRequest.

14. The method according to claim 1, further comprising:
transmitting, by the information processing apparatus, the first request until a reply, as a reply to the first request, indicating that the peripheral apparatus is able to perform printing is received; and
transmitting, by the information processing apparatus, print data to the peripheral apparatus when the reply indicating that the peripheral apparatus is able to perform printing is received.

* * * * *